US011604566B2

(12) United States Patent
Behar et al.

(10) Patent No.: US 11,604,566 B2
(45) Date of Patent: Mar. 14, 2023

(54) SYSTEM AND METHOD FOR STREAMLINING USER INTERACTION WITH ELECTRONIC CONTENT

(71) Applicant: LiTL LLC, Boston, MA (US)

(72) Inventors: Yves Behar, Oakland, CA (US); Joshua Morenstein, San Francisco, CA (US); Christopher Hibmacronan, Oakland, CA (US); Naoya Edahiro, San Francisco, CA (US); Matthew David Day, San Francisco, CA (US); Robert Sanford Havoc Pennington, Asheville, NC (US); Noah Bruce Guyot, Mill Valley, CA (US); Daniel Kuo, San Francisco, CA (US); Jenea Boshart Hayes, Castro Valley, CA (US); Aaron Tang, Boston, MA (US); Donald Francis Fischer, Charlestown, MA (US); Christian Marc Schmidt, Brooklyn, NY (US); Lisa Strausfeld, New York, NY (US); David Livingstone Fore, Oakland, CA (US); John H. Chuang, Brookline, MA (US); Chris Bambacus, Framingham, MA (US); Bart Haney, Boston, MA (US); Logan Ray, Boston, MA (US); Serge Beaulieu, San Francisco, CA (US)

(73) Assignee: LiTL LLC, Boston, MA (US)

( * ) Notice: Subject to any disclaimer, the term of this patent is extended or adjusted under 35 U.S.C. 154(b) by 0 days.

(21) Appl. No.: 16/722,760

(22) Filed: Dec. 20, 2019

(65) Prior Publication Data

US 2020/0249807 A1 Aug. 6, 2020

Related U.S. Application Data

(63) Continuation of application No. 15/858,955, filed on Dec. 29, 2017, now Pat. No. 10,564,818, which is a (Continued)

(51) Int. Cl.
*G06F 3/048* (2013.01)
*G06F 3/0484* (2022.01)
(Continued)

(52) U.S. Cl.
CPC ............ *G06F 3/0484* (2013.01); *G06F 1/162* (2013.01); *G06F 1/169* (2013.01); *G06F 1/1632* (2013.01);
(Continued)

(58) Field of Classification Search
CPC .. G06F 3/0482; G06F 3/0484; G06F 3/04842; G06F 3/04886; G06F 3/0481;
(Continued)

(56) References Cited

U.S. PATENT DOCUMENTS 3,468,576 A 9/1969 Beyer et al.
4,939,514 A 7/1990 Miyazaki
(Continued)

FOREIGN PATENT DOCUMENTS

CN 1292112 A 4/2001
CN 2627170 Y 7/2004
(Continued)

OTHER PUBLICATIONS

Extended European Search Report dated Apr. 5, 2011 in connection with European Application No. 09755433.1.
(Continued)

*Primary Examiner* — Claudia Dragoescu
(74) *Attorney, Agent, or Firm* — Wolf, Greenfield & Sacks, P.C.

(57) ABSTRACT

Various aspects and embodiments are directed to a graphical user interface that organizes interface elements into views of computer content for presentation to a user. Different views of are used to provide an interface that is responsive to configurations of the device and activities performed by the
(Continued)

user. Aspects include permitting the user to transition the device from one configuration to another during its use. The elements that comprise the graphical user interface are configured to present a summarized view of available actions and content to simplify user interaction. The different views present different organizations of the interface elements and in some examples display only certain modes of content in order to reduce the number of options a user must navigate. Methods and systems for streamlining user interaction with computer content are also provided. Streamlining includes, for example, pre-configuring a user device based on received information.

23 Claims, 56 Drawing Sheets

Related U.S. Application Data continuation of application No. 14/680,422, filed on Apr. 7, 2015, now Pat. No. 9,880,715, which is a continuation of application No. 12/416,496, filed on Apr. 1, 2009, now Pat. No. 9,003,315, which is a continuation-in-part of application No. 12/170,939, filed on Jul. 10, 2008, now Pat. No. 8,289,688, and a continuation-in-part of application No. 12/170,951, filed on Jul. 10, 2008, now Pat. No. 9,624,844.

(60) Provisional application No. 61/041,365, filed on Apr. 1, 2008.

(51) Int. Cl.
  *G06F 16/957* (2019.01)
  *G06F 1/16* (2006.01)
  *G06F 3/0362* (2013.01)
  *H04L 67/02* (2022.01)
  *H04L 67/10* (2022.01)

(52) U.S. Cl.
  CPC .......... *G06F 1/1677* (2013.01); *G06F 3/0362* (2013.01); *G06F 16/9577* (2019.01); *H04L 67/02* (2013.01); *H04L 67/10* (2013.01)

(58) Field of Classification Search
  CPC . G06F 3/067; G06F 9/54; G06F 16/10; G06F 16/178; G06F 16/182; H04L 67/10; H04L 67/1097; H04L 67/02; H04L 67/04; H04L 67/06; H04L 67/2842
  See application file for complete search history.

(56) References Cited

U.S. PATENT DOCUMENTS

| | | |
|---|---|---|
| D333,636 S | 3/1993 | Issa |
| 5,200,913 A | 4/1993 | Hawkins et al. |
| 5,268,817 A | 12/1993 | Miyagawa et al. |
| 5,436,954 A | 7/1995 | Nishiyama et al. |
| 5,515,345 A | 5/1996 | Barreira et al. |
| 5,547,698 A | 8/1996 | Lansbergen et al. |
| 5,559,670 A | 9/1996 | Flint et al. |
| 5,610,992 A | 3/1997 | Hickman |
| 5,644,516 A | 7/1997 | Podwalny et al. |
| 5,646,820 A | 7/1997 | Honda et al. |
| 5,661,632 A | 8/1997 | Register |
| 5,682,290 A | 10/1997 | Markow et al. |
| 5,708,561 A | 1/1998 | Huilgol et al. |
| 5,712,760 A | 1/1998 | Coulon et al. |
| D391,927 S | 3/1998 | Faranda et al. |
| D392,944 S | 3/1998 | Issa |
| D395,868 S | 7/1998 | Lino |
| 5,790,371 A | 8/1998 | Latocha et al. |
| 5,793,355 A | 8/1998 | Youens |
| 5,796,575 A | 8/1998 | Podwalny et al. |
| D399,526 S | 10/1998 | Brady |
| 5,825,352 A | 10/1998 | Bisset et al. |
| 5,841,631 A | 11/1998 | Shin et al. |
| 5,847,698 A | 12/1998 | Reavey et al. |
| 5,900,848 A | 5/1999 | Haneda et al. |
| 5,903,723 A | 5/1999 | Beck et al. |
| 5,926,364 A | 7/1999 | Karidis |
| 5,949,643 A | 9/1999 | Batio |
| D416,003 S | 11/1999 | Schiefer et al. |
| 5,986,634 A | 11/1999 | Alioshin et al. |
| 5,987,704 A | 11/1999 | Tang |
| 6,005,767 A | 12/1999 | Ku et al. |
| 6,067,224 A | 5/2000 | Nobuchi |
| 6,094,191 A | 7/2000 | Watanabe et al. |
| 6,097,389 A | 8/2000 | Morris et al. |
| 6,137,468 A | 10/2000 | Martinez |
| 6,144,358 A | 11/2000 | Narayanaswamy et al. |
| 6,154,359 A | 11/2000 | Kamikakai et al. |
| 6,188,391 B1 | 2/2001 | Seely et al. |
| 6,222,507 B1 | 4/2001 | Gouko |
| 6,223,393 B1 | 5/2001 | Knopf |
| 6,243,258 B1 | 6/2001 | Paratore |
| 6,262,885 B1 | 7/2001 | Emma et al. |
| 6,266,236 B1 | 7/2001 | Ku et al. |
| 6,275,376 B1 | 8/2001 | Moon |
| 6,295,038 B1 | 9/2001 | Rebeske |
| 6,302,612 B1 | 10/2001 | Fowler et al. |
| 6,323,846 B1 | 11/2001 | Westerman et al. |
| D452,238 S | 12/2001 | Sugano et al. |
| 6,327,482 B1 | 12/2001 | Miyashita |
| 6,341,061 B1 | 1/2002 | Eisbach et al. |
| 6,343,006 B1 | 1/2002 | Moscovitch et al. |
| 6,377,444 B1 | 4/2002 | Price et al. |
| 6,396,419 B1 | 5/2002 | Yeh |
| D462,069 S | 8/2002 | Gatto |
| 6,437,974 B1 | 8/2002 | Liu |
| 6,449,146 B1 | 9/2002 | Ryuuzaki |
| D463,797 S | 10/2002 | Andre et al. |
| 6,464,195 B1 | 10/2002 | Hildebrandt |
| 6,492,974 B1 | 12/2002 | Nobuchi et al. |
| 6,493,216 B1 | 12/2002 | Lin |
| 6,510,049 B2 | 1/2003 | Rosen |
| D476,326 S | 6/2003 | Taniumura |
| 6,597,384 B1 | 7/2003 | Harrison |
| D479,708 S | 9/2003 | Hwang et al. |
| 6,628,267 B2 | 9/2003 | Karidis et al. |
| 6,642,909 B1 | 11/2003 | Oliva |
| 6,659,516 B2 | 12/2003 | Wang et al. |
| 6,661,426 B1 | 12/2003 | Jetha et al. |
| 6,665,175 B1 | 12/2003 | DeBoer et al. |
| 6,693,652 B1 | 2/2004 | Barrus et al. |
| 6,697,055 B1 | 2/2004 | Bullister |
| 6,704,007 B1 | 3/2004 | Clapper |
| 6,711,004 B2 | 3/2004 | Yen et al. |
| 6,724,365 B1 | 4/2004 | Escamilla et al. |
| D491,177 S | 6/2004 | Andre et al. |
| D491,936 S | 6/2004 | Jao |
| 6,760,721 B1 | 7/2004 | Chasen et al. |
| D494,162 S | 8/2004 | Kondo |
| 6,771,494 B2 | 8/2004 | Shimano |
| D495,674 S | 9/2004 | Yoo et al. |
| D495,694 S | 9/2004 | Chase et al. |
| 6,788,527 B2 | 9/2004 | Doczy et al. |
| 6,807,053 B2 | 10/2004 | An et al. |
| 6,819,304 B2 | 11/2004 | Branson |
| 6,829,140 B2 | 12/2004 | Shimano et al. |
| 6,859,219 B1 | 2/2005 | Sall |
| D504,128 S | 4/2005 | Maskatia |
| 6,882,335 B2 | 4/2005 | Saarinen |
| 6,918,159 B2 | 7/2005 | Choi |
| 6,944,012 B2 | 9/2005 | Doczy et al. |
| 6,963,485 B2 | 11/2005 | Hong |
| D512,997 S | 12/2005 | Lee et al. |
| 6,972,752 B2 | 12/2005 | Nako et al. |
| D513,509 S | 1/2006 | Kawa |
| D516,552 S | 3/2006 | Iseki |
| D517,541 S | 3/2006 | Maskatia |

(56) References Cited

U.S. PATENT DOCUMENTS

| | | |
|---|---|---|
| D518,042 S | 3/2006 | Kanayama |
| 7,035,665 B2 | 4/2006 | Kido et al. |
| D523,429 S | 6/2006 | Lin |
| 7,058,902 B2 | 6/2006 | Iwema et al. |
| 7,061,472 B1 | 6/2006 | Schweizer et al. |
| 7,072,179 B1 | 7/2006 | Curran et al. |
| D528,541 S | 9/2006 | Maskatia |
| D528,993 S | 9/2006 | Wilson |
| 7,138,962 B2 | 11/2006 | Koenig |
| 7,148,877 B2 | 12/2006 | Chang et al. |
| D534,531 S | 1/2007 | Ogasawara |
| D535,292 S | 1/2007 | Shi et al. |
| 7,164,432 B1 | 1/2007 | Amemiya |
| 7,187,364 B2 | 3/2007 | Duarte et al. |
| D544,846 S | 6/2007 | Kindle et al. |
| 7,239,508 B2 | 7/2007 | Ferrucei |
| 7,243,079 B1 | 7/2007 | Manolis et al. |
| 7,250,207 B1 | 7/2007 | Heal et al. |
| 7,366,994 B2 | 4/2008 | Loui |
| 7,382,607 B2 | 6/2008 | Skillman |
| 7,428,142 B1 | 9/2008 | Ligtenberg et al. |
| 7,433,179 B2 | 10/2008 | Hisano et al. |
| D581,371 S | 11/2008 | Richmond |
| 7,467,356 B2 | 12/2008 | Gettman et al. |
| 7,522,946 B2 | 4/2009 | Im |
| D593,085 S | 5/2009 | Behar et al. |
| D593,086 S | 5/2009 | Behar et al. |
| D593,091 S | 5/2009 | Behar et al. |
| D605,635 S | 12/2009 | Edahiro et al. |
| 7,698,407 B2 | 4/2010 | Mattox, Jr. et al. |
| 7,756,928 B1 | 7/2010 | Meenan et al. |
| 7,778,973 B2 | 8/2010 | Choi et al. |
| 7,814,425 B1 | 10/2010 | O'Shaugnessy et al. |
| 7,869,834 B2 | 1/2011 | Seol et al. |
| 7,970,240 B1 | 6/2011 | Chao et al. |
| 7,978,182 B2 | 7/2011 | Ording et al. |
| 8,145,222 B2 | 3/2012 | Wormaid et al. |
| 8,151,105 B2 | 4/2012 | Park et al. |
| 8,217,964 B2 | 7/2012 | Laine et al. |
| 8,284,714 B2 | 10/2012 | Ray |
| 8,289,688 B2 | 10/2012 | Behar et al. |
| 8,300,022 B2 | 10/2012 | Brenneman |
| 8,385,950 B1 | 2/2013 | Wagner et al. |
| 8,464,161 B2 | 6/2013 | Giles et al. |
| 8,577,957 B2 | 11/2013 | Behar et al. |
| 8,612,888 B2 | 12/2013 | Pennington et al. |
| 8,624,844 B2 | 1/2014 | Behar et al. |
| 9,003,315 B2 | 4/2015 | Behar et al. |
| 9,495,070 B2 | 11/2016 | Pennington et al. |
| 9,563,229 B2 | 2/2017 | Behar et al. |
| 9,880,715 B2 | 1/2018 | Behar et al. |
| 9,927,835 B2 | 3/2018 | Behar et al. |
| 10,289,154 B2 | 5/2019 | Behar et al. |
| 10,564,818 B2 | 2/2020 | Behar et al. |
| 10,684,743 B2 | 6/2020 | Havoc Pennington et al. |
| 10,782,733 B2 | 9/2020 | Behar et al. |
| 2001/0032320 A1 | 10/2001 | Abdelnur et al. |
| 2002/0005818 A1 | 1/2002 | Bruzzone |
| 2002/0010707 A1 | 1/2002 | Chang et al. |
| 2002/0021258 A1 | 2/2002 | Koenig |
| 2002/0190947 A1 | 12/2002 | Feinstein |
| 2003/0048595 A1 | 3/2003 | Hsieh et al. |
| 2003/0080995 A1 | 5/2003 | Tenenbaum et al. |
| 2003/0107603 A1 | 6/2003 | Clapper |
| 2003/0109232 A1 | 6/2003 | Park et al. |
| 2003/0203747 A1 | 10/2003 | Nagamine |
| 2004/0001049 A1 | 1/2004 | Oakley |
| 2004/0025993 A1 | 2/2004 | Russell |
| 2004/0150635 A1 | 8/2004 | Clapper |
| 2004/0172451 A1 | 9/2004 | Biggs et al. |
| 2004/0185920 A1 | 9/2004 | Choi et al. |
| 2004/0189694 A1 | 9/2004 | Kurtz et al. |
| 2004/0203535 A1 | 10/2004 | Kim et al. |
| 2004/0207568 A1 | 10/2004 | Ooshima et al. |
| 2004/0212602 A1 | 10/2004 | Nako et al. |
| 2004/0228076 A1 | 11/2004 | Clapper |
| 2004/0230663 A1 | 11/2004 | Ackerman |
| 2005/0005241 A1 | 1/2005 | Hunleth et al. |
| 2005/0010860 A1 | 1/2005 | Weiss et al. |
| 2005/0018396 A1 | 1/2005 | Nakajima et al. |
| 2005/0041378 A1 | 2/2005 | Hamada et al. |
| 2005/0055632 A1 | 3/2005 | Schwartz et al. |
| 2005/0060655 A1* | 3/2005 | Gray ............... H04L 67/02 715/745 |
| 2005/0062715 A1 | 3/2005 | Tsuji et al. |
| 2005/0063145 A1 | 3/2005 | Homer et al. |
| 2005/0065932 A1* | 3/2005 | Rocha ............... G06F 21/80 |
| 2005/0071782 A1 | 3/2005 | Barrett et al. |
| 2005/0083642 A1 | 4/2005 | Senpuku et al. |
| 2005/0091343 A1* | 4/2005 | Murray, Jr. ........ H04N 1/00222 709/219 |
| 2005/0091596 A1 | 4/2005 | Anthony et al. |
| 2005/0093868 A1 | 5/2005 | Hinckley |
| 2005/0110880 A1 | 5/2005 | Parulski et al. |
| 2005/0120082 A1* | 6/2005 | Hesselink ......... H04L 63/0272 709/203 |
| 2005/0122318 A1 | 6/2005 | Tonouchi et al. |
| 2005/0128695 A1 | 6/2005 | Han |
| 2005/0134717 A1 | 6/2005 | Misawa |
| 2005/0146845 A1 | 7/2005 | Moscovitch |
| 2005/0155184 A1 | 7/2005 | Kayl |
| 2005/0177798 A1 | 8/2005 | Thomson et al. |
| 2005/0210399 A1 | 9/2005 | Filner et al. |
| 2005/0221865 A1 | 10/2005 | Nishiyama et al. |
| 2005/0257400 A1 | 11/2005 | Sommerer et al. |
| 2005/0282596 A1 | 12/2005 | Park et al. |
| 2006/0007503 A1 | 1/2006 | Nakamura |
| 2006/0015823 A1 | 1/2006 | Chao et al. |
| 2006/0017692 A1 | 1/2006 | Wehrenberg et al. |
| 2006/0034042 A1 | 2/2006 | Hisano et al. |
| 2006/0082554 A1 | 4/2006 | Caine et al. |
| 2006/0101064 A1 | 5/2006 | Strong et al. |
| 2006/0123353 A1 | 6/2006 | Matthews et al. |
| 2006/0126284 A1 | 6/2006 | Moscovitch |
| 2006/0209016 A1 | 9/2006 | Fox et al. |
| 2006/0238439 A1 | 10/2006 | Fuller et al. |
| 2006/0264243 A1 | 11/2006 | Aarras |
| 2006/0265390 A1 | 11/2006 | Aldrich et al. |
| 2006/0268500 A1 | 11/2006 | Kuhn |
| 2006/0271644 A1 | 11/2006 | Yamaizumi et al. |
| 2006/0277167 A1 | 12/2006 | Gross et al. |
| 2007/0013674 A1 | 1/2007 | Woolley |
| 2007/0013682 A1 | 1/2007 | Lin et al. |
| 2007/0024722 A1 | 2/2007 | Eura et al. |
| 2007/0035616 A1 | 2/2007 | Lee et al. |
| 2007/0038549 A1 | 2/2007 | Janowski et al. |
| 2007/0058329 A1 | 3/2007 | Ledbetter et al. |
| 2007/0073833 A1 | 3/2007 | Roy et al. |
| 2007/0118525 A1 | 5/2007 | Svendsen |
| 2007/0120762 A1 | 5/2007 | O'Gorman |
| 2007/0138806 A1 | 6/2007 | Ligtenberg et al. |
| 2007/0178952 A1 | 8/2007 | Ehara et al. |
| 2007/0182663 A1 | 8/2007 | Biech |
| 2007/0198674 A1 | 8/2007 | Li et al. |
| 2007/0240076 A1 | 10/2007 | Astala et al. |
| 2007/0242421 A1 | 10/2007 | Goschin et al. |
| 2007/0247446 A1 | 10/2007 | Orsley et al. |
| 2007/0268202 A1 | 11/2007 | Lim et al. |
| 2007/0296820 A1 | 12/2007 | Lonn |
| 2008/0024388 A1 | 1/2008 | Bruce |
| 2008/0024465 A1 | 1/2008 | Hawkins et al. |
| 2008/0042987 A1 | 2/2008 | Westerman et al. |
| 2008/0059888 A1 | 3/2008 | Dunko |
| 2008/0062625 A1 | 3/2008 | Batio |
| 2008/0074831 A1 | 3/2008 | Lee et al. |
| 2008/0088602 A1 | 4/2008 | Hotelling |
| 2008/0092039 A1 | 4/2008 | Brockway et al. |
| 2008/0122796 A1 | 5/2008 | Jobs et al. |
| 2008/0134093 A1 | 6/2008 | Dharmarajan et al. |
| 2008/0158795 A1 | 7/2008 | Aoki et al. |
| 2008/0174570 A1 | 7/2008 | Jobs et al. |
| 2008/0195664 A1* | 8/2008 | Maharajh ........... H04L 67/306 |
| 2008/0209493 A1 | 8/2008 | Choi et al. |
| 2008/0211778 A1 | 9/2008 | Ording et al. |

(56) References Cited

U.S. PATENT DOCUMENTS

| | | |
|---|---|---|
| 2008/0235594 A1 | 9/2008 | Bhumkar et al. |
| 2008/0284738 A1 | 11/2008 | Hovden et al. |
| 2009/0007001 A1 | 1/2009 | Morin et al. |
| 2009/0019383 A1 | 1/2009 | Riley et al. |
| 2009/0019479 A1 | 1/2009 | Kwak et al. |
| 2009/0150784 A1 | 6/2009 | Denney et al. |
| 2009/0150826 A1 | 6/2009 | Lyndersay et al. |
| 2009/0160811 A1 | 6/2009 | Motoe et al. |
| 2009/0190295 A1 | 7/2009 | Chin et al. |
| 2009/0193364 A1 | 7/2009 | Jarrett et al. |
| 2009/0244012 A1 | 10/2009 | Behar et al. |
| 2009/0244016 A1 | 10/2009 | Casparian et al. |
| 2009/0244832 A1 | 10/2009 | Behar et al. |
| 2009/0249244 A1 | 10/2009 | Robinson et al. |
| 2009/0275366 A1 | 11/2009 | Schilling |
| 2009/0300511 A1 | 12/2009 | Behar et al. |
| 2009/0303205 A1 | 12/2009 | Seibert et al. |
| 2009/0303676 A1 | 12/2009 | Behar et al. |
| 2009/0322790 A1 | 12/2009 | Behar et al. |
| 2010/0016018 A1 | 1/2010 | Okuda et al. |
| 2010/0174993 A1 | 7/2010 | Pennington et al. |
| 2010/0255889 A1 | 10/2010 | Tsutsui et al. |
| 2011/0279376 A1 | 11/2011 | Tang et al. |
| 2013/0141854 A1 | 6/2013 | Behar et al. |
| 2014/0282263 A1 | 9/2014 | Pennington et al. |
| 2015/0277688 A1 | 10/2015 | Behar et al. |
| 2017/0090699 A1 | 3/2017 | Pennington et al. |
| 2017/0205849 A1 | 7/2017 | Behar et al. |
| 2018/0181271 A1 | 6/2018 | Behar et al. |
| 2018/0307271 A1 | 10/2018 | Behar et al. |
| 2019/0361491 A1 | 11/2019 | Behar et al. |
| 2020/0319759 A1 | 10/2020 | Pennington et al. |
| 2021/0034104 A1 | 2/2021 | Behar et al. |

FOREIGN PATENT DOCUMENTS

| | | |
|---|---|---|
| CN | 1926496 A | 3/2007 |
| DE | 199 52 486 A1 | 5/2001 |
| DE | 10314554 A1 | 10/2004 |
| EP | 0 588 210 A1 | 3/1994 |
| EP | 1 316 877 A1 | 6/2003 |
| EP | 2 283 407 A | 2/2011 |
| GB | 2 321 982 A | 8/1998 |
| GB | 2449632 A | 12/2008 |
| JP | 5-197507 A | 8/1993 |
| JP | 6090200 A | 3/1994 |
| JP | 6-242853 A | 9/1994 |
| JP | 6-259166 A | 9/1994 |
| JP | 1994-242853 A | 9/1994 |
| JP | H6-242853 | 9/1994 |
| JP | 8-179851 A | 7/1996 |
| JP | H08-179851 A | 7/1996 |
| JP | 10-111658 A | 4/1998 |
| JP | 11-296259 | 10/1999 |
| JP | 2001-167211 A | 6/2001 |
| JP | 2001-298514 A | 10/2001 |
| JP | 2002-258982 A | 9/2002 |
| JP | 2004-302179 A | 10/2004 |
| JP | 2005-159741 A | 6/2005 |
| JP | 2005-168036 A | 6/2005 |
| JP | 2005-242436 A | 9/2005 |
| JP | 2005-71297 A | 10/2005 |
| JP | 2006-227409 A | 8/2006 |
| JP | 2006-243137 A | 9/2006 |
| KR | 1020000036647 | 6/2002 |
| WO | WO 95/24007 A | 9/1995 |

OTHER PUBLICATIONS

International Search Report and Written Opinion for International Application No. PCT/US2009/038599 dated Jun. 3, 2009.
Japanese Office Action dated Dec. 4, 2012 in connection with Japanese Application No. 2011-503058 and partial English translation thereof.
Japanese Office Action dated Apr. 16, 2013 in connection with Japanese Application No. 2011-503058.
Office Action dated Apr. 4, 2011, for U.S. Appl. No. 12/170,951.
European Office Communication dated Nov. 23, 2015 in connection to European Application No. 09727165.4.
Chinese Office Action dated Jul. 18, 2013 in connection with Chinese Application No. 200980117859.8.
European Examination Report dated Nov. 22, 2016 in connection with European Application No. 09727165.4.
European Examination Report dated Jan. 17, 2017 in connection with European Application No. 09755433.1.
Canadian Office Action dated Aug. 18, 2017 in connection with Canadian Application No. 2719828.
International Search Report and Written Opinion for International Application No. PCT/US2009/39117 dated Sep. 28, 2009.
International Preliminary Report on Patentability dated Oct. 14, 2010 for International Application No. PCT/US2009/039117.
Office Action dated Jun. 7, 2012, for U.S. Appl. No. 12/170,951.
Extended European Search Report dated Feb. 3, 2020 in connection with European Application No. 19190053.9.
http://laptop.org/en/laptop/start/ebook.shtml accessed on Sep. 29, 2008.
Miller, Creating a Digital Home Entertainment System with Windows Media Center. 2006, Que.
Petition for Inter Partes Review. *Lenovo* vs. *Litl LLC*. IPR Case No. IPR2021-00681. U.S. Pat. No. 8,289,688. Dated Mar. 18, 2021.
Patent Owner's Preliminary Response. *Lenovo* v. *Litl LLC*. IPR Case No. IPR2021-00681. U.S. Pat. No. 8,289,688. Jun. 25, 2021.
Petition for Inter Partes Review. *Lenovo (United States) Inc.* v. *Litl LLC*. IPR Case No. IPR2021-00821/U.S. Pat. No. 8,612,888. Apr. 27, 2021.
Petition for Inter Partes Review. *Lenovo (United States) Inc.* v. *Litl LLC*. IPR Case No. IPR2021-00786/U.S. Pat. No. 9,880,715. May 4, 2021.
Petition for Inter Partes Review. *Lenovo (United States) Inc.* v. *Litl LLC*. IPR Case No. IPR2021-00800/U.S. Pat. No. 10,289,154. May 4, 2021.
Petition for Inter Partes Review. *Lenovo (United States) Inc.* v. *Litl LLC*. IPR Case No. IPR2021-00822/U.S. Pat. No. 8,624,844. May 4, 2021.
Petition for Inter Partes Review. *Microsoft Corporation* v. *Litl LLC*. PTAB Case No. IPR2021-01011. U.S. Pat. No. 8,577,957. May 25, 2021.
[No Author Listed] Dell Latitude XT Tablet. Dell. Dec. 2007, 17 pages.
[No Author Listed] Environment Variable. Wikipedia. https://en.wikipedia.org/w/index.php?title=Environment_variable&oldid=160448946. Last accessed Mar. 19, 2021, 6 pages.
[No Author Listed] HP Compaq Tablet PC TC1 100 QuickSpecs. Hewlett-Packard. Aug. 5, 2005, 24 pages.
[No Author Listed] Is Your "Show Desktop Icon" in XP Missing? WaybackMachine Archive of https://www.windows-help-central.com/show-desktop-icon-in-xp-missing.html. Captured Mar. 2, 2007, 1 page.
[No Author Listed] Lenovo ThinkPad X61 Tablet Service and Troubleshooting Guide. Lenovo. Apr. 2007, 80 pages.
[No Author Listed] Microsoft Digital Image Suite User's Manual. Microsoft Corporation. 2005.
[No Author Listed] Motion Computing M1400 Tablet PC Addendum. Motion Computing, Inc. Jul. 2004; 5 pages.
[No Author Listed] Motion Computing M1400 Tablet PC User Guide. Motion Computing, Inc. Mar. 2004, 89 pages.
[No Author Listed] Panasonic CF-19 Operating Instructions. Panasonic. 2006, 40 pages.
[No Author Listed] Panasonic CF-T8 Operating Instructions. Panasonic. 2008, 40 pages.
[No Author Listed] Sony Vaio VGN-UX280P (UX Series MicroPC) Spec Sheet. Sony Corporation. Aug. 23, 2006, 2 pages.
[No Author Listed] Windows Special Folder. Wikipedia. https://en.wikipedia.org/w/index.php?title=Special_folder&oldid=77102597. Last accessed Mar. 17, 2021, 4 pages.

(56) References Cited

OTHER PUBLICATIONS

[No Author Listed], All-New Litl Webbook Debuts at 2010 CES. Cision. Jan. 5, 2010. URL:https://www.prnewswire.com/news-releases/all-new-litl-webbook-debuts-at-2010-ces-80716797.html [last accessed Jun. 25, 2021].
[No Author Listed], Dell Latitude XT Quick Reference Guide. Dec. 2007; 234 pages.
[No Author Listed], Dell Latitude XT User's Guide. May 2008; 248 pages.
[No Author Listed], Designing for Direct Manipulation. Microsoft Corporation. Mar. 3, 2008; 4 pages.
[No Author Listed], Litl Webbook Beats ChromeOS, Becomes First Cloud Computer. CoolThings. Nov. 16, 2009. URL:https://www.coolthings.com/litl-webbook-beats-chromeos-becomes-first-cloud-computer/ [last accessed Jun. 25, 2021].
[No Author Listed], Microsoft Computer Dictionary Fifth Edition. Microsoft Press. 2002; 648 pages.
[No Author Listed], The Litl webbook. European Consumers Choice. URL=https://www.europeanconsumerschoice.org/hi-tech/litl-webbook-computer-test-and-reviews/ [last accessed Jun. 25, 2021].
[No Author Listed], The Windows Interface Guidelines for Software Design. Microsoft Press. 1995.
[No Author Listed], The Windows Interface Guidelines—A Guide for Designing Software. Microsoft Windows. Microsoft Corporation. Feb. 1995.
[No Author Listed], Toshiba Satellite A300/A300D Satellite Pro A300/A300D Portable Person Computer User's Manual. Toshiba Corporation. 2008; 226 pages.
Bartlett, Rock 'n' Scroll is Here to Stay. Compaq. Western Research Laboratory. 2000; 9 pages.
Clifford et al., Measuring Tilt with Low-g Accelerometers. Sensors. Freescale Semiconductor. Application Note. AN3107. May 2005; 8 pages.
Franks et al., HTTP Authentication: Basic and Digest Access Authentication. The Internet Society. 1999.
Hardy, Lenovo ThinkPad X61 Tablet PC Review. Jun. 12, 2007; 12 pages. tabletpcreview.com/tabletreview/lenovo-thinkpad-x61-tablet-pc-review.
Hinckley et al., Sensing Techniques for Mobile Interaction. ACM UIST 2000. Symposium on User Interface Software and Technology. CHI Letters. 2000; 2(2): 91-100.
Karp et al., Excerpts of Windows XP in a Nutshell Second Edition. O'Reilly Media, Inc. Feb. 2005, 14 pages.
Leonhard, Excerpts of Windows XP Hacks & Mods: For Dummies. Wiley Publishing, Inc. 2005, 46 pages.
McDonald, LiTL Webbook Review. Little Tech Girl. Aug. 31, 2010. URL:https://littletechgirl.com/2010/08/31/litl-webbook-review/ [last accessed Jun. 25, 2021].
Noe, The Litl Webbook: A more social computing device. Nov. 5, 2009. Core77. URL:https://www.core77.com/posts/15122/The-Litl-Webbook-A-more-social-computing-device [last accessed Jun. 25, 2021].
Pogue, Windows XP Home Edition: The Missing Manual, Second Edition. O'Reilly Media, Inc. Dec. 2004.
Ride, MIT's $100 Laptop. TechPowerUp. Sep. 29, 2005; 4 pages. https://www.techpowerup.com/5512/mits-uds-100-laptop.
Russinovich et al., Microsoft Windows Internals 4th Edition. Microsoft Press. 2005.
Saxena, Ces 2010: All New Litl Webbook Makes Its Debut Appearance. Elite Choice. URL:https://elitechoice.org/luxury/ces-2010-all-new-litl-webbook-makes-its-debut-appearance [last accessed Jun. 25, 2021].
Schwartz, Organizing and Editing Your Photos with Picasa. Visual QuickProject Guide. 2005.
Scinto, Introducing The Litl WebBook. The Gadgeteer. Nov. 19, 2009. URL:https://the-gadgeteer.com/2009/11/19/introducing-the-litl-webbook/ [last accessed Jun. 25, 2021].
Strauss, Litl Webbook Re-Defines Computing. ABC News. Dec. 14, 2009. URL:https://abcnews.go.com/Technology/GadgetGuide/litl-webbook-defines-computing/story?id=9311095 [last accessed Jun. 25, 2021].
European Communication dated Sep. 13, 2021 in connection with European Application No. 19190053.9.
U.S. Appl. No. 60/946,970, filed Jun. 28, 2007, Ording et al.
Affidavit of Nathaniel E. Frank-White signed Jan. 26, 2022. 21 pages.
Canadian Office Action dated Mar. 23, 2022, in connection with Canadian Application No. 3,028,799.
Certified English Translation of JP H6-242853 ("Shimura").
Certified English Translation fo JP2005-71297A ("Kanamori").
Certified English Translation of CN 2627170Y ("CN'170") (Ruijiang).
Decision Denying Institution of Inter Partes Review of U.S. Pat. No. 8,624,844 B2, Issued Oct. 21, 2021, *Lenovo (United States) Inc.* v. *Litl LLC*, IPR2021-00822 (PTAB). 15 pages.
Declaration of Dan Fauxsmith, VP of Publishing Operations at O'Reilly Media, Inc. ("Fauxsmith"), signed Jan. 27, 2022. 5 pages.
Declaration of Christopher M. Schmandt signed Feb. 24, 2022. 156 pages.
King, Litl Webbook price drops from $699 to $399. ZDNet.May 16, 2010 URL: https://www.zdnet.com/article/litl-webbook-price-drops-from-699-to-399.
First Amended Complaint. *Litl LLC* v. *Lenovo (United States), Inc et al.* No. DDE-1-20-cv-00689 (U.S. Dist. Ct., Dist. Deleware). 165 pages.
File History of U.S. Pat. No. 8,624,844 dated Jan. 7, 2014. 1439 pages.
File History Excerpts of European Application No. 09727165.4 Patented as EP 2283407 B1. 49 pages.
Murph, Little Webbook plummets from $699 to $399, still can't catch an eye. May 16, 2010, 3 pages URL: https://www.engadget.com/2010-05-16-litl-webbook-plummets-from-699-to399-still-cant-catch-an-ey.html.
Pogue, Windows Vista: The Missing Manual, 1st edition, 2nd printing, published Feb. 2007. Pogue Press. O'Reilly. Excerpts. 120 pages.
International Search Report dated Mar. 6, 2009, in connection with International Application No. PCT/US2009/038599.

\* cited by examiner

(Rotated browser window 600, labeled 602)

Web address bar with navigation buttons; tabs: share, bookmarks, more; buttons: close, bookmark this web card

- Blockbuster Online - Welcome to Blockbuster Online
- Welcome to Webkinz - a Ganz website
- Encyclopedia - Britannica Online Encyclopedia
- Cabela's Official Website - Quality Hunting, Fishing, Campin...
- Club Penguin - Waddle around and meet new friends!
- Disney.com | The Official Home Page For All Things Disney
- Yahoo! Mail (claudiamitchell66)
- Parents - Pregnancy, Babies, Baby Names, Pregnancy Cale...
- Arlington Heights Weather Forcast and Conditions
- J.Crew - Cashmere, Sweaters, Woman's Clothing & Weddin...
- Travelocity Travel: Cheap Airfare, Hotels, Flights, V...
- Yahoo! Groups - Join or create groups, clubs, forums & com...
- Arlington Heights School District 25
- FlyFish.com Forums (Powered by Invision Power Board)
- Hulu - Astro Boy
- iCarly.com

- Bank of America | Home | Personal
- KODAK Gallery: Print, Store & Share Digital Photos - Order ...
- Lego.com The Official Web Site of LEGO products!
- Yahoo! Mail (ambermitch)
- PBS KIDS
- Women's & Men's Clothes: Plus Size, Maternity, Baby & Kid...
- Reviews of vacations, hotels, resorts, vacation and travel p...

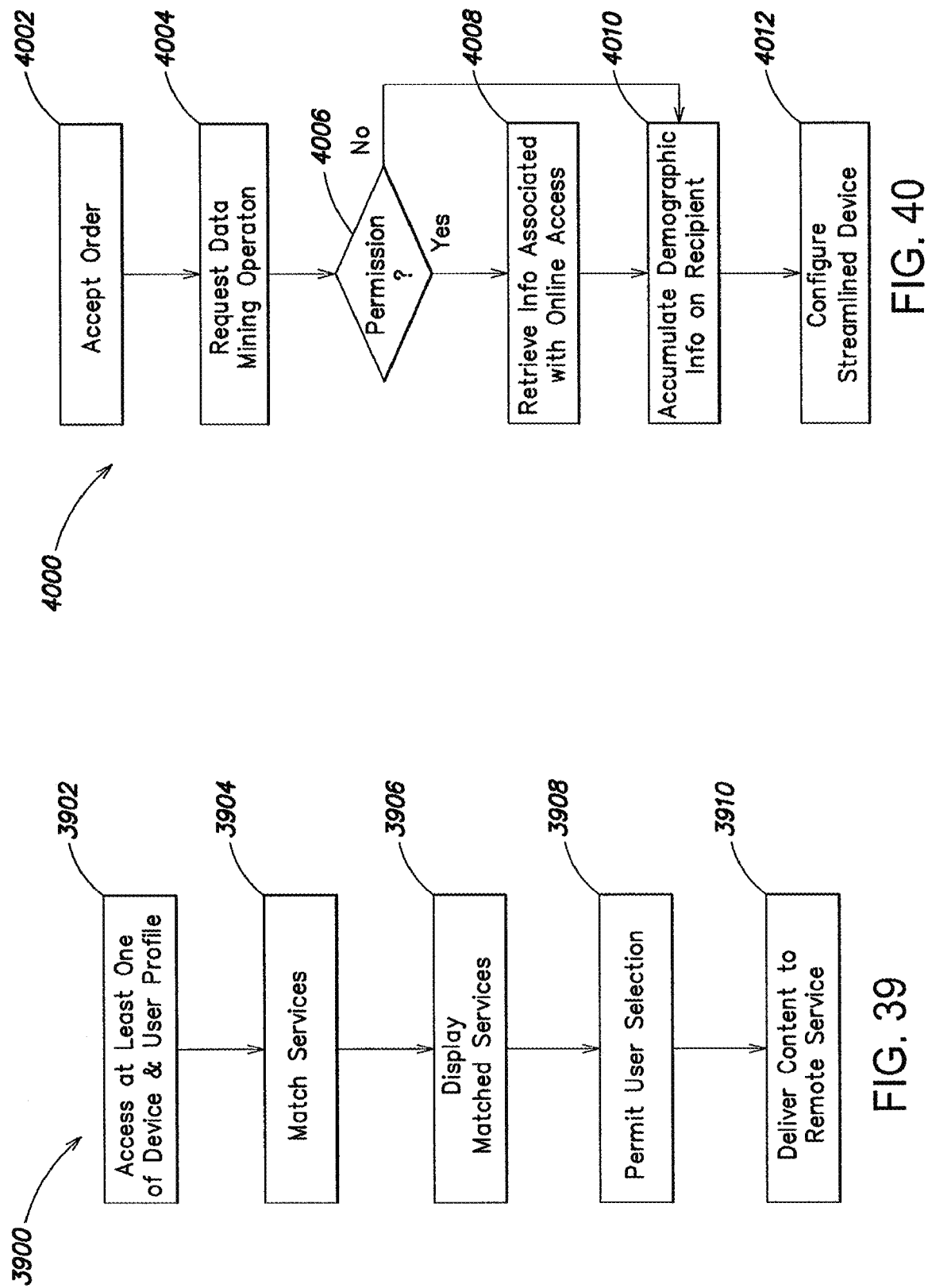

FIG. 41B

SYSTEM AND METHOD FOR STREAMLINING USER INTERACTION WITH ELECTRONIC CONTENT

RELATED APPLICATIONS

This application is a Continuation of U.S. application Ser. No. 15/858,955, filed Dec. 29, 2017, entitled "SYSTEM AND METHOD FOR STREAMLINING USER INTERACTION WITH ELECTRONIC CONTENT", which is a Continuation of U.S. application Ser. No. 14/680,422, filed Apr. 7, 2015, entitled "SYSTEM AND METHOD FOR STREAMLINING USER INTERACTION WITH ELECTRONIC CONTENT", which is a Continuation of U.S. application Ser. No. 12/416,496, filed Apr. 1, 2009, entitled "SYSTEM AND METHOD FOR STREAMLINING USER INTERACTION WITH ELECTRONIC CONTENT", which is a Continuation-in-part of U.S. application Ser. No. 12/170,939, filed Jul. 10, 2008, entitled "PORTABLE COMPUTER WITH MULTIPLE DISPLAY CONFIGURATIONS", which is a Non-Provisional of Provisional (35 USC 119(e)) of U.S. Application Ser. No. 61/041,365, filed Apr. 1, 2008, entitled "PORTABLE COMPUTER WITH MULTIPLE DISPLAY CONFIGURATIONS". Application Ser. No. 12/416,496 is a Continuation-in-part of U.S. application Ser. No. 12/170,951, filed Jul. 10, 2008, entitled "PORTABLE COMPUTER WITH MULTIPLE DISPLAY CONFIGURATIONS", which is a Non-Provisional of Provisional (35 USC 119(e)) of U.S. Application Ser. No. 61/041,365, filed Apr. 1, 2008, entitled "PORTABLE COMPUTER WITH MULTIPLE DISPLAY CONFIGURATIONS". Application Ser. No. 12/416,496 is a Non-Provisional of Provisional (35 USC 119(e)) of U.S. Application Ser. No. 61/041,365, filed Apr. 1, 2008, entitled "PORTABLE COMPUTER WITH MULTIPLE DISPLAY CONFIGURATIONS". The entire contents of these applications are incorporated herein by reference in their entirety.

BACKGROUND

Much of the advancement in contemporary computer systems and services stems from the significant increases in computing power. Hand in hand with those increases, enhanced features sets have developed designed to utilize that computing power. Conventional wisdom suggests that the more features that can be provided to a particular computer user, the better the user's experience will be.

As computers have become more powerful and capable of providing more and more features, ordinary/typical computer users has not been able to keep up with availability of features and services. User may become frustrated by the inability to navigate the myriad (sometime unending) configurations and options provided in order to achieve something useful and/or workable to their ordinary use. Many users simply don't take advantage of provided features. Some outright ignore options and features that would simplify the use of their computer system. This may occur because of user ignorance or even fear and in some instances because the user lacks experience with new features—so the user doesn't know the feature can be useful.

User frustration is felt not only with respect to the newer more powerful computer systems being offered today, but also frustration abounds with respect to their computer's interaction with the Internet. The present movement on the Internet, often referred to as Web 2.0, also subscribes to conventional thinking in that more and more features are being packed into each and every aspect of the web experience. Third party service providers can be found for almost any service—virtually no limitations have been found for the services that can be provided.

More typically, these on-line services provide very useful opportunities for the users who know how to take advantage of them—online photo management/sharing, online financial services, online marketplaces, online exchanges, web hosting, web development, dating services, social networking to name only a few. Very often these on-line services can be found for free or minimal costs. Typically, registration is the only requirement for participating in what is offered as free services. In other words, all that is required is the creation of a user name and password. Each service often attempts to outdo competitors by offering more and more options/features than their competitors.

SUMMARY

It is realized that the conventional wisdom with respect to such "feature packing" as discussed above suffers from significant flaws. Typical computer users simply can't take advantage of all the functionality offered, either the services and features offered by their own computer, or the services and features offered by online providers. The complexity of the interface (both hardware and software) hampers adoption, as does the volume of features offered. For example, third party service provides often find difficulty in subscribing new users, educating existing users, and providing integration of feature sets for the features they provide as well as those offered by other service providers.

Further complicating the user's interaction with computer devices and provided services is the inflexibility of the devices being used and their accompanying interfaces. It is realized that a device that can provide a user with a flexible portal into electronic content, that is, one that can be configured dynamically improves the user experience. For example, permitting transitions from a "lean back" mode of viewing (imagine, for example, a person watching television from their couch) to a "lean forward" mode of viewing (picture, for example, a laptop user typing away in a word processing application) on a computer device improves the user experience. Further, user interfaces that are responsive to the user's dynamic configurations improve the user's ability to interact with the electronic content, from the machine itself, the internet, and even from both sources.

Accordingly, aspects and embodiments are directed to a graphical user interface that organizes interface elements into modes of content for presentation to a user. Different views of the modes of content are used to present the user with an interface that is responsive to configurations of the device and responsive to activity being performed by the user. Further the elements that comprise the graphical user interface are configured to present a summarized view of available actions and content, in order to simplify user interaction. The different views present different organizations of the interface elements and in some example display only certain ones of the modes of content in order to reduce the number of options a user must navigate to accomplish an objective.

According to one aspect of the present invention, a customized user interface for a computer system with a plurality selectable I/O profiles configured to present computer operations to a user in a format configured to a selected I/O profile is provided. The user interface comprises a map based graphical user interface displayed on the computer system, the map based user interface comprising a plurality of views of a plurality of visual representations of computer content, wherein the computer content includes at least one of selectable digital content, selectable computer operations and passive digital content, and the plurality of visual representations of computer content rendered on the computer display, wherein the plurality of visual representations of computer content include an association to a first view of the plurality of views, the first view including the computer content, and wherein the each of the plurality of visual representations is responsive to focus and execution, wherein execution includes clicking on the visual representation, and an execution component comprising at least one computer hardware element configured to transition the computer system display between the plurality of views, wherein the execution component further comprises a view selector component configured to select one of the plurality of views for display on a computer system in response to a computer system configuration. According to one embodiment of the present invention, the execution component is further configured to transition between the plurality of views in response to execution of at least one of a computer system operation, a visual representation, a computer system configuration, and a change in computer system configuration. According to another embodiment of the invention, the user interface further comprises a plurality of modes of content for the computer content rendered on the computer display.

According to one aspect of the present invention, the plurality of views are configured to organize modes of content into different views. According to another embodiment of the invention, the plurality of modes of content comprise at least one of a web content mode, a channel content mode, a media content mode, an application content mode, a communication content mode, and a passive content mode. According to another embodiment of the invention, the plurality of modes of content include a web content mode, wherein the web content mode is configured to display web based content for proximal viewing by a user. According to another embodiment of the invention, the plurality of modes of content include a channel content mode, wherein the channel content mode is configured to display web based content for non-proximal viewing by a user. According to another embodiment of the invention, the plurality of modes of content include a media content mode, wherein the media content mode is configured to display media based content for non-proximal viewing by a user mode. According to another embodiment of the invention, the plurality of modes of content include a web content mode, wherein the web content mode is optimized to display web based content for proximal viewing by a user. According to another embodiment of the invention, the plurality of modes of content include a channel content mode, wherein the channel content mode is optimized to display web based content for non-proximal viewing by a user. According to another embodiment of the invention, the plurality of modes of content include a media content mode, wherein the media content mode is optimized to display media based content for non-proximal viewing by a user mode.

According to one embodiment of the present invention, the media based content includes at least one of digital photos, digital audio files, and digital video files. According to another embodiment of the invention, the media based content is accessed through a remote service. According to another embodiment of the invention, the plurality of modes of content include a connect content mode, wherein the connect content mode is configured to display computer configuration operations for viewing by a user. According to another embodiment of the invention, the plurality of modes of content include an application content mode, wherein the application content mode is configured to display computer applications for use by a user. According to another embodiment of the invention, in the plurality of views includes a home view configured to organize a plurality of content modes. According to another embodiment of the invention, the plurality of views includes a channel view configured to organize a single content mode. According to another embodiment of the invention, the plurality of views includes a channel view configured to organize dual content modes. According to another embodiment of the invention, the plurality of modes of content include a passive content mode, wherein the passive content mode is configured to display web based content for non-proximal viewing without user interaction.

According to one embodiment of the present invention, the plurality of modes of content include a passive content mode, wherein the passive content mode is optimized to display web based content for non-proximal viewing without user interaction. According to another embodiment of the invention, the plurality of views includes a screen saver view configured to organize selected content modes for passive viewing. According to another embodiment of the invention, the plurality of views further comprise a first layer, wherein the first layer organizes computer operations, including navigation operations, into groups based on similar functional operation. According to another embodiment of the invention, the first layer maps to groupings of lower level functionality. According to another embodiment of the invention, the first layer include navigation operations maps to a seconding layer comprising computer operations for interacting with computer content. According to another embodiment of the invention, levels of computer functions are segregated based on proximity of the operation to a source of digital content, higher levels including operations that navigate to lower level operations that permit interaction with computer content.

According to one embodiment of the present invention, the first layer comprises a home view and a channel view, and the first layer is further configured to organize and simplify access to lower level functions. According to another embodiment of the invention, the visual representations comprise a lower layer relative to the first layer and include lower level functions. According to another embodiment of the invention, the plurality of views includes a home view organizing a plurality of visual representations of digital content, wherein the home view is displayed responsive to a computer system configuration. According to another embodiment of the invention, the computer system configuration comprises a physical positioning of the computer system about a longitudinal axis of rotation. According to another embodiment of the invention, the computer system configuration further comprises a physical positioning of a computer system display relative to a base of the computer system. According to another embodiment of the invention, the home view comprises a header display and a body display. According to another embodiment of the invention, the header display comprises a lateral bar extending from the left of the computer display screen to the right of the computer display screen. According to another embodiment of the invention, the user interface further comprises a search tool displayed in the header display, wherein the search tool is configured to accept search terms entered by a user and in response to execution, causes the computer system to navigate to a view of a first visual representation of digital content, wherein the digital content includes a search engine, and the search engine presents results for the search terms.

According to one embodiment of the present invention, the user interface further comprises a storage component configured to retain a previous view state. According to another embodiment of the invention, the execution component is further configured to cause the computer system to transition to a previous view in response to execution of a navigation element by a user. According to another embodiment of the invention, the user interface further comprises a navigation element disposed in the header display. According to another embodiment of the invention, the body display is rendered below the header display in the display screen of the computer system. According to another embodiment of the invention, the body comprises an organization of the plurality of visual representations of computer content rendered on the computer display. According to another embodiment of the invention, the user interface further comprises a display threshold for a screen rendered in the computer display. According to another embodiment of the invention, the home view is configured into pages based on the display of the computer system and the display threshold. According to another embodiment of the invention, the display threshold establishes a maximum number of visual representations display per page of the home view. According to another embodiment of the invention, the user interface further comprises an indication of visual representations displayed on adjacent pages of the home view, wherein the indication is display within the body of the home view.

According to one embodiment of the present invention, the user interface further comprises a nascent card displayed in the body of the home view, wherein the nascent card is configured to permit generation of additional visual representations of digital content. According to another embodiment of the invention, the execution component is further configured to execute a process for creating a visual representation in response to execution of the nascent card, wherein the process for creating a visual representation includes acts of transitioning to a quick access view, generating a mapping to online digital content, executing the mapping, and displaying a first view of the mapped digital content. According to another embodiment of the invention, the user interface further comprises a quick access view, wherein the quick access view is configured to permit user generation of a mapping between digital content and a visual representation. According to another embodiment of the invention, the quick access view permits a user to select from a display of frequently accessed web content to generate the mapping. According to another embodiment of the invention, the quick access view permits a user to select from a display of stored bookmarks to generate the mapping. According to another embodiment of the invention, the quick access view permits a user to enter a url to generate the mapping. According to another embodiment of the invention, the plurality of views includes a channel view, and the view selector component is further responsive to an integrated scroll wheel on the computer system. According to another embodiment of the invention, the view selector component is further configured to transition the computer system to the channel view in response to manipulation of the integrated scroll wheel.

According to one embodiment of the present invention, the channel view further comprises a channel selector. According to another embodiment of the invention, the channel selector comprises a display of a sequence of visual representations presenting a channel content mode. According to another embodiment of the invention, the display of the sequence of visual representations is responsive to manipulation of the integrated scroll wheel, and manipulation of the integrated scroll wheel causes the computer system to render a next visual representation in the display of the sequence of visual representations. According to another embodiment of the invention, the visual representations are responsive to execution by a selector, including a button. According to another embodiment of the invention, the button is available in a plurality of computer system configurations. According to another embodiment of the invention, the execution component is further configured to cause the computer system to transition to the first view including the digital content in response to execution of the selector by a user. According to another embodiment of the invention, the user interface further comprises a storage component configured to retain a current computer system configuration state.

According to one embodiment of the present invention, the storage component is further configured to retain a current view state. According to another embodiment of the invention, the execution component is further configured to transition the computer system display between the plurality of views, responsive to at least one of the current computer system configuration state and the current view state. According to another embodiment of the invention, the execution component is configured to transition to a channel view in response to manipulation of an integrated scroll wheel, when the computer system is in a laptop and an easel configuration. According to another embodiment of the invention, the user interface further comprises a scroll wheel threshold configured to require additional manipulations of the integrated scroll in order to cause the transition to the channel view, when the current computer system configuration state indicates the computer system is in a laptop configuration. According to another embodiment of the invention, the execution component is further configured to transition from the first view and a home view to a channel view in response to a change in computer system configuration state from laptop to easel.

According to another embodiment, the interface discussed above is displayed on a portable computer configurable between a plurality of display modes including a closed mode, a laptop mode and an easel mode. The portable computer further comprises a display component including a display screen, a base, a hinge assembly at least partially housed within the base and configured to pivotably couple the display component to the base, wherein the display component is rotatable about a longitudinal axis running along an interface between the display component and the base, wherein, in the closed mode, the display screen is disposed substantially against the base, wherein rotating the display component about the longitudinal axis up to approximately 180 degrees from the closed mode configures the portable computer into the laptop mode, and wherein rotating the display component about the longitudinal axis beyond approximately 180 degrees from the closed mode configures the portable computer into the easel mode.

According to one aspect of the present invention, a method for presenting a customized user interface for a computer system with a plurality selectable I/O profiles to a user is provided. The method comprises displaying a map based graphical user interface on the computer system, the act of displaying the map based user interface includes acts of displaying a plurality of views of a plurality of visual representations of computer content, wherein the computer content includes at least one of selectable digital content, selectable computer operations and passive digital content, and displaying the plurality of visual representations of computer content rendered on the computer display, wherein the plurality of visual representations of computer content include an association to a first view of the plurality of views, the first view including the computer content, and wherein the each of the plurality of visual representations is responsive to focus and execution, wherein execution includes clicking on the visual representation, and executing, by a computer processor, a transition in the computer system display between the plurality of views, wherein the act of executing includes an act of selecting one of the plurality of views for display on a computer system in response to a computer system configuration. According to one embodiment of the present invention, the act of executing occurs in response to an act of permitting execution of at least one of a computer system operation, a visual representation, a computer system configuration, and a change in computer system configuration. According to another embodiment of the invention, the method further comprises an act of displaying a plurality of modes of content for the computer content on the computer display, wherein the plurality of modes of content comprise at least one of a web content mode, a channel content mode, a media content mode, an application content mode, a communication content mode, and a passive content mode.

According to one embodiment of the present invention, the plurality of views are configured to organize modes of content into different views. According to another embodiment of the invention, the web content mode is configured to display web based content for proximal viewing by a user, wherein the channel content mode is configured to display web based content for non-proximal viewing by a user, wherein the media content mode is configured to display media based content for non-proximal viewing by a user mode, wherein the application content mode is configured to display computer applications for use by a user, wherein the communication content mode is configured to display computer configuration operations for viewing by a user, and wherein the passive content mode is configured to display web based content for non-proximal viewing without user interaction. According to another embodiment of the invention, in the plurality of views includes a home view and a channel view, and the method further comprises acts of organizing a plurality of content modes into the home view; and organizing at least one of a single content mode and a two content modes into the channel view. According to another embodiment of the invention, the plurality of views includes a screen saver view, and the method further comprises an act of organizing selected content modes for passive viewing in the screen saver view.

According to one embodiment of the present invention, the plurality of views includes a home view, and the method further comprises organizing a plurality of visual representations of digital content into the home view, wherein the home view is displayed responsive to a computer system configuration, displaying the home view in response to a compute system configuration, wherein the act of displaying the home view includes an act of displaying a header display and a body display in the home view, wherein the header display comprises a lateral frame extending from the left of the computer display screen to the right of the computer display screen, and wherein the body display is rendered below the header display in the display screen of the computer system.

According to another embodiment of the invention, the computer system configuration comprises a physical positioning of the computer system display relative to a base of the computer system about a longitudinal axis of rotation. According to another embodiment of the invention, the method further comprises displaying a search tool in the header display, accepting entry of search terms through an I/O device, navigating to a view of a first visual representation of computer content, wherein the computer content includes a search engine, and the search engine presents results for the search terms, in response to an act of executing the search tool. According to another embodiment of the invention, the method further comprises an act of storing in a computer memory a previous view state. According to another embodiment of the invention, the method further comprises acts of displaying a navigation element in the header display, permitting execution of the navigation element by a user, and transitioning the computer system display to a previous view, in response to the act of permitting.

According to one embodiment of the present invention, the home view further comprises at least one display page and the method further comprising acts of displaying the plurality of visual representations of computer content rendered on the computer display in the body display, and displaying a maximal number of visual representations in a display page of the home view. According to another embodiment of the invention, the method further comprises displaying an indication of visual representations displayed on adjacent display pages in the home view, wherein the indication is displayed within the body of the home view. According to another embodiment of the invention, the method further comprises acts of displaying a nascent card in the body of the home view, permitting execution functionality associated with the nascent card, and generating an additional visual representations of digital content in response to execution of the functionality associated with the nascent card. According to another embodiment of the invention, the method further comprising act of executing a process for creating a visual representation in response to execution of the functionality associated with nascent card, wherein the process for creating a visual representation includes acts of transitioning to a quick access view, generating a mapping to online digital content, executing the mapping, and displaying a first view of the mapped digital content.

According to one embodiment of the present invention, the method further comprises acts of displaying a quick access view, permitting a user to select a source of digital content in the quick access view, and generating a mapping between the source of digital content and a visual representation in response to an act of selecting a source of digital content. According to another embodiment of the invention, the plurality of views includes a channel view, and the act of executing a transition occurs in response an act of activating an integrated scroll wheel on the computer system. According to another embodiment of the invention, the method further comprises an act of displaying a channel selector including an act of displaying a sequence of visual representations. According to another embodiment of the invention, the act of displaying the sequence of visual representations is responsive to manipulation of the integrated scroll wheel, and the method further comprises and act of displaying a next visual representation from the sequence of visual representations, in response to manipulation of the integrated scroll wheel. According to another embodiment of the invention, the method further comprises an act of storing in a computer memory a current computer system configuration state and a current view state. According to another embodiment of the invention, the act of executing, by a computer processor, a transition in the computer system display the execution component, includes an act of transitioning the computer system display between the plurality of views, responsive to at least one of the current computer system configuration state and the current view state.

According to one embodiment of the present invention, the transition occurs to a channel view in response to manipulation of an integrated scroll wheel, when the computer system is in a laptop and an easel configuration. According to another embodiment of the invention, the transition occurs from at least one of the first view and a home view to a channel view in response to a change in computer system configuration state from laptop to easel.

According to one aspect of the present invention, a computer-readable medium having computer-readable signals stored thereon that define instructions that, as a result of being executed by a computer, instruct the computer to perform the method for presenting a customized user interface for a computer system with a plurality selectable I/O profiles to a user as described above is provided.

According to one aspect of the present invention, a system for presenting a customized user interface for a system with a plurality selectable I/O profiles is provided. The system comprises a first user interface component configured to display a plurality of views of a plurality of visual representations of computer content, wherein the computer content includes at least one of selectable digital content, selectable computer operations and passive digital content, a second user interface component configured to display the plurality of visual representations of computer content on the computer display, wherein the plurality of visual representations of computer content include an association to a first view of the plurality of views, the first view including the computer content, and wherein the each of the plurality of visual representations is responsive to focus and execution, wherein execution includes clicking on the visual representation, and an execution component configured to execute a transition in the computer system display between the plurality of views, wherein the execution component further comprises a view selector component act configured to select one of the plurality of views for display on a computer system in response to a computer system configuration. According to one embodiment of the present invention, the execution component is further configured to transition between the plurality of views in response to execution of at least one of a computer system operation, a visual representation, a computer system configuration, and a change in computer system configuration. According to another embodiment of the invention, the second user interface component is further configured to display a plurality of modes of content for the computer content rendered on the computer display, wherein the plurality of modes of content comprise at least one of a web content mode, a channel content mode, a media content mode, an application content mode, a communication content mode, and a passive content mode. According to another embodiment of the invention, the plurality of views are configured to organize modes of content into different views. According to another embodiment of the invention, the web content mode is configured to display web based content for proximal viewing by a user, wherein the channel content mode is configured to display web based content for non-proximal viewing by a user, wherein the media content mode is configured to display media based content for non-proximal viewing by a user mode, wherein the application content mode is configured to display computer applications for use by a user, wherein the communication content mode is configured to display computer configuration operations for viewing by a user, and wherein the passive content mode is configured to display web based content for non-proximal viewing without user interaction.

According to one embodiment of the present invention, the first user interface component is further configured to display a home view configured to organize a plurality of content modes, and a channel view configured to organize at least one of a single content mode and two content modes. According to another embodiment of the invention, the plurality of views includes a screen saver view configured to organize selected content modes for passive viewing. According to another embodiment of the invention, the first user interface component is further configured to display a home view organizing a plurality of visual representations of digital content, wherein the home view comprises a header display and a body display, and wherein the header display comprises a lateral frame extending from the left of the computer display screen to the right of the computer display screen, wherein the body display is rendered below the header display in the display screen of the computer system. According to another embodiment of the invention, the system is configured to permit selection of a computer system configuration, and the computer system configuration comprises a physical positioning of the computer system display relative to a base of the computer system about a longitudinal axis of rotation. According to another embodiment of the invention, the first user interface component is further configured to display a search tool in the header display, wherein the search tool is configured to accept search terms entered by a user, and wherein the execution component is further configured to causes the computer system to navigate to a view of a first visual representation of digital content, wherein the digital content includes a search engine, and the search engine presents results for the search terms in response to execution of the search tool.

According to one embodiment of the present invention, the system further comprises a storage component configured to retain a previous view state. According to another embodiment of the invention, the execution component is further configured to cause the computer system to transition to a previous view in response to execution of a navigation element by a user. According to another embodiment of the invention, the first user interface component further comprises a display of the navigation element in the header display. According to another embodiment of the invention, the body display comprises an organization of the plurality of visual representations of computer content rendered on the computer display, and the home view further comprises display pages in response to a display threshold establishing a maximal number of visual representations displayed per display page. According to another embodiment of the invention, the home view further comprises an indication of visual representations displayed on adjacent display pages of the home view, wherein the indication is displayed within the body of the home view. According to another embodiment of the invention, the second user interface component further comprises a nascent card displayed in the body of the home view, wherein the nascent card is configured to permit generation of additional visual representations of digital content. According to another embodiment of the invention, the execution component is further configured to execute a process for creating a visual representation in response to execution of the nascent card, wherein the process for creating a visual representation includes acts of transitioning to a quick access view, generating a mapping to online digital content, executing the mapping, and displaying a first view of the mapped digital content.

According to one embodiment of the present invention, the first user interface component further comprises a quick access view, wherein the quick access view is configured to permit user generation of a mapping between digital content and a visual representation. According to another embodiment of the invention, the plurality of views includes a channel view, and the view selector component is further responsive to an integrated scroll wheel on the computer system. According to another embodiment of the invention, the view selector component is further configured to transition the computer system to the channel view in response to manipulation of the integrated scroll wheel. According to another embodiment of the invention, the channel view further comprises a channel selector comprising a display of a sequence of visual representations presenting a channel content mode. According to another embodiment of the invention, the display of the sequence of visual representations is responsive to manipulation of the integrated scroll wheel, and manipulation of the integrated scroll wheel causes the computer system to render a next visual representation in the display of the sequence of visual representations. According to another embodiment of the invention, the system further comprises a storage component configured to retain a current computer system configuration state and a current view state. According to another embodiment of the invention, the execution component is further configured to transition the computer system display between the plurality of views, responsive to at least one of the current computer system configuration state and the current view state. According to another embodiment of the invention, the execution component is configured to transition to a channel view in response to manipulation of an integrated scroll wheel, when the computer system is in a laptop and an easel configuration. According to another embodiment of the invention, the execution component is further configured to transition from the first view and a home view to a channel view in response to a change in computer system configuration state from laptop to easel.

According to one embodiment, a portable computer is configurable between various modes, including a closed mode, a laptop mode, an easel mode, a flat mode and a frame mode. The portable computer may comprise a display component including a display screen, a base, and a hinge assembly at least partially housed within the base and configured to pivotably couple the display component to the base. The display component may be rotatable about a longitudinal axis running along an interface between the display component and the base. In the closed mode, the display screen may be disposed substantially against the base, and rotating the display component about the longitudinal axis up to approximately 180 degrees from the closed mode may configure the portable computer into the laptop mode. Rotating the display component about the longitudinal axis beyond approximately 180 degrees axis from the closed mode may configure the portable computer into the easel mode.

In one example of the portable computer, the display component is rotatable about the longitudinal axis up to approximately 320 degrees from the closed mode. In another example, the portable computer comprises a display orientation module that displays content on the display screen in one of a plurality of orientations relative to the longitudinal axis. The orientation of the displayed content may be dependent on the current display mode of the portable computer, or may be configurable responsive to a user input. The portable computer may further comprise a mode sensor which detects a current display mode of the portable computer, and the display orientation module may display content on the display screen in an orientation dependent on the current display mode detected by the mode sensor. Depending on the hinge assembly used, the longitudinal axis may comprises multiple parallel axes, and the hinge assembly may be configured to permit rotation of the display component about any of the multiple parallel axes to configure the portable computer between the plurality of display modes.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 3A-C are screen shots illustrating examples of a graphical user interface showing web page views, according to aspects of the invention;

FIG. 6 is a screen shot illustrating one example of a graphical user interface showing a bookmark view, according to aspects of the invention;

FIG. 7A-B are screen shots illustrating examples of a graphical user interface showing a web page view, according to aspects of the invention;

FIG. 21 is a screen shot illustrating examples of a graphical user interface showing a channel full view, according to aspects of the invention;

FIG. 35 is a screen shot illustrating an example graphical user interface showing a web page view with a download interface, according to aspects of the invention;

FIG. 39 is a flow diagram of one example process for obtaining service access information, according to aspects of the invention;

FIG. 40 is a flow diagram of one example process for pre-configuring a streamlined device, according to aspects of the invention;

FIG. 41B are screen shots illustrating examples of print and download interfaces, according to aspects of the invention;

DETAILED DESCRIPTION

Figure 1:
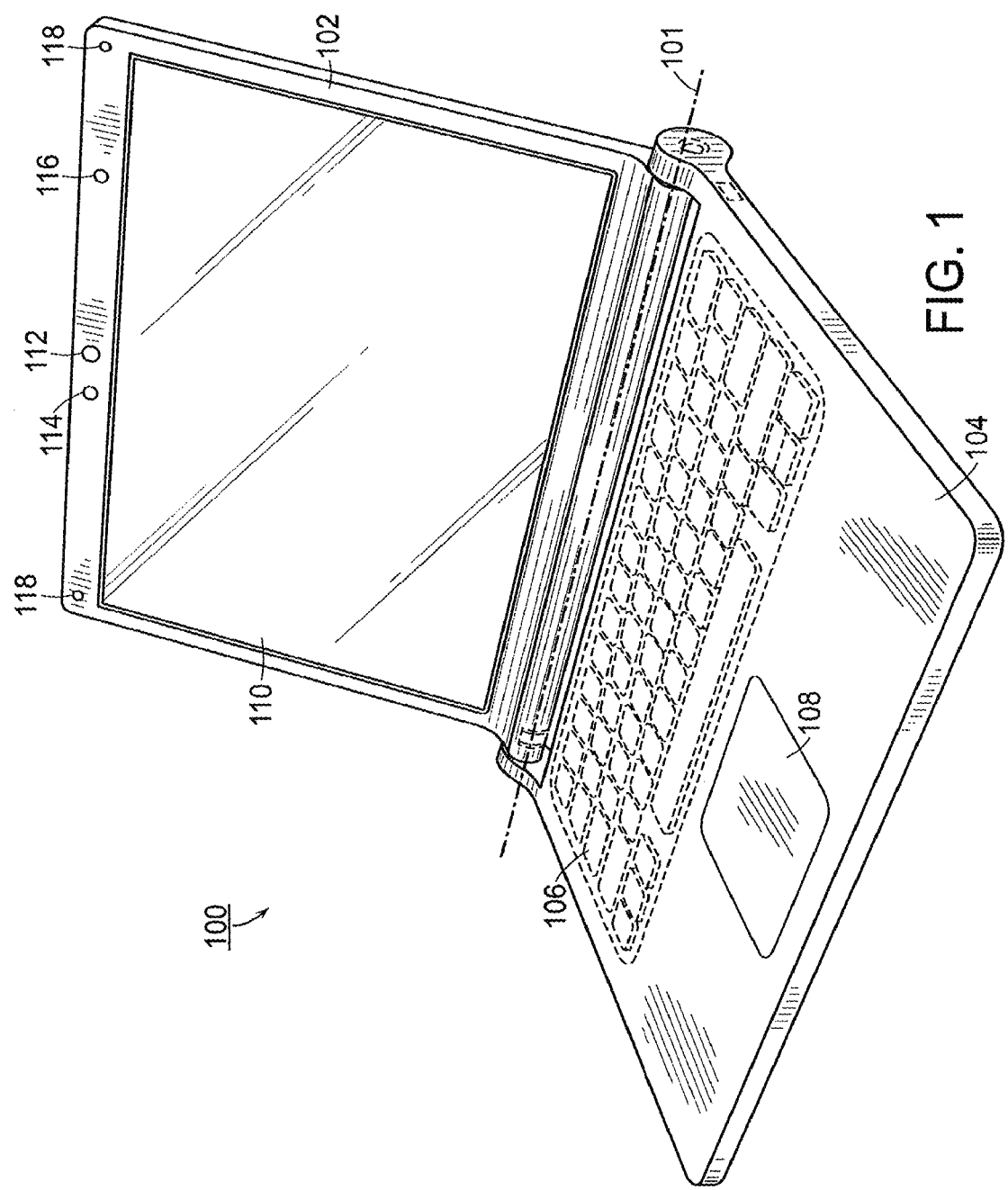
FIG. 1 is an illustration of one example of a portable computer, according to aspects of the invention, in a "laptop" configuration.

It is realized that the conventional wisdom with respect to such "feature packing" as discussed above suffers from significant flaws. Typical computer users simply can't take advantage of all the functionality offered, either the services and features offered by their own computer, or the services and features offered by online providers. The complexity of the interface (both hardware and software) hampers adoption, as does the volume of features offered. For example, third party service provides often find difficulty in subscribing new users, educating existing users, and providing integration of feature sets for the features they provide as well as those offered by other service providers.

Synergy between services providers can be found and exploited by even the most novice user through streamlined computer systems and user interface presentation. According to one aspect, the interplay between various third party services and computer features can be readily appreciated by even the most novice user because the various functionality and features sets are easily accessible through the streamlined access controls and consistent user interfaces. As discussed further below, in one example, the graphical user interface improves transitions from one service to another, through a consistent view of available content. A user is able to navigate easily and quickly from one content provider to another user the organized view. The elements that comprise the view further facilitate navigation and transition by, for example, retaining state information an in another example by remaining persistent to the view.

According to another aspect, streamlining the computer system/device the user interacts with includes establishing a first set of I/O devices that a user needs to operate and providing that first set of I/O devices as a physical configuration of the device. Additionally, providing the user the ability to change from the first set of I/O devices, a first I/O profile, to another at will improves the user experience and permits the user to dynamically select a preferred I/O profile best suited to the user's present need. According to one embodiment, user selection includes transitioning from a lean back mode to a lean forward mode and vice versa. In one embodiment, the user's computer device is configured to have multiple I/O profiles that can be selected by physically manipulating the orientation of the computer device itself.

According to another aspect, streamlining user interactions with the computer system/device includes representing computer based content in visual representations that render computer operations/behavior in a consistent manner. The visual representations are adapted to permit easy user interaction even upon selection of a first I/O profile or the change in selection of an I/O profile. According to one embodiment, the visual representations are rendered as cards, as discussed in more detail below. Different types of cards may be employed to render different types of available content. For example, web based content, may be rendered as a web card (e.g. FIG. 2, 206) that associated with a mapping to web content. Some web cards map directly to web pages and in response to selection of the web card the computer device executes the mapping and displays a web view of the content. Other cards may be used to provide interactive displays selectable by a user. In another example, system operations are displayed as system cards (e.g. FIG. 2, 212), which are associated with mappings to system operations, for example communications configurations, and may comprise a settings card, among other system options. Another type of card includes a channel card (e.g. Fig. configured to stream web based content in a manner that allows for summarization of content, while still providing the ability to fully appreciate the summarized content.

Those skilled in the art will appreciate that previous attempts have been made to present summary views of available content. However, known summarized content typically suffers from significant flaws. For example summarization of web based content simply reduces the display size of the information in the content. With respect to news headlines, for example, this often prevents a user from being able to appreciated the summarize content. Quite simply truncating a headline prevents the user from understanding the context of the portion of the headline s/he is able to read. In other examples, headlines are display to such a reduce size that an average computer user simply cannot read or appreciate them. Using channel cards according to aspects and embodiments, summarized content may be presented in a manner that permits appreciation and interaction with the summarized content itself. In another example, channel card are configured to present a streamlined view that cannot only be appreciated and interacted, but may be transitioned from one mode of viewing to another without loss of the ability to appreciate and interact with the streamlined view.

According to one aspect, streamlining of the user device and streamlining of the user interface provided in such devices leads to simplified interaction between a user and features. The streamlining may impact not only features of the system, but features provided by services accessed by the system. Streamlined activity leads directly to better adoption, understanding and integration of both new and old features available to users. The consistency of user experience even with third party service providers, for example, fosters familiarity not only with a particular user and his/her interactions with a particular device, but also with other users of the same/similar device. A common experience may be created for multiple users, fostering a community experience. According to one example, providing a common experience includes establishing a global profile for a user of a streamlined device. The global profile, in some examples, is retained in remote storage, and accessed upon start up of any streamlined device. The global profile permits the user's experience to be consistent even across multiple streamlined devices. In one example, configurations and customizations are retained in remote storage; changes on one device may be written to remote storage, propagating changes across multiple streamlined devices that access the remote storage. Thus a common experience is also provided across multiple devices.

According to another aspect, the common experience may also include a community aspect. The community aspect includes sharing of content between users, sharing of content and configurations, sharing of content, configurations, and customizations, among many options. In particular, sharing may involve the transmission of user interface elements to other users. In one example, a user may share a card and any of its configurations with another user. Access to the shared user interface elements, in some embodiments, facilitates communal computer usage. In one example, a first user may be watching media on their streamlined device, another user known to the first user, may receive a user interface element that retains information related to the accessed content and information related to the present context. That is for the first user watching a movie, the first user may share the user interface element through which s/he is accessing the move, and permit the another user not only to watch the movie, but to take up the movie at the same point in time, so in essence, they get to enjoy the movie together. Content and context retention by user interface elements that can be shared provides unique advantages to the users of the streamlined devices.

According to another aspect, various operations provides on conventional systems are adapted for streamlined processing. In on example, operations that require large amounts of computer storage are transformed in remote storage requests. In one embodiment, a streamlined device is configured to identify local storage request and transform them into a storage request to an on-line service provider identified in a user and/or device profile. In another embodiment, the system prompts a user to identify a service provider in response to a local request. Various operations may be transformed, including download and print operations, among others.

It is to be appreciated that embodiments of the methods and apparatus discussed herein are not limited in application to the details of construction and the arrangement of components set forth in the following description or illustrated in the accompanying figures. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, and upper and lower are intended for convenience of description, not to limit the present systems and methods or their components to any one positional or spatial orientation.

Device Examples and Configuration Options

Various aspects, including the integration between the user interface, its views, and navigation options are further illustrated in the user device itself. According to one embodiment, the user interface and the visual representations that comprise the interface are configured to be responsive to the physical configuration of the user device. In one example, the view presented to user is configured to be responsive to the mode/configuration of the device.

According to one aspect, systems and methods are provided for simplifying the presentation of multi-media features and options into an integrated and streamlined presentation format. Streamlining presentation includes reducing the number of options that a user must navigate/configure in order to take advantage of new systems and features, simplifying the process of adoption and education. In one embodiment a system is provided with only the physical components necessary to achieve streamlined presentation of both operating system features and integration of third party services. For example, a streamlined hardware device provides for (in comparison to typical desktop and laptop systems) a reduced user input platform as a first I/O profile, comprising in one configuration a scroll wheel and a button interface. Other I/O profiles are available for user selection by manipulation of the device itself. In one embodiment, an easel mode presents the user with the first I/O profile and by rotating the computer device about a longitudinal axis; the user may select a second I/O profile, including a keyboard. The transition from one I/O profile to another may also cause the computer device to alter its display. In one example, the user interface provided to the user is responsive to selection of device mode and/or selection of I/O profile.

It is to be appreciated that reducing the number of I/O device achieves simplicity of design and ease of operation by the user, and at the same time may increase the complexity of the graphical user interfaces needed to support interaction with systems and third parties that anticipate, rely on, or expect additional I/O devices. Streamlining device operation by the user is balanced against sophistication of user the interface required to enable user interaction with the same features used with additional I/O devices. According to one embodiment, the user interface layer provides simplified accessibility based on the device's I/O platform, and for some embodiments, the user interface layer is responsive to device configurations that change the device's I/O capabilities. In other embodiments, the user interface is responsive to changes in the device's mode. In some examples, changes in device mode and changes I/O profile will occur together, however, in other examples a change in mode or a change in I/O profile will not require a corresponding change in profile or mode respectively.

One example of a streamlined device includes a portable computer that is configurable between a laptop mode (in which the portable computer has a conventional laptop appearance) and an easel mode in which the base of the computer and its display component stand upright forming an inverted "V," as discussed further herein. Certain aspects and embodiments are directed to a portable computer that is configurable between different operating modes, including a laptop mode (in which the portable computer has a conventional laptop appearance), a flat mode, a frame mode, and an easel mode in which the base of the computer and its display component stand vertically forming an inverted "V," as discussed further herein. Reference to modes of the computer, modes of the device and intended to include the physical configuration of the portable computer/device.

The portable computer is capable of different display formats and functionality in the different modes, and includes a graphical user interface that may work seamlessly with the computer hardware to provide a unified, comfortable, holistic user experience. In particular, the portable computer may provide access to a wide array of functions, both those traditionally provided by computing devices and those traditionally provided by other passive information devices. For example, the hardware and software, including the graphical user interface, of the portable computer may be focused toward providing access to entertainment media, such as audio and video (e.g., playing music, streaming video, viewing photographs, etc.), email, and internet, while also providing state-of-the-art computer processing capability.

Referring to FIG. 1, there is illustrated one example of a portable computer according to aspects of the invention. In FIG. 1, the portable computer 100 is illustrated in the "laptop" mode, with the display component 102 inclined at a viewing angle from the base 104. The display component 102 is pivotably coupled to the base 104 by a hinge assembly (not shown) that allows the display component to be rotated with respect to the base. The hinge assembly may include a single or multiple hinges, which may be any of a variety of hinge types, including, but not limited to, single-axis hinges, multiple-axis hinges, geared hinges, etc. In one example, the hinge assembly allows the display component 102 to be rotated (or tilted) about a longitudinal axis 101 running along an interface between the display component and the base 104, as illustrated in FIG. 1 and discussed further below. The base 104 includes a keyboard 106 and internal electronic components (not shown), such as a central processing unit, memory, and other components necessary to operate the portable computer, as known to those skilled in the art. In some embodiments, the base 104 may also include a touch pad 108 or trackball (not shown) for receiving user commands, as known to those skilled in the art.

Still referring to FIG. 1, the display component 102 includes a display screen 110, and may also include a camera 112, microphone 114, and infrared receiver 116, as discussed further below. It is to be appreciated that the locations of the camera 112, microphone 114 and infrared receiver 114 are not limited to the example illustrated in FIG. 1, and may be placed in other locations on the display component 102 and/or base 104, as would be recognized by those skilled in the art. The display component 102 may also include cushions 118 that provide soft contact points between the base 104 and the display component 102 when the portable computer is closed. In one example, the cushions 118 are made of rubber. However, it is to be appreciated that the invention is not so limited, and the cushions 118 may comprise materials other than rubber, including, for example, a polymer, felt, or other suitable materials as would be recognized by those skilled in the art.

Figure 4:
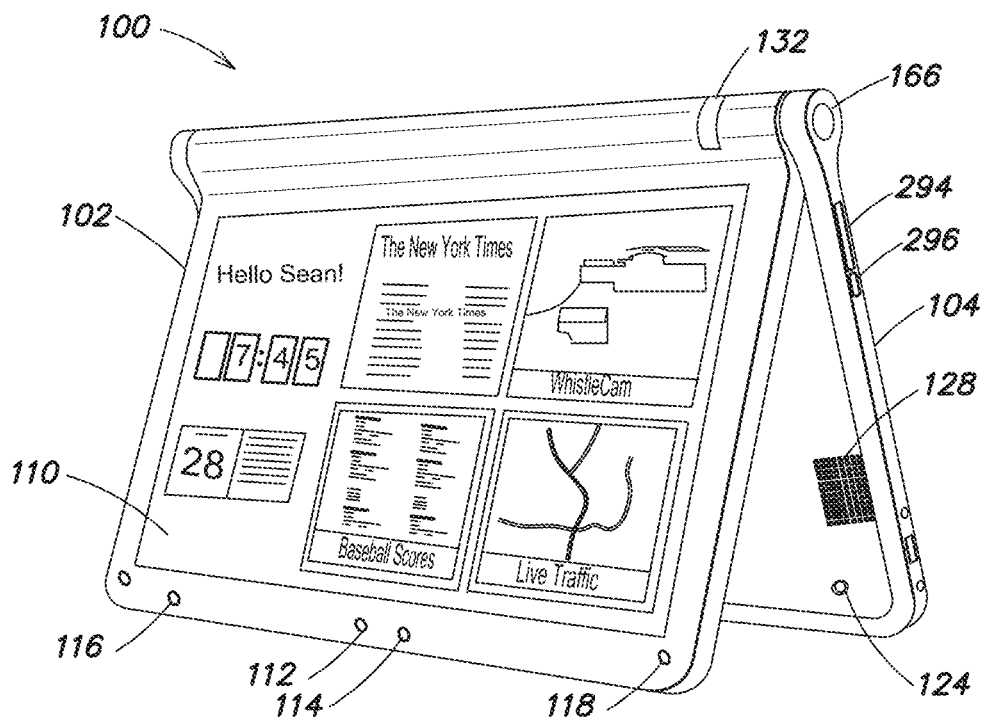
FIG. 4 is a perspective view of the portable computer of FIG. 1 in the easel mode.

Referring to FIG. 4, there is illustrated an example of the portable computer 100 configured into the easel mode. To convert the portable computer 100 from the laptop mode (or closed position) into the easel mode, the display component 102 may be folded away from the base 104, in the same direction as to open the computer (i.e., to configure the computer from the closed position into the laptop mode) such that the base 104 and the display component 102 form an inverted "V" shape with the bottom of the base and the back of the display component face another, as illustrated in FIG. 4. In the easel mode, the display screen 110 is visible and accessible on one side of the portable computer 100 and the keyboard 106 (not shown in FIG. 4) is visible and accessible on the other side.

As illustrated in FIG. 4, in one embodiment, the portable computer may comprise integrated hardware volume controls, including a volume control button 294 and a mute button 296. In one example, the volume control button 294 may be a rocker switch that allows a user to easily increase or decrease the volume of audio played through the speakers 128. When the user presses the volume control button 294, a volume indicator may temporarily appear on the display screen 110, to provide a visual indication of the amount by which the volume is being increased or decreased. Similarly, pressing the mute button 296 may cause a visual indication that the volume is muted to appear on the display screen 110.

According to one embodiment, when the portable computer 100 is configured into the easel mode, the visual display on the display screen 110 is automatically rotated 180 degrees such that the information appears "right-way-up," even through the display screen is upside-down compared to when the portable computer is in the laptop mode. Thus, a user may simply "flip" the portable computer 100 into the easel mode and immediately be able to comfortably view information on the display screen 110, without having to access display screen controls to adjust the orientation of the visual display. In one embodiment, the portable computer 100 includes an orientation (or mode) sensor that is configured to detect whether the portable computer is in the laptop mode or the easel mode, and to adjust the display accordingly. The orientation sensor may be incorporated into the base component 104, for example, underneath the keyboard 106, or into the display component. In one example, locating the orientation sensor in the display component 102, rather than the base 104, may provide more robust detection and therefore, may be presently preferred in some embodiments. The orientation sensor may be used to determine a precise relative orientation of the base component 104 with respect to the display component 102, or vice versa, for example, to determine whether the device is in the laptop mode, easel mode, or some point in between the two modes. In one example, the orientation sensor includes an accelerometer whose output is fed to the computer operating system (or to dedicated logic circuitry) which then triggers a display inversion as appropriate.

According to one embodiment an accelerometer is used to detect a configuration of the portable computer, although, it is to be appreciated that other sensors and devices may be used to determine a configuration. According to another embodiment, the portable computer may include integrated "navigation" hardware that allows a user to easily and comfortably control various features and functions of the portable computer, to manipulate content displayed on the portable computer, and to interact with visual representations of content display in a user interface. For example, as discussed above, the portable computer 100 may comprise a scroll wheel 132 that allows a user to control, adjust and/or select various functionality of the portable computer. According to another embodiment, the scroll wheel 132 may be used to provide "hardware navigation" through information, such as menus, icons, etc., displayed on the display screen 110, as discussed further below with reference to FIG. 17. A common display configuration used in conventional computers is a "desktop" view in which multiple icons representing links to various programs or applications are displayed over a background image. Navigation may be conventionally performed using a mouse, touch pad or trackball, as known to those skilled in the art.

According to another embodiment, the portable computer 100 includes a streamlined graphical user interface that supports "map" navigation. The map user interface provides a clear overview of the entire computing environment and searching capability within the environment that may be accessed using the scroll wheel 132 and, optionally, one or navigation buttons 166, 168 that may be provided on the base 104 of the portable computer 100 (button 166) and/or in the keyboard 106 (button 168), illustrated in FIG. 17. In one embodiment, the map mode of navigation is a hierarchical mode that reduces the number of items to select amongst at any stage of navigation, thereby facilitating user access with the scroll wheel 132 and, optionally, the navigation button(s) 166, 168. Of course, it is to be appreciated that the map user interface may also be navigated using conventional tools, such as a trackball, touchpad, mouse or arrow keys.

Figure 11:
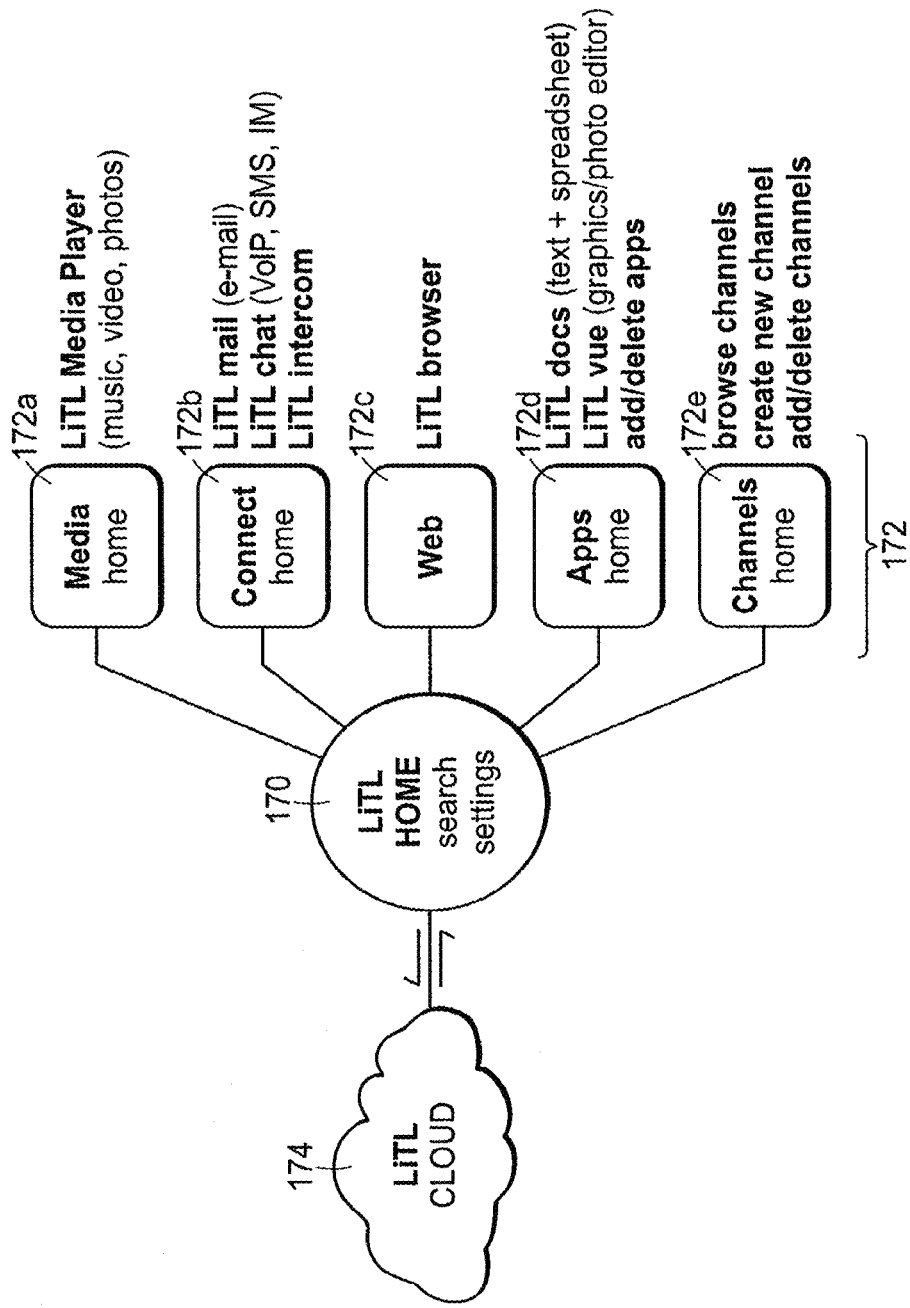
FIG. 11 is a block diagram of one example of a portable computer user interface architecture, according to aspects of the invention.

Referring to FIG. 11, there is illustrated a block diagram of one example of an architecture of the portable computer including a map user interface. The user interface "home" screen 170 that displays a plurality of modes of content 172. In the illustrated example, the home screen 170 contains five modes of content 172; however, it is to be appreciated that the home screen may include more or fewer than five modes of content and that the modes of content may differ from the examples discussed below. According to one example, the modes of content 172 accessible via the home screen 170 may include "media" 172a, "connect" 172b, "web" 172c, "applications" 172d, and "channels" 172e. Using the map user interface, information, programs, features and applications may be grouped into the various modes of content 172. By selecting any mode of content 172, for example, by using the scroll wheel 132 and/or navigation buttons 166, 168, as discussed further below, the user may access the content organized within that mode.

For example, the media mode 172a may provide access to a medial player to play, view, search and organize media such as music, video, photos, etc. The connect mode 172b may provide access to features such as, for example, email, voice-over-IP, instant messaging, etc., and the web mode 172c may provide access to internet browsing and searching. The application mode 172d may provide access to, for example, computer applications or programs, such as word processor, spreadsheet, calculator, etc. In one example, these applications or programs may be provided as web-based services rather than programs or applications residing on the portable computer 100. The channels mode 172e may provide access to different functionality of the portable computer, with the different functions or features defined as different channels. For example, a channel may include an alarm clock channel in which the portable computer is configured to display a clock and can be programmed to activate an alarm, e.g., a sound, piece of music, etc., at a predetermined time. Another example of a channel may include a "photo frame" channel in which the portable computer may be configured to display a pre-selected image or set of images, etc. Another example of a channel is a "television" channel, in which the portable computer is configured to stream Internet television. In one example, a user may configure particular Internet television channels (e.g., a news channel, a movie channel, a home and garden channel, etc.) into sub-channels within the channels mode of content 172(e). Some or all of the modes of content 172 may access, retrieve and/or store information on the Internet 174.

Typically streamlined devices are integrated with remote content storage and/or access, shown at 174. The integration may be provided through third party service providers, in one example photo service FLICKR is integrated with various aspects of the device and/or the device's user interface to provide seamless access to photo content stored by the third party provider. The integration with remote storage services permits reduced storage capacity on the user device, for example, a portable computer. Other services may be integrated including for example GOOGLE DOCS, for word processing and other office related applications provided on-line. Reducing and/or eliminating the need for non volatile memory in the computer system is advantageous in that the device itself may be reduced in complexity and any associated cost. In some embodiments, a streamlined device doe not incorporate a hard disk drive for storage, providing for any local storage requirement through RAM and Flash memory.

Figure 12:
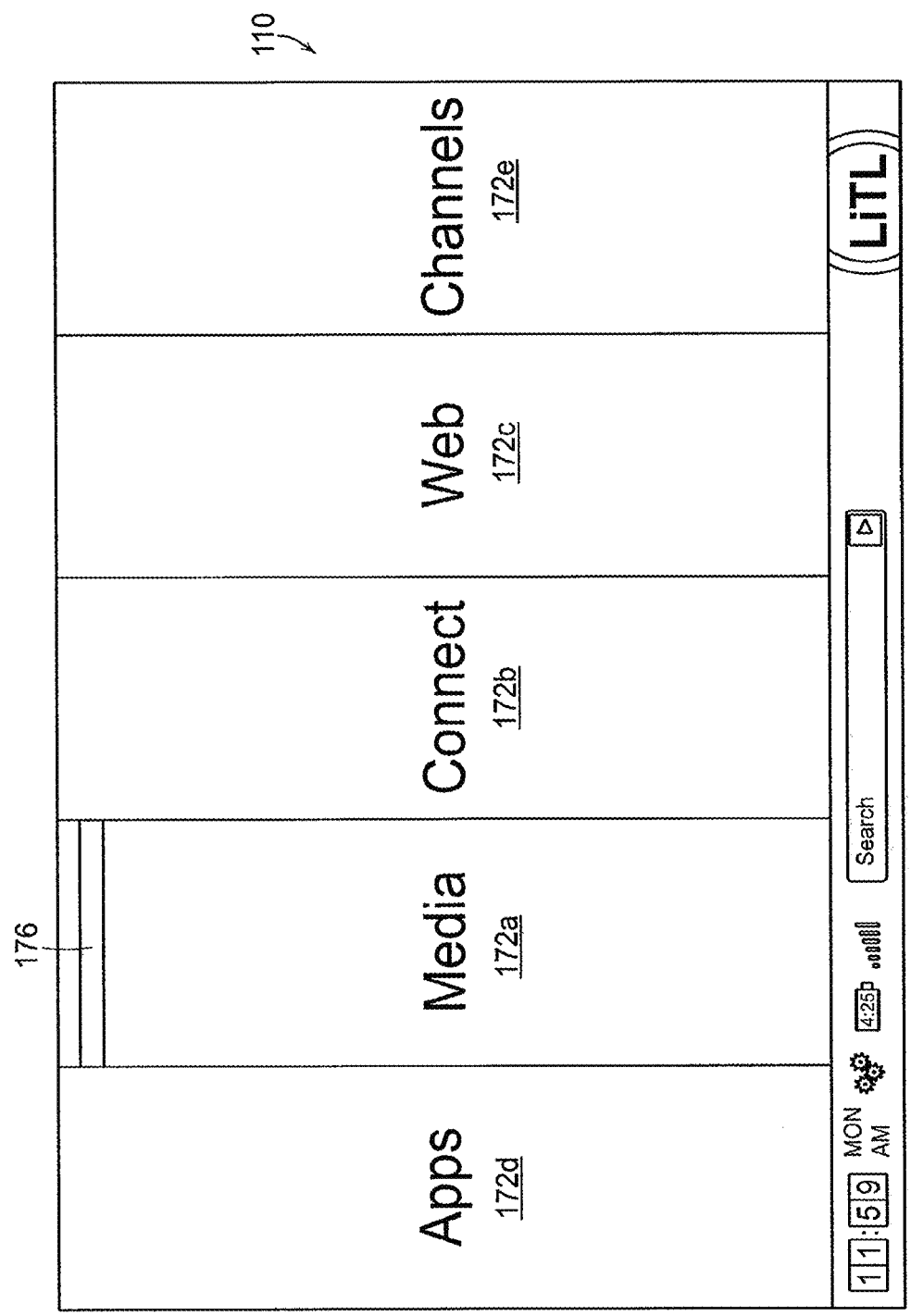
FIG. 12 is a screen shot illustrating one example of a graphical user interface, according to aspects of the invention.
Figure 13:
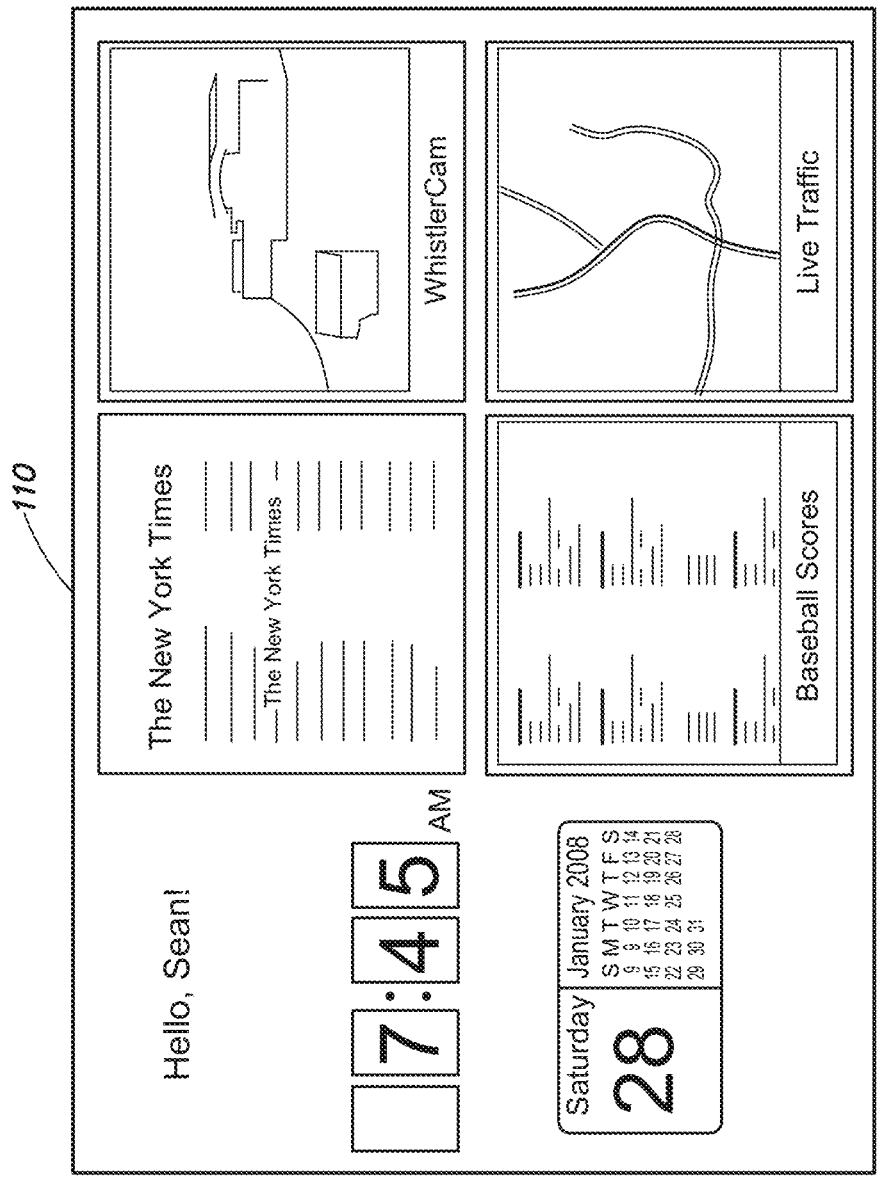
FIG. 13 is a screen shot illustrating another example of a graphical user interface according to aspects of the invention.

According to one embodiment, the different modes of content 172 may be displayed as a series of bars across the display screen 110, as illustrated in FIG. 12. The following discussion of various features, including hardware navigation through the map user interface may refer primarily to the display configuration illustrated in FIG. 12. However, it is to be appreciated that the invention is not so limited, and the modes of content may be displayed in other configurations, including, for example, a "desktop" and icon configuration, a "dashboard" type display, as illustrated in FIG. 13, or another configuration, as would be recognized by those skilled in the art. Similarly, navigation is discussed below primarily with reference to the scroll wheel 132 and navigation buttons 166, 168; however, it is to be appreciation that navigation may also be accomplished using any of the conventional tools discussed above or known to those skilled in the art.

As discussed above, according to one embodiment, the scroll wheel 132 and, optionally, the navigation buttons 166, 168 may be used to navigate the user interface. Referring again to FIG. 12, scrolling the scroll wheel may sequentially highlight different ones of the modes of content 172. In one example, the highlighting may be achieved by changing the color of the selected mode, and/or by providing a visual indicator, such as a colored bar 176. A highlighted mode 172 may be selected by pressing the scroll wheel, thereby bringing up a new "page" or screen on the user interface corresponding to the selected mode. Once within a selected mode of content 172, the scroll wheel may similarly be used to select particular functions, features or applications within that mode. In one embodiment, the default action for the scroll wheel 132 may vary depending on whether the portable computer 100 is in the laptop mode or the easel mode. For example, in easel mode, the default action for the scroll wheel may be channel selection within the channels mode 172(e). In one embodiment, the scroll wheel 132 may be depressible as well as scrollable. Thus, pressing the scroll wheel 132, as illustrated in FIG. 4, may allow further control, such as, for example, selecting a channel onto which the user has scrolled, or "play" and "pause" of audio or video being played through the portable computer 100.

As discussed above, according to one embodiment, one or more navigation buttons may be used in conjunction with the scroll wheel. In particular, in one embodiment, the navigation button(s) may be used to change the action of the scroll wheel. As discussed above, in one example, the default action of the scroll wheel is volume control. This action may be changed by pressing the navigation button 166, as illustrated in FIG. 4, for example, from volume control to menu navigation in the user interface, and vice versa.

According to one embodiment, the effect of pressing the navigation button 166 may vary depending on active the mode of content of the portable computer 100. For example, if a user is in the media mode using a photo viewing application, pressing the navigation button 166 may change the action of the scroll wheel 132 from mode navigation to slideshow controls for the photos. When the navigation button 166 is pressed, an control indicator box (similar to the volume indicator box 162 discussed above with reference to FIG. 14) may appear containing different actions for the photo slideshow, such as "play," "next," "back," "skip," "full screen view," etc., and scrolling the scroll wheel 132 may allow a user to select one of these actions. Pressing the navigation button 166 again may return the scroll wheel action to menu navigation, to allow the user to, for example, move to a different feature or application within the active mode, or to select a different mode.

Figure 17:
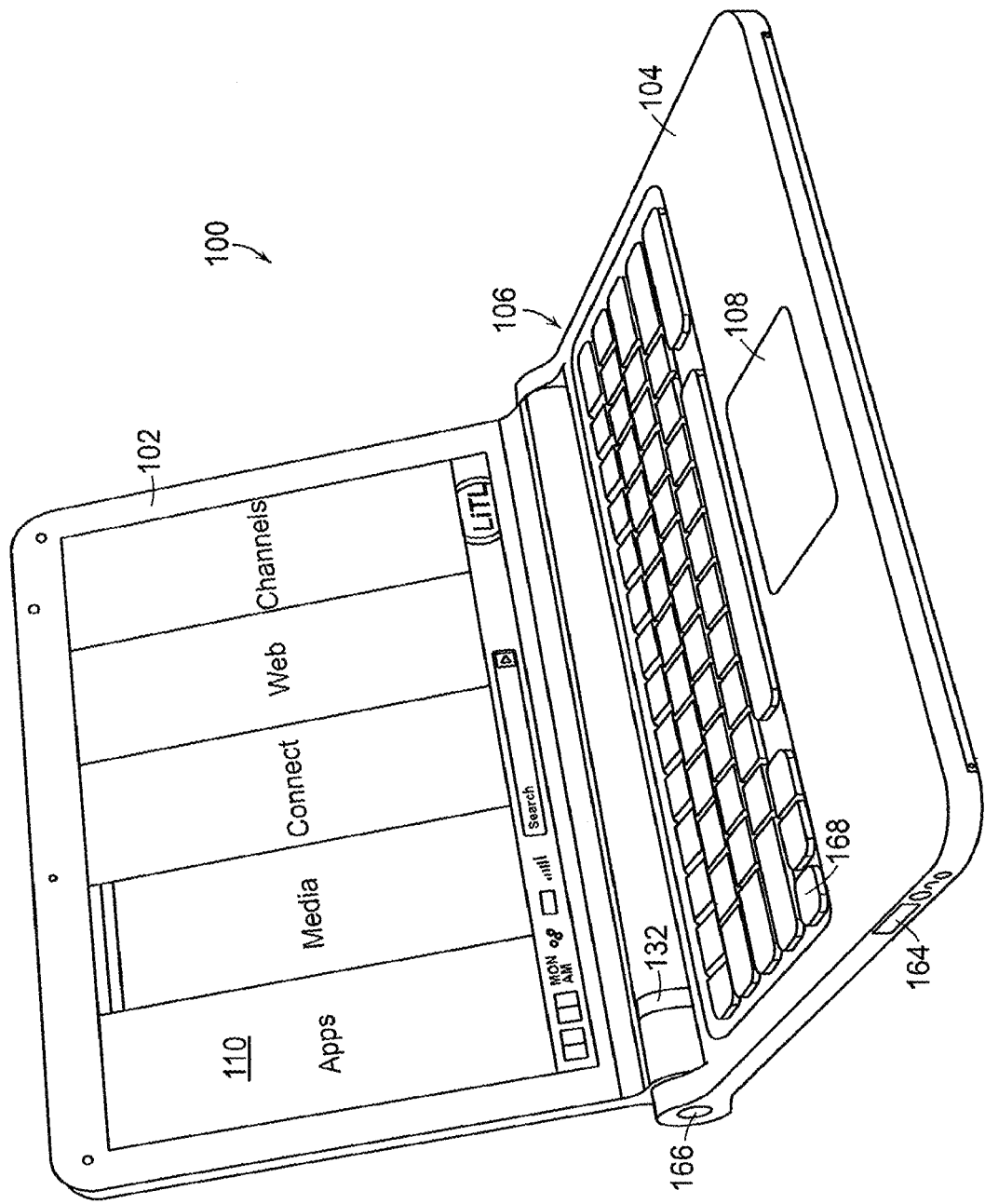
FIG. 17 is an illustration of an example of the portable computer in the laptop mode, according to aspects of the invention.

As can be seen in FIG. 4, the navigation button 166 may be easily accessed when the portable computer 100 is in the easel mode, providing a convenient navigation tool for this configuration. A similar navigation button 168 may be provided on the keyboard 106, as illustrated in FIG. 17. In one example, the functionality of the two navigation buttons 166, 168 may be the same, with the different locations providing easy, comfortable access in the different configuration modes (i.e., laptop or easel) of the portable computer 100. Thus, a user may use either navigation button 166 or navigation button 168, depending on personal preference. In another example, the two navigation buttons may have different functionality. For example, the navigation button 166 may be used to alter the action of the scroll wheel 132, as discussed above, while the navigation button 168 is used to navigate "up" or "down" a level within the map user interface. For example, pressing the navigation button 168 while within a given mode of content may allow the user to "back up" to the home screen; or pressing the navigation button 168 while within a selected channel (in the channel mode of the content 172e) may allow the user to "back-up" to the channel mode main page.

It is to be appreciated that numerous variations on the functionality of the navigation buttons 166, 168 is possible, as would be recognized by those skilled in the art, and the above examples are given for illustration only and are not intended to be limiting. In addition, any functions described with reference to one navigation button (166 or 168) may be instead (or additionally) implemented with the other navigation button. In one example, the function of the navigation buttons 166, 168 may vary depending on whether the portable computer 100 is configured into the laptop mode or the easel mode. For example, only the navigation button 166 may be active in the easel mode, and only the navigation button 168 may be active in the laptop mode. Alternatively, both navigation buttons 166, 168 may be usable in either the laptop mode or the easel mode, but their functionality may vary. For example, when the portable computer 100 is in the easel mode, the default action for the navigation button 166 may be channel selection whereas the default action for the navigation button 168 is to access the "home" screen. Furthermore, the portable computer 100 is not limited to the use of two navigation buttons and may instead comprise only a single navigation button or more than two navigation buttons, any of which may be disposed in the locations described above (e.g., on the rounded portion 120 of the base 104 or on the keyboard 106), or in other locations on the portable computer.

As discussed above, according to one embodiment, the function or display content and/or display orientation of the portable computer may vary when the portable computer is configured from the laptop mode into the easel mode, or vice versa. For example, as discussed above, when the portable computer 100 is configured into the easel mode, the visual display on the display screen 110 is automatically rotated 180 degrees such that the information appears "right-way-up," even through the display screen is upside-down compared to when the portable computer is in the laptop mode. In another example, for at least some activities within at least some modes of content (e.g., viewing a photograph or video), when the portable computer 100 is configured into the easel mode, the display may automatically adjust to "full screen view" (i.e., the displayed image or video is displayed on the full screen size, rather than in a window) to allow for comfortable viewing.

Figure 5:
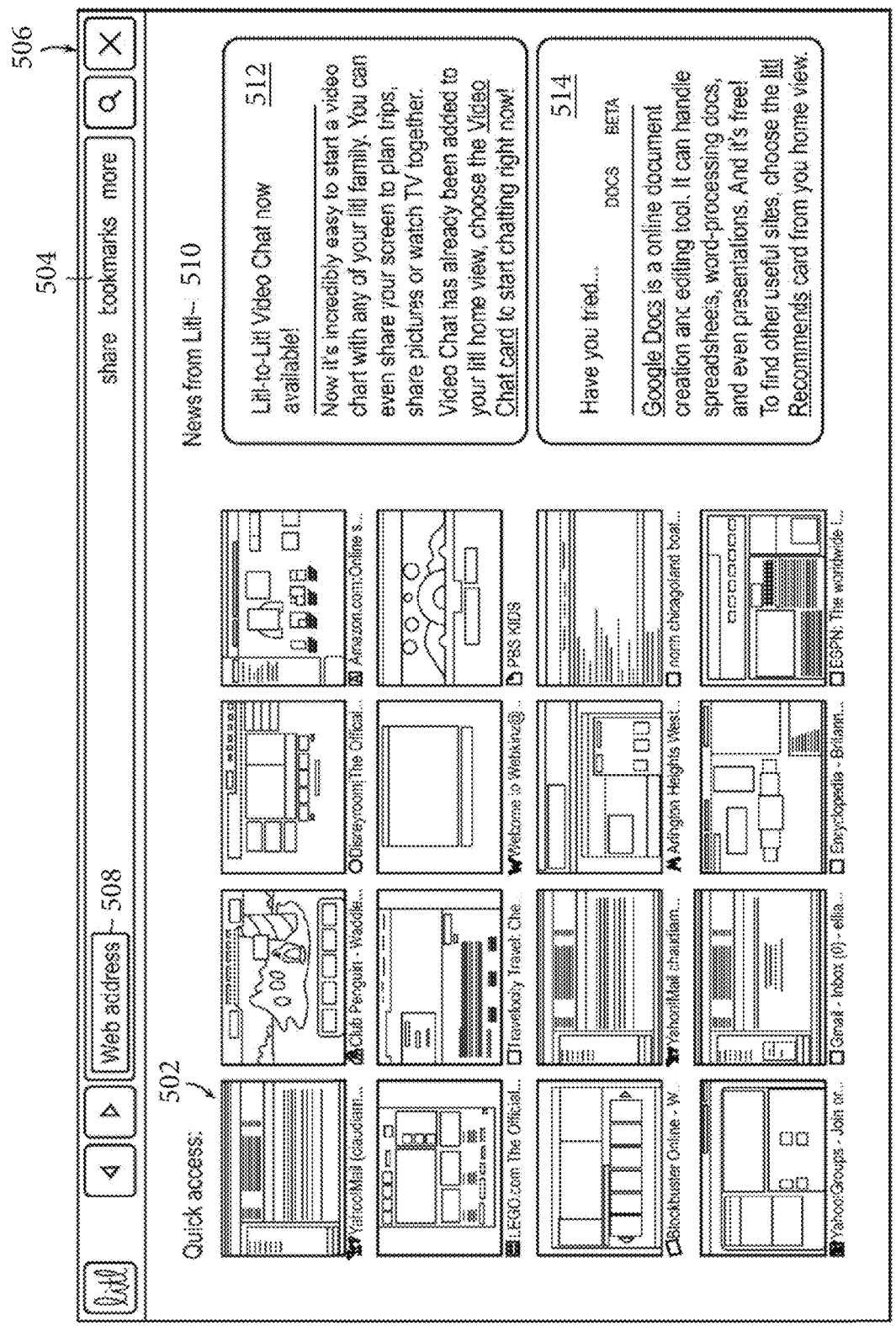
FIG. 5 is a screen shot illustrating one example of a graphical user interface showing a quick access view, according to aspects of the invention.

In addition, as discussed above, the ability to configure the portable computer 100 into either the laptop mode or the easel mode provides enhanced functionality. For example, when the portable computer 100 is not being actively used, the user may configure the portable computer into the easel mode, and program the portable computer to act as a digital photo frame, displaying one or more photos of the user's choice. In the easel mode, the portable computer 100 may occupy a smaller footprint on a surface than in the laptop or closed modes because the base 104 and display component 102 are upright, as illustrated in FIGS. 4 and 5. In addition, because the portable computer can act as a passive information and/or entertainment device, such as a photo frame or clock, as discussed above, the portable computer may provide a useful function even when not being actively used by the user, and may do so (in the easel mode) without taking up much surface area.

It is to be appreciated that although the portable computer 100 is often referred to as being in either the laptop mode or easel mode, other modes or configurations are also possible. For example, as discussed above, because the portable computer 100 can be configured from the closed position, through the laptop mode into the easel mode by rotating the display component 102, a number of configurations are possible in between "true" laptop mode and "true" easel mode. Each different configuration may invoke different functionality and provide a user with a different aspect of a graphical user interface.

Figure 26:
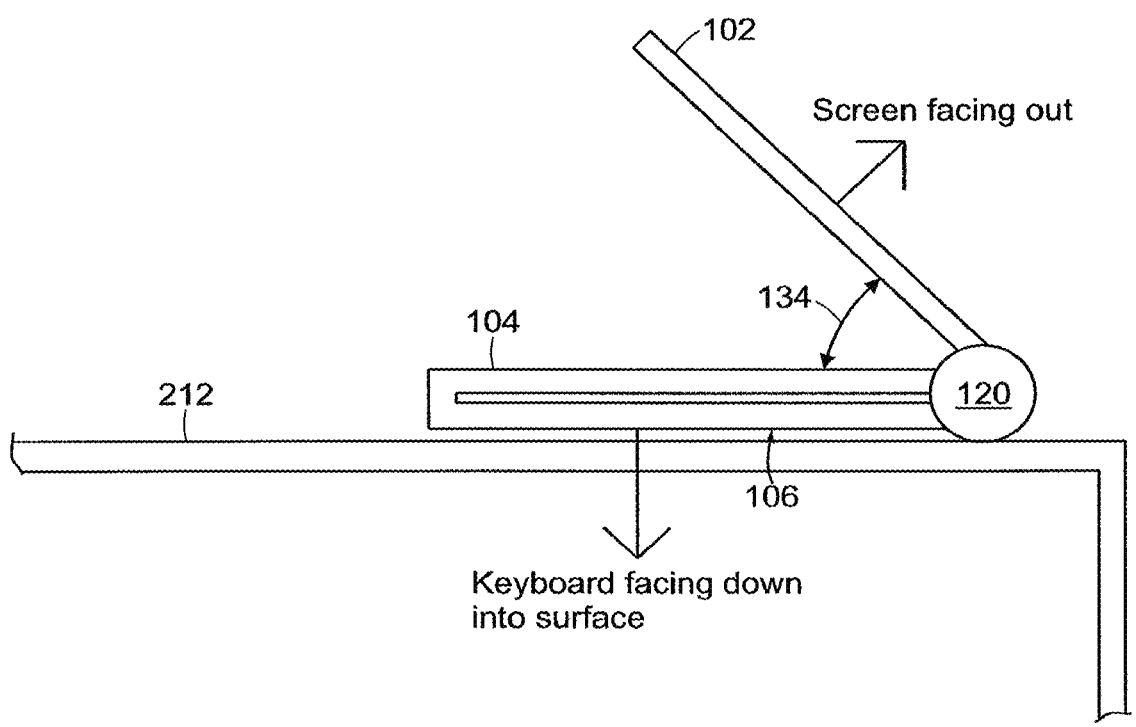
FIG. 26 is an illustration of the portable computer configured into a "frame" mode, according to aspects of the invention.

In another example, the portable computer 100 may be configured into a "frame" mode, as illustrated in FIG. 26, in which the portable computer is placed on a surface 212 with the keyboard 106 "face down" on the surface 212 and the display 110 facing upward. In the frame mode, the display component 102 may be at a similar orientation, and angle 134, with respect to the base component 104 as in the easel mode. However, rather than the base component 104 and display component 102 being oriented vertically with respect to the surface 212, as in the easel mode (in which the portable computer forms an inverted "V" as discussed above), in the frame mode, the base component 104 may lie flat on the surface 212, as shown in FIG. 26. In one example, software and/or hardware protection may be provided for the keyboard to prevent keys from being pressed (or to prevent the portable computer from responding to pressed keys) when the portable computer is in the frame mode.

Figure 27:
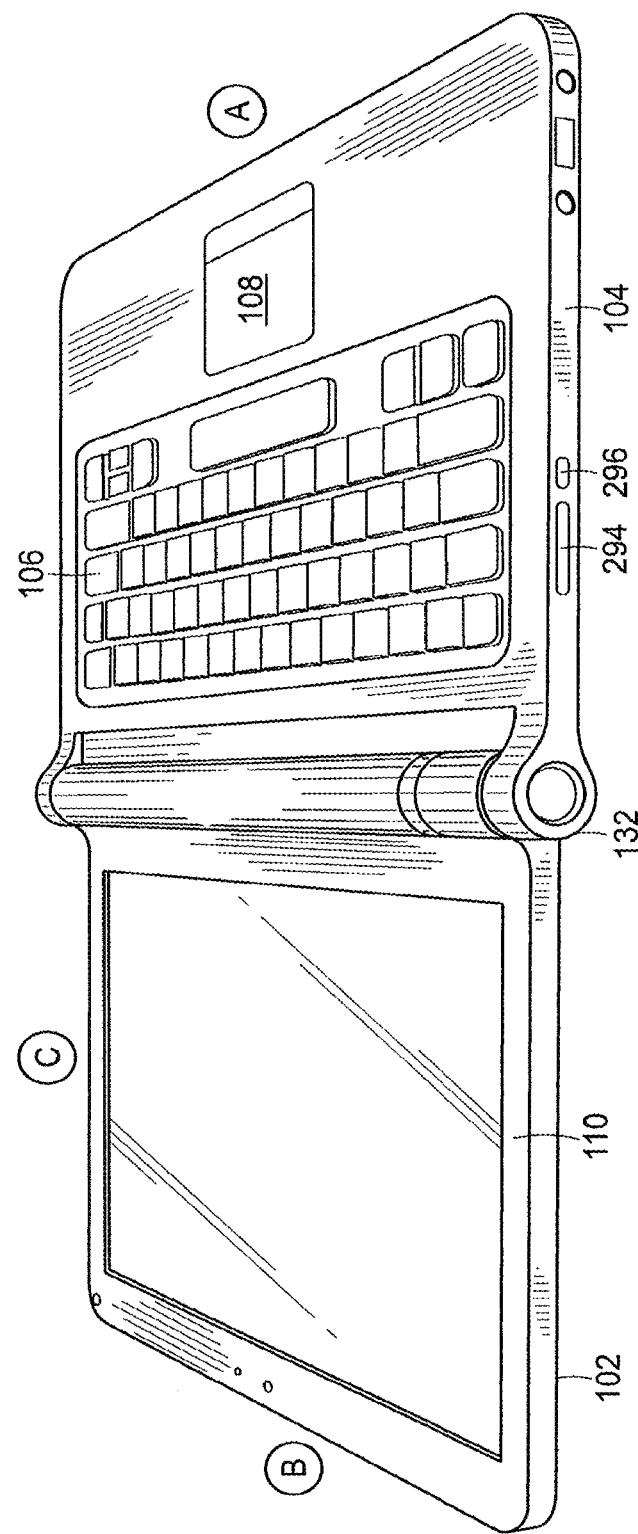
FIG. 27 is an illustration of the portable computer configured into a "flat" mode, according to aspects of the invention.

Similarly, referring to FIG. 27, there is illustrated another configuration of the portable computer 100, referring to as the "flat" mode. In the flat mode, the display component 102 may be rotated (or opened) to approximately 180 degrees with respect to the base component 104, such that the base component and display component lay flat on a surface, with the keyboard 106 and display screen 110 exposed, as shown in FIG. 27. Unlike the easel and frame modes, in which the keyboard may be concealed and not easily accessible, in the flat mode, the keyboard is accessible and usable. In addition, as discussed above, the visual display on the display screen 110 may be automatically rotated to accommodate comfortable viewing of information by persons located in different positions relative to the base component 104 or display component 102. The visual display on the display screen 110 may also be manually adjusted by a user using, for example, the keyboard 106, touch pad 108 or mouse (not shown), scroll wheel 132 or navigation buttons (not shown). For example, if a user (located at position A) wishes to display information for a person located opposite the user (at position B), the visual display may be rotated (automatically or manually) 180 degrees such that the information appears "right-way-up," to the person at location B, even through the display screen 110 is upside-down for that person. Similarly, in another example, the visual display may be rotated (automatically or manually) 90 degrees such that the information appears "right-way-up," for a person at location C. In one example, a user can "toggle" the visual display among various orientations. For example, a user at location A may have the visual display facing themselves while using the keyboard 106 or other controls to change or access information on the display, then toggle the display orientation 180 or 90 degrees to display the information for persons at locations B or C.

According to another aspect, system and interface streamlining may be employed with devices of multiple configurations. In some embodiments, multiple configurations include a traditional configuration, for example, a configuration similar to a laptop device, and also include new configurations, for example, an easel mode. Some examples of streamlined devices have the ability to change between traditional configurations and other configurations. The change between configurations may change the I/O profile of the device and hence impact the user's interaction with the device itself and any content displayed on the device. In one embodiment, the user interface is responsive to changes in configuration. In another embodiment, the user interface is responsive to changes in I/O profile.

According to another aspect, the streamlining of the user's multi-media experience incorporates the device the user uses to interact with multi-media sources, whether the sources are on-line or provided by the device itself. Streamlining of the device includes developing consistent user interfaces for the user to access all features presented. The device's graphical user interface layer is customized to the I/O interfaces provided. In one example a device is provided in the form of a portable computer configurable between a laptop mode (in which the portable computer has a conventional laptop appearance) and an easel mode in which the base of the computer and its display component stand upright forming an inverted "V," a closed mode, a laptop mode, an easel mode, a flat mode and a frame mode. According to one embodiment, each of the display modes may employ different I/O profiles.

Some of the aspects may be better understood through the use of examples demonstrating the interactions between a system, the system user, the interfaces provided, and the accessed content. The user experience is improved through simplification of the interactions with the user device—depending on the device's configuration the only activity required by the user may be to use a scroll wheel to identify selection and a button to execute the selection. Moreover, the user experience is enhanced by permitting the user to select the I/O profile s/he is most comfortable with and even select multiple I/O profiles or device configurations depending upon the context presented to the user. It is to be appreciated that adaptations to the user interface layer that maintain consistency while permitting different I/O profiles should be viewed as part of the invention.

The examples of user interactions are provided for the purposes of illustration and should not be viewed as limiting the invention to the interactions described, nor the specific presentations discussed, and it is to be appreciated that other interactions are appropriate and even desired in different circumstances. Additionally, different configurations of the device itself will provide for different user interactions, for example, based on additional hardware not available in another configuration.

Examples of User Experience

In one example, some typical user interactions with electronic content are illustrated. The user interactions occur in accordance with various aspects of the systems and methods for streamlining user interaction with electronic content. In some embodiments, the streamlined device is adapted to accommodate multiple users. In one embodiment, the user identifies him/herself to the device by entering a user name and password. Once the user name and password is accepted the user may begin interacting with the device, and if desired through the device to other content. According to another embodiment, the device may display a "users" screen, incorporating a visual representation for each user. In response to selection by the user of the visual representation the user is identified. Identification may optionally include a password challenge/response after selection of the visual representation. In some embodiments, a camera is available through the user device, and the user's visual representation may be generated by taking a snapshot of the user.

In one embodiment, that act of identifying includes access to remote storage associated with the device and/or the user. Remote storage is accessed to retrieve any global profiles that may exist for the user, and more specifically, any changes that may have been made to the user's global profile. In some embodiments, a local copy of any profile is stored on the device, and the remotely stored profile is used to identify any changes. Changes to profiles may be copied to the remote location or changes in the profile may be retrieved from the remote location. In one example, the local and remote profiles are associated with a revision date. The most recently revised profile may be used as the most up to date profile, with a different version receiving modification as necessary to correspond.

In one alternative, a remote profile may be maintained for the device itself. In another, the device profile may contain information on a number of users. In some embodiments, remote access is used to retrieve configurations and/or settings maintained for any of the device, the user, and groups of users, alone or in combination. According to one aspect, remote storage and/or remote access to user configuration comprises one element of an example system for streamlining user interaction with electronic content.

Once a user is identified (identification may occur by default if only one user has accessed a particular device) the graphical user interface presents a default view of the electronic content available on the device. In one embodiment, the view presented is responsive to the configuration of the device. According to some embodiments, device configurations may be determined using a sensor embedded in the device. In one example, a sensor is used to provide a signal and from the signal the device's orientation is determined. Alternative methodologies are employed in other embodiments for detecting and deter mining a device's configuration. In one alternative example, I/O devices may be enabled/disabled based on the physical configuration of the device. For example, during a transition from laptop mode to easel mode, various I/O devices that become inaccessible may be deactivated. Determining what I/O devices are still active and/or available permits identification of the device's configuration. In other embodiments, an accelerometer may, be used to detect a device configuration. In one example, a device may be a portable laptop computer. The portable laptop computer may have multiple configurations, including a laptop mode, an easel mode, a frame mode, a flat mode and a closed mode.

In the illustrated example, FIG. 1, the user device is configured in a laptop mode, and has an I/O profile (a set of I/O devices) that one would normally associate with a laptop computer. In this example, the I/O profile includes, in some embodiments, a keyboard, a touch pad, buttons, web cam, and a scroll wheel. The graphical user interface is configured to present a default view that provides the user with contextual options. In this example the present context for the user includes "lean forward" viewing and the computer operations one would typically associate with user of a laptop. Other contexts arise based on configuration of the device (for example in Easel mode) and the computer tasks the user wishes to perform. For an identified context a default is provided for the user eliminating the requirement of making configuration choices, however, the user is still permitted to accesses the configuration directly to customize it.

Figure 2:
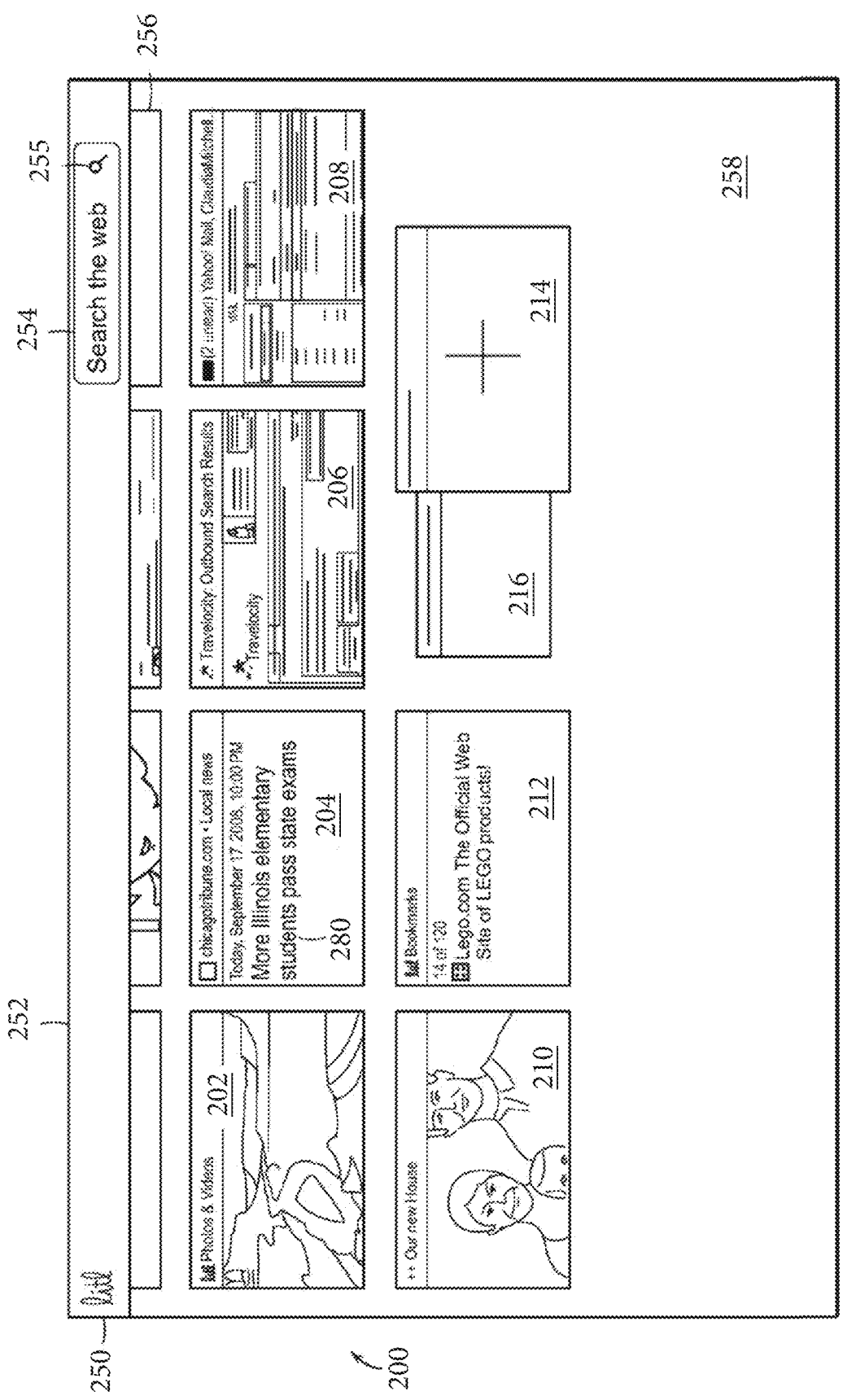
FIG. 2 is a screen shot illustrating one example of a graphical user interface showing a home view, according to aspects of the invention.

Shown in FIG. 2, is an example of a page of the device's home view (200). The home view organizes user interface elements into a mapped based presentation and separates the presentation into logical units based on a single displayed screen, i.e. a page. One function provided by the home view is to serve as an organization of interface elements and/or navigation tools that maps visual representations of available content into a plurality of views of the available content. The home view is also configured to present summarized views of information to the user, so as to reduce the volume of information that a user needs to process in order to access content. In some embodiments, the mapped based interface is also configured to group like computer operations into a section of the map. Typically, grouped selectable computer content includes mappings to other groupings of lower level functionality. For example, high level navigation options are, typically, first presented to the user. The high level navigation options provide a summarized view of the available content, making content based selections easy to appreciate and accomplish. A user selects a high level navigation operation to navigate to more detailed operations. In some embodiments, the more detailed operations are grouped based on a mode of content. Modes of content may include for example, media, channel, connection, application, and web, among other options.

According to one embodiment, high level functions and low level functions are segregated based on proximity to displays of sources of digital content. For example, a visual representation that maps to the source of digital content is included in a lower level of functionality than the view that organizes the presentation of the visual representation. A view that presents the digital content source itself, is grouped at a lower level than the visual representation that maps to the digital content source. In another embodiment, interfaces that provide navigation operations to digital content form a layer of the graphical user interface, and interfaces that provide interaction options to digital content form a lower layer. In one embodiment, the home view includes maximal display thresholds configured to improve the ability of the user to absorb the information presented. In some embodiments, a maximal number of visual representations per screen is set. In one example, the maximal number of visual representations is used to define a GUI page. In another example, the maximal number of visual representations is associated with a maximal number of full view visual representations, and the page is configured to include portions of views of other visual representations available on adjacent pages. A computer operation that would cause the computer device to exceed the maximal number results in the creation of a new display page. The home view is organized into as many pages are required in order to maintain the maximal threshold of display items.

Typically, the home view is configurable by the user. New items may be added, existing items may be moved and/or removed based on user selection. The home view further comprises some visual representations that can not be removed. Commonly requested system operations have visual representation displayed on the home view that can not be deleted. According to one embodiment, a user may reorganize the display but not remove system operations. For example, visual representations that map to system operations (e.g. communication configuration and hardware configuration) cannot be remove from the home view. Additionally, some system operations will always be displayed through the home view regardless of frequency of use. Positioning of visual representation is also organized and managed in the home view. Preferably, organization and/or management occurs automatically based on default settings selected for the user. Alternatively, organization and/or management may occur dynamically. For example, a user may make changes to organization and/or management settings on the fly. In another embodiment, default settings control organization and/or management, and an interface is provided to permits a user to makes any changes to the default settings. And in another embodiment, a user may be queried on preferences, the responses are used to establish defaults for operation.

In some embodiments, frequency of use of the visual representations is used to sort the presentation of visual representations on the home view. More frequently accessed visual representations are displayed at a higher position on a page and less frequently accessed representations are displayed at a lower position on the page, and may cause the computer device to display the visual representation on another page.

In a typically configuration, visual representations are organized based upon creation time, although certain visual representations take precedence in the display. According to one aspect, display precedence is established from left to right and from top to bottom. In one embodiment, the visual representation displayed in the upper left portion of the display screen is associated with the highest precedence. Precedence in the display may be influenced and even ignored with respect to certain system operations and the visual representations that map to them. For example, a visual representation mapping to display for a user's bookmarks may appear in the upper left corner. According to one embodiment, the positioning of the familiar option relating to bookmarks as the visual representation of the highest precedence provides users with an option familiar to traditional use of computer systems. Although presented as a streamlined interface element, the bookmark visual representation is configured to evoke familiarity in the typical computer user.

According to another embodiment, the visual representation that maps to the computer functionality for creating interacting with a new web page is the only representation that has a fixed position, relative to the display precedence. In one example, the element for triggering interaction with a new web page is always display in the bottom right corner. The other visual representation may be reshuffled based on frequency of use, and in other embodiments a user may also reshuffle the visual representation by drag and drop procedures, however the element for triggering interaction with a new web page remains in the bottom right corner, and in one example, will move to a new page in response to a request to display an new web page element when the element is already displayed in the bottom right corner of a page. Drag and drop operations may be associated with a drag threshold. In one example, a drag threshold is applied to require a small movement of the identified card before the device executes the drag operation. The drag threshold may be measure on the order of pixels, and may be any number of pixels that prevent accidental dragging in response to the user attempting to click on a card. In one embodiment, the drag threshold is set to 5 pixels. Other thresholds may be used, 2, 3, 4, 6, . . . pixels as examples.

Other display precedence may be employed. For example, display precedence may be configured based on user location and language convention for the user location. The written English language is read from left to right and from top to bottom; however, other languages are not. According to some embodiments, display precedence and any corresponding animations are configured to correspond with the conventions of the local language, for example displaying from right to left.

Referring again to FIG. 2, shown is an example of a page of the home view, with user interface elements organized to present the user with summary information of available content. Shown in FIG. 2, at 202, is a representation of picture and video content available to the user. At 204, a visual representation of customized content is available. The customized content (discussed further herein) comprises rss items from a web location distributing via an rss feed. In example shown, 204, comprises a channel card. The channel card is configured to allow easy interaction with a plurality of rss items, and further configured to be responsive to both lean forward interactions and lean backward modes of interaction. The other user interface elements include, for example, visual representations of web based content, specialized user interface elements for providing customized interaction with web based content in the form of channels, and system elements.

A typical activity for any user includes reading his/her email. The user may observe an e-mail from for example, the user's credit card company, Chase. The home view (200) is the default vehicle through which a user interacts with the device and with electronic content displayed on the device. The home view presents an organization of other interactive elements (202-216). Accessing e-mail occurs in response to selecting the visual representation (208) that maps to YAHOO? MAIL content. Upon selecting (208) the device executes a mapping from the visual representation to the content and in response the device presents a first view of the mapped content. According to one embodiment, in response to selection of a visual representation mapping to content of web page a web page view is displayed. The web page view is a zoomed in expression of the web based content mapped by the visual representation.

Figure 3A:
Figure 3B:
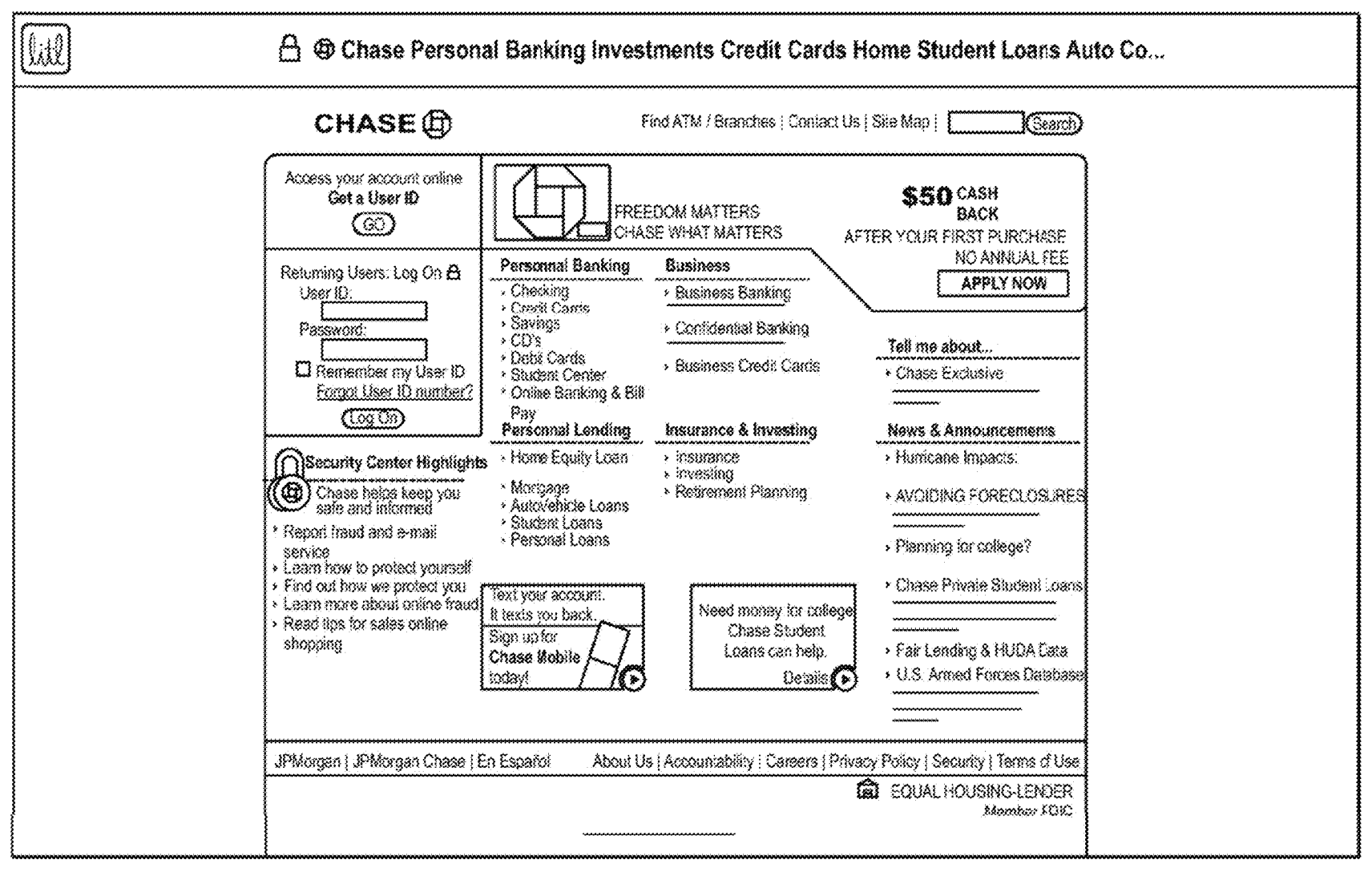

Once a user reaches the web page view (300) FIG. 3A, the user may interact with the content shown. Although it is to be appreciated that other representations may mapped to different views, and different view may be used to map to further views. (302) shows an e-mail being reviewed by the user, and more specifically an e-mail from Chase Bank indicating that the user's credit card statement has issued. The body of the e-mail (304) includes a link (306) for accessing Chase's website. Selecting the link invokes an open new page view operation by default, and in response to selection of (306) the user sees an animation returning the user to the home view (200). The visual representation for "Browse the web" (214) reveals the creation of a new visual representation for accessing web content (216) by sliding away from a new visual representation the takes the former place of (214). The computer system displays an animation that shows the computer display zooming into the page view (300) of element (214), shown in FIG. 3B. The user logs in and reviews his/her balance, shown in FIG. 3C at (350). The web page view further comprises navigation element (352). The user selects (352) to return the home view (200), selects (216) to access a new web page and in response a new web content visual representation is created, further the device shows the display zooming into the new content.

FIG. 5 displays a quick access view (500). As the new card has not yet been mapped to content, the device displays content options in order to generate a mapping. In one example, the content options may be based on frequency of access. Shown at (502) are visual representations generated from the most frequently visited content. Selecting any of the visual representations in the body (502) causes the device to associate the mapping with the new card and zoom into the selected content display. At (504) provided as an element of the view's header (506) is a bookmarks control. Through (504) bookmarks control a user may access content not display in the frequency list (although a user may also enter a uniform resource identifier at (508).

Figure 7A:
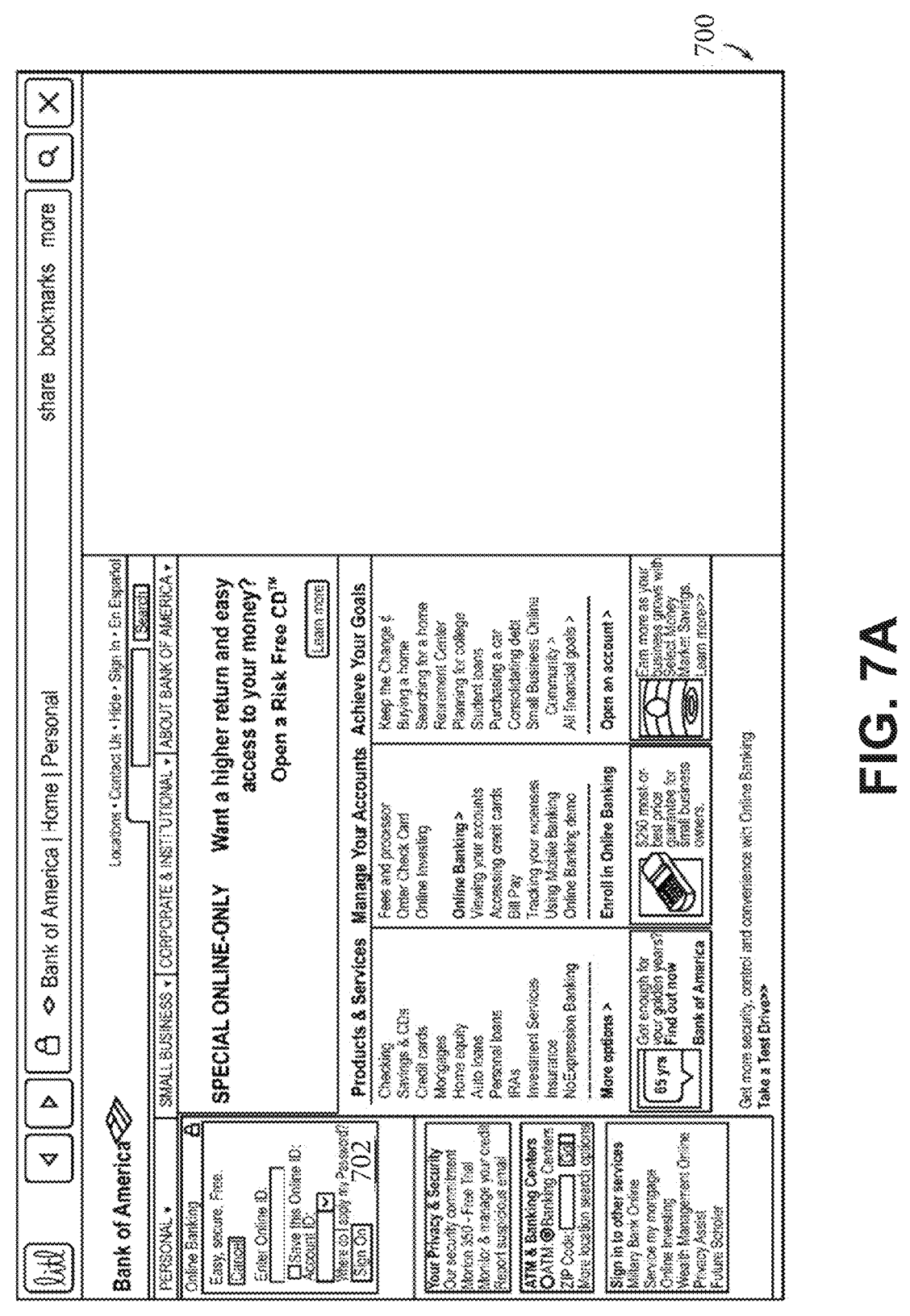
Figure 7B:
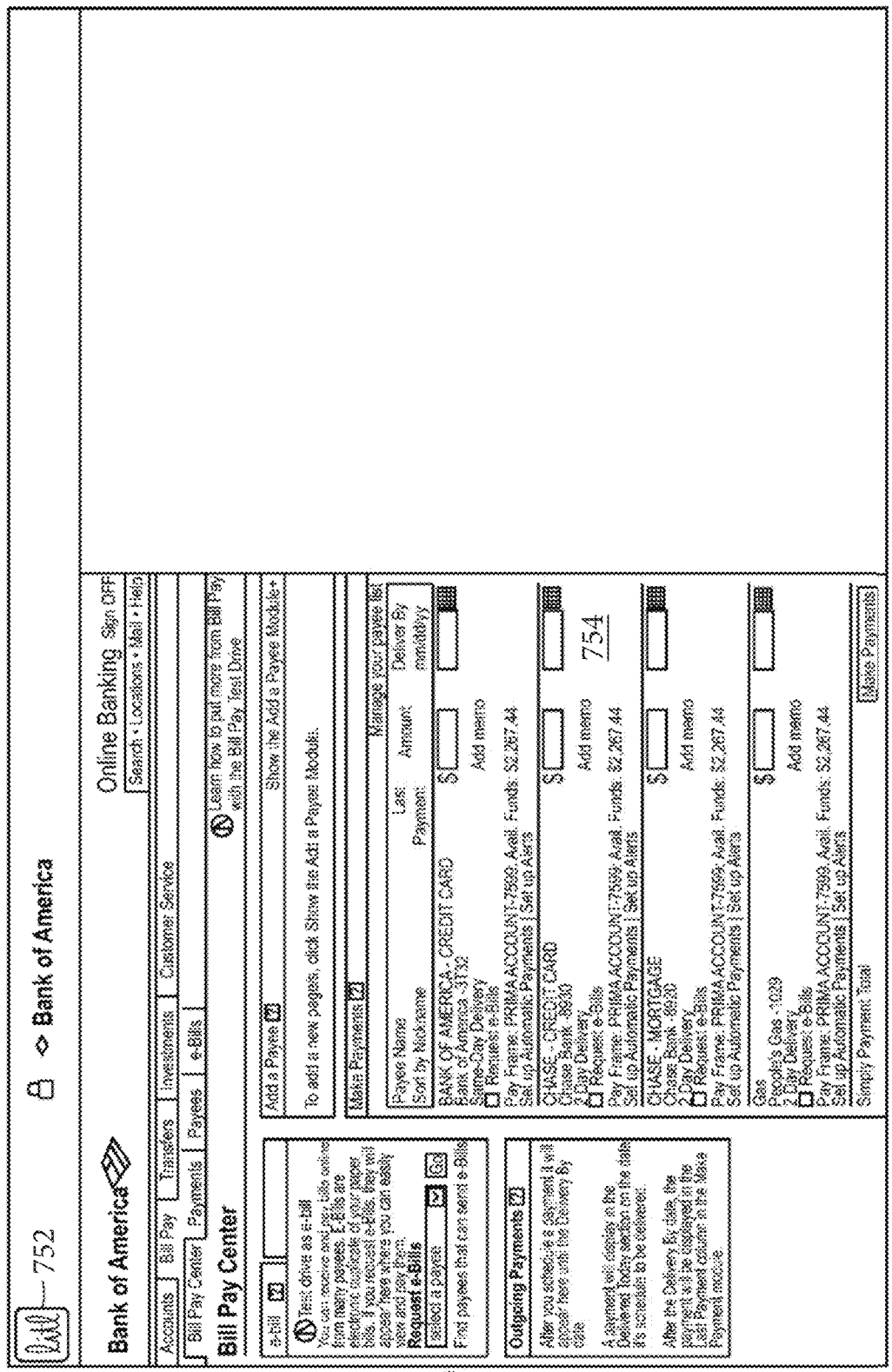
Figure 8:
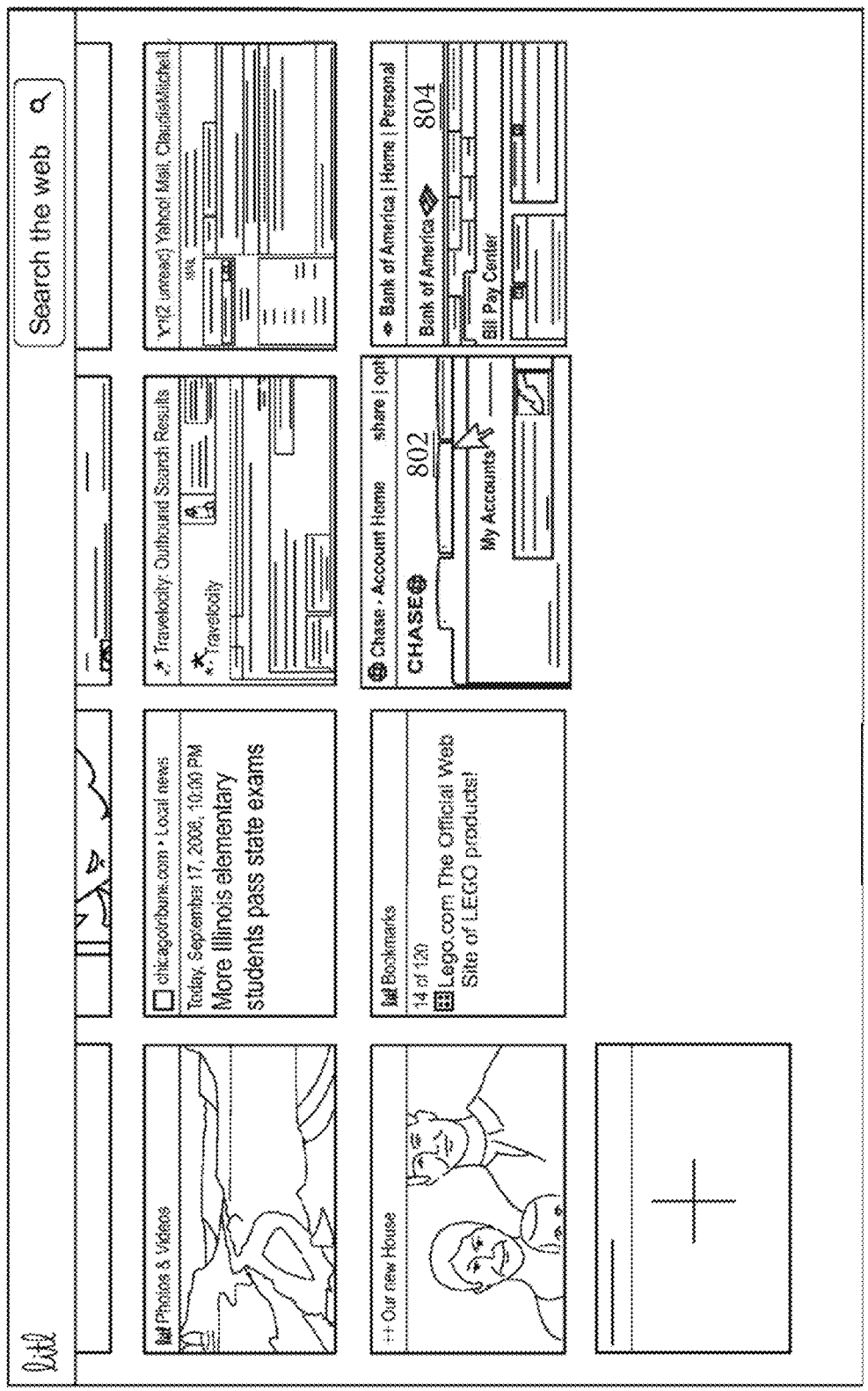
FIG. 8 is a screen shot illustrating one example of a graphical user interface showing a home view, according to aspects of the invention.

In response to the selection of bookmarks a list of bookmarked content is displayed for selection, FIG. 6, 600. Upon selecting (602) a mapping to the bookmarked content is associated with the new visual representation. In one alternative, a user may enter a uri for a online source to associated with a new visual representation. The computer zooms into the selected content and in this example, displays the web page view for (602), Bank of America's (BOA) web site, shown in FIG. 7A at (700). The user logs in at (702) and is able to pay the Chase bill just reviewed, shown at FIG. 7B, (700). Having visual representations mapped to content available, improves the user's ability to transition between content views. By selecting the navigation element (752) the user is returned to the home view, FIG. 8, (800), showing the visual representation (802) mapped to Chase's web page content and the newly created visual representation (804) mapped to Bank of America's web site content. Selecting (802) returns the user to the Chase content with the user's state preserved from the last visit, FIG. 3C, (350). The user is able to immediately review the statement balance, and by selecting navigation element (352) return to the home view (800) select (804) and enter the amount due for the Chase credit card at (754).

It is to be appreciated that visual representations mapped to computer content facilitate transitions between content, and further by providing state preserving representations a user is able to quickly retrieve and employ information learned from content.

According to another aspect, the selection of a new visual representation is configured to employ a timer. According to some embodiments, the timer is configurable based on user selection, so that the animation may take longer, shorter, and in some embodiments the user is permitted to disable the animation entirely—in one example this is accomplished by setting the timer to allow 0 seconds for the animation, in another example the animation is simply disabled. In some embodiments, the timer is configurable by the system. Over the course of use, the allotted time may be reduced by the system automatically. Once a user has reached a certain time on the streamlined device, the animation may be automatically disabled by the system. For some embodiments where the timer may be configured based on time of use, different timers may be employed for different user profiles. Thus an experienced user may no longer see the animation, whereas a novice user on the same device would see an extended version of the animation.

Graphical User Interface

Figure 23:
FIG. 23 is a screen shot illustrating one example of a graphical user interface showing a channel view, according to aspects of the invention.

Referring again to FIG. 11, there is illustrated a block diagram of one example of an architecture of the portable computer including a map user interface. The user interface "home" screen 170 that displays a plurality of modes of content 172. In the illustrated example, the home screen 170 contains five modes of content 172; however, it is to be appreciated that the home screen may include more or fewer than five modes of content and that the modes of content may differ from the examples discussed. It should also be appreciated that different architectures may be invoked in response to different device modes. For example, a portable computer in laptop mode may display a home view as discussed with respect to FIG. 11, when configured in Easel mode, user is presented with a Channel View. Shown with respect to FIG. 23 is an example of a portable computer set in Easel mode, displaying a channel view. The Channel view may also display a plurality of modes of content. In FIG. 23 shown are visual representations of content (2304-2308) with associated mappings.

According to another aspect, streamlining the presentation and integration of features and services includes simplifying the I/O devices that a user needs to operate in order to access features of the computer system and the features of any available service. According to another aspect, streamlining includes developing consistent visual representations of available content (whether on the computer system itself or from service providers). In another aspect, the organization of interactive elements and responsiveness of the organization to navigation options, device configurations, and user preferences improves the user's ability to interact with the computer system and its content. In one embodiment, system features and web features are consistently presented as cards for the user to interact with to achieve their computer objectives. In some embodiments, cards comprise part of an interface layer between a computer user and a user's computer based objective and/or computer operation. In some embodiments, the number and type of cards are presented in as few as three classes and/or types. Each card for example may be similar in aspect to the other, but each performing a different class of function on the computer system.

Figure 9:
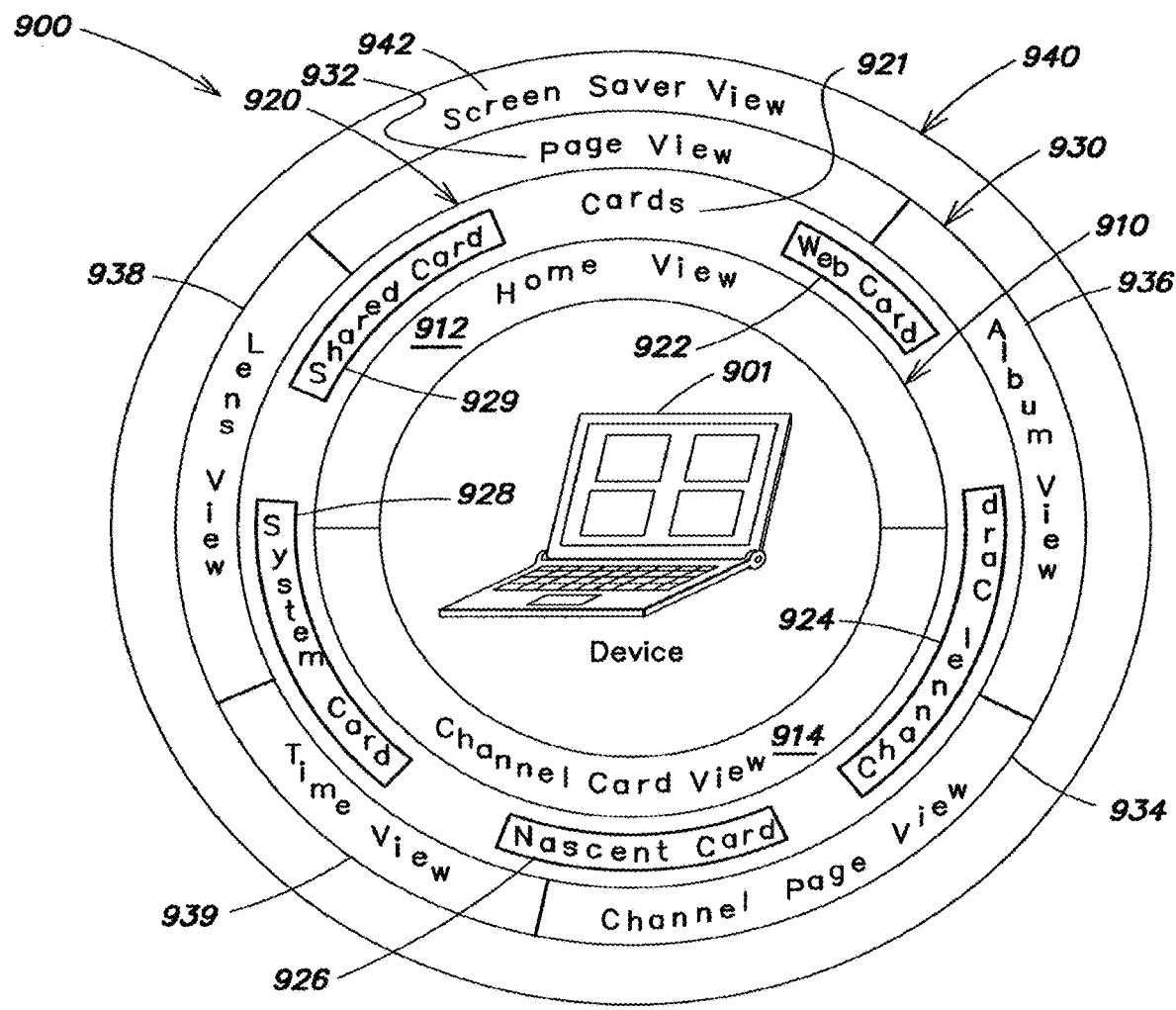
FIG. 9 is an illustration of an example conceptual model of a graphical user interface, according to aspects of the invention.

Referring to FIG. 9, shown is a conceptual model 900 of an example graphical user interface. As shown, in FIG. 9, through a streamlined device 901 a user will interact will a number of views of computer based content. In example model 900, depending on the device's configuration a user will be presented a home view 912 or a channel card view 914. Conceptually 910 forms a layer of the mapped based user interface, wherein the layer is configured to organize, manage and display streamlined views to the device's user. Layer 910 organizes, manages and displays objects of layer 920. Layer 920, according to some embodiments includes cards 921 which are selectable visual representations that are mapped either to computer functions or available computer content. Cards further comprise web cards 922, that map to views of web content including web pages; channel cards 924 that map to customized views of content including web based content and picture and video content; nascent cards 926 that map to system functionality; system cards 928 that map to system functionality; and shared cards 929 that can be any of the former discussed cards shared from another user and/or streamlined device. The card layer 920 maps either to computer functionality executed upon selection or additional views to provide interactive displays to the device' user, for example, the views illustrated in layer 930. Page view 932, according to one example, is a zoomed in expression of a web page. At 940 shown is another layer which includes a screen saver view, 942. In one embodiment, the screen saver view is a passive view. In one example, the screen saver view may be activated by the computer system remaining idle for a period of time. In one embodiment, the screen saver view displays content from channel cards designated by a user in an options menu. In another embodiment, the screen saver view displays content from a pictures and video card. In another embodiment, the screen saver view displays content from a shared card.

According to one embodiment, channel card view 914 comprises a view of the channel cards that are available to a user, and in another embodiment includes a channel selector (not shown). The channel selector is a selectable display configured to be responsive to manipulation of a scroll wheel. In one example, the channel selector is configured to display a rolodex of available channel cards and manipulation of a scroll wheel flips through the visual rolodex. Selection of one of the channel cards invokes any of a channel page view 934, content menu, and a channel card full view, depending upon the device's configuration, and in some examples the result is responsive to where on the card a selection was made. Various cards, depending on the content mapped to, may also provide other views for rendering and providing for user interaction with content, for example, time, 939, album, 936, and lens, 938 views. It is to be appreciated that the conceptual model illustrated in FIG. 9 is only one example of a conceptual model of the graphical user interface for streamlining user interaction with electronic content. Other conceptual models may be employed, for example only some of the layers may be employed, additional layers may be used, and different segmentations of the layers may be provided.

Figure 50:
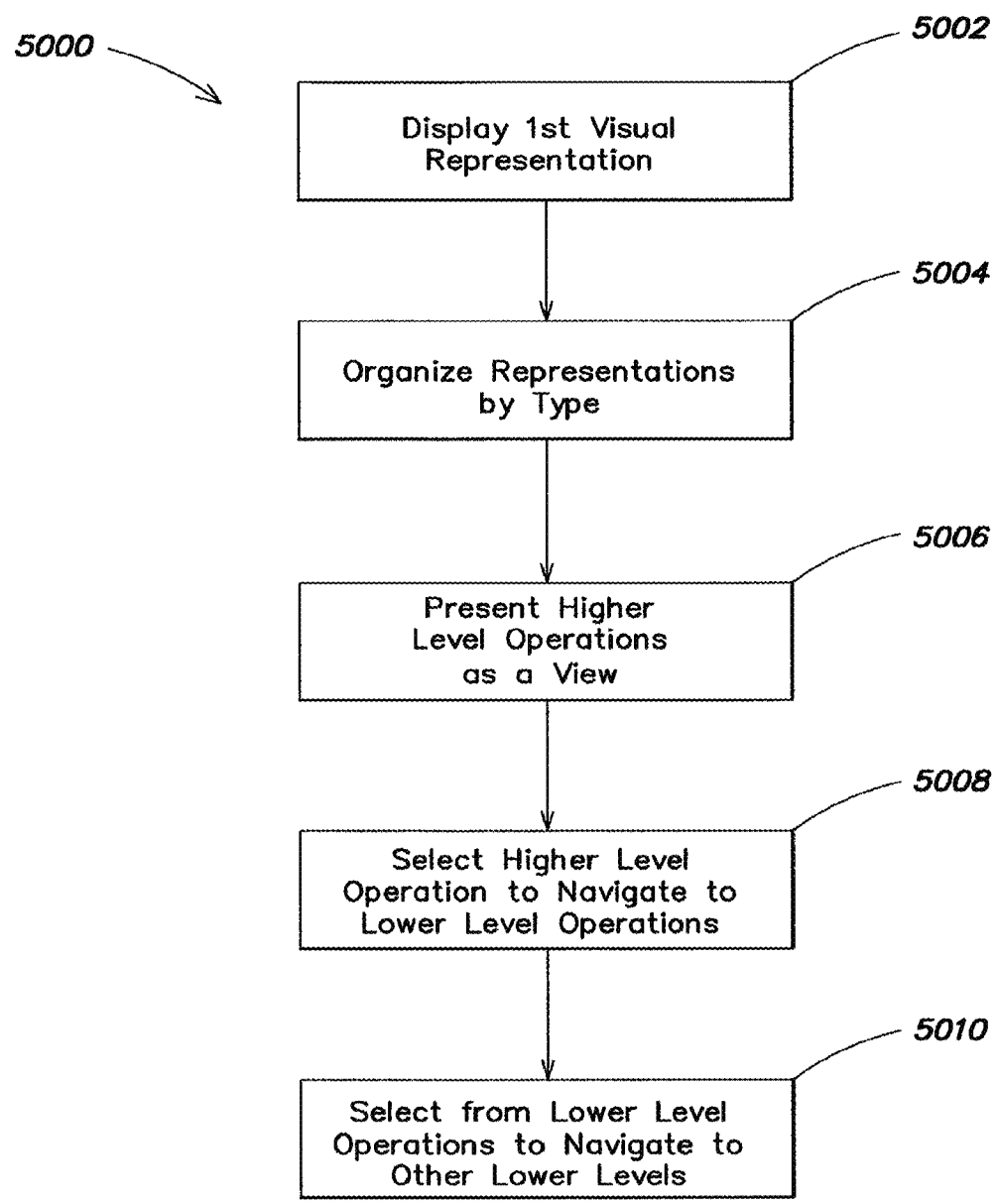
FIG. 50 is a flow diagram of one example process for organizing a plurality of views and GUI elements into a consistent presentation, according to aspects of the invention.

According to one embodiment, a method of presenting a streamlined graphical user interface for a streamlined device includes an example process 5000, FIG. 50. Process 5000 provides for organizing a plurality of views and GUI elements into a consistent presentation for user interaction. At 5002 provided is a first visual representation for displaying multiple content modes mapped to a view of computer content. At 5004, a plurality of visual representations are organized by type of computer operation. At 5006, the graphical user interface presents higher level operations to users as a view including a group of visual representations. AT 5008, a user is permitted to select from the group of visual representations to navigate to lower level functions provided by different views of computer content. At optional step 5010, a user may be permitted to select from within different groups of visual representations to navigate to further lower level views of computer content.

According to another aspect, layers of the conceptual model are configured to respond to device configurations by defaulting and/or transitioning to different views based on device configuration. Typically a device configured in a laptop mode displays a home view, 912, to a user as the default view. In response to a transition in mode between laptop and easel the computer transitions the computer display from the home view, 912, to the channel view, 914, as the default. A user may elect to change the default view, for example by selecting a navigation button that executes a return to the home view. In one example, 168, FIG. 17, is configured to return a user to a home view in response to selection of 168, when the computer display is not on the home view. In the home view, a user may invoke a channel card view, 914, by manipulating scroll wheel, 132.

Home View Embodiments

Referring again to FIG. 2, shown is an example page of a home view, 200. Home views according to various embodiments are configured to render consistent organization of elements of the graphical user interface. Each page rendered in home view comprises a home navigation tool 250, a header 252, and a web search box 254. For home views which include multiple pages, a hint or cut out of adjacent displays are rendered at 256, for example. Hint or cut outs of adjacent displays may also occur at the bottom of the display screen, the top of the display screen, and both top and bottom, where multiple adjacent pages are present. 250, home navigation tool is responsive to the context in which it is executed. For example, the home navigation tool, 250, when selected causes the computer to display the last accessed view before the computer displayed the home view. Where a user navigates to the home view, 200, from a web page view, the selection of the home navigation tool 250 caused the computer to display the previous web page view. In other examples, the home navigation tool permits, toggling between other views and the home view, as illustrated in FIG. 9, at 932-939 and/or 914.

Figure 3C:
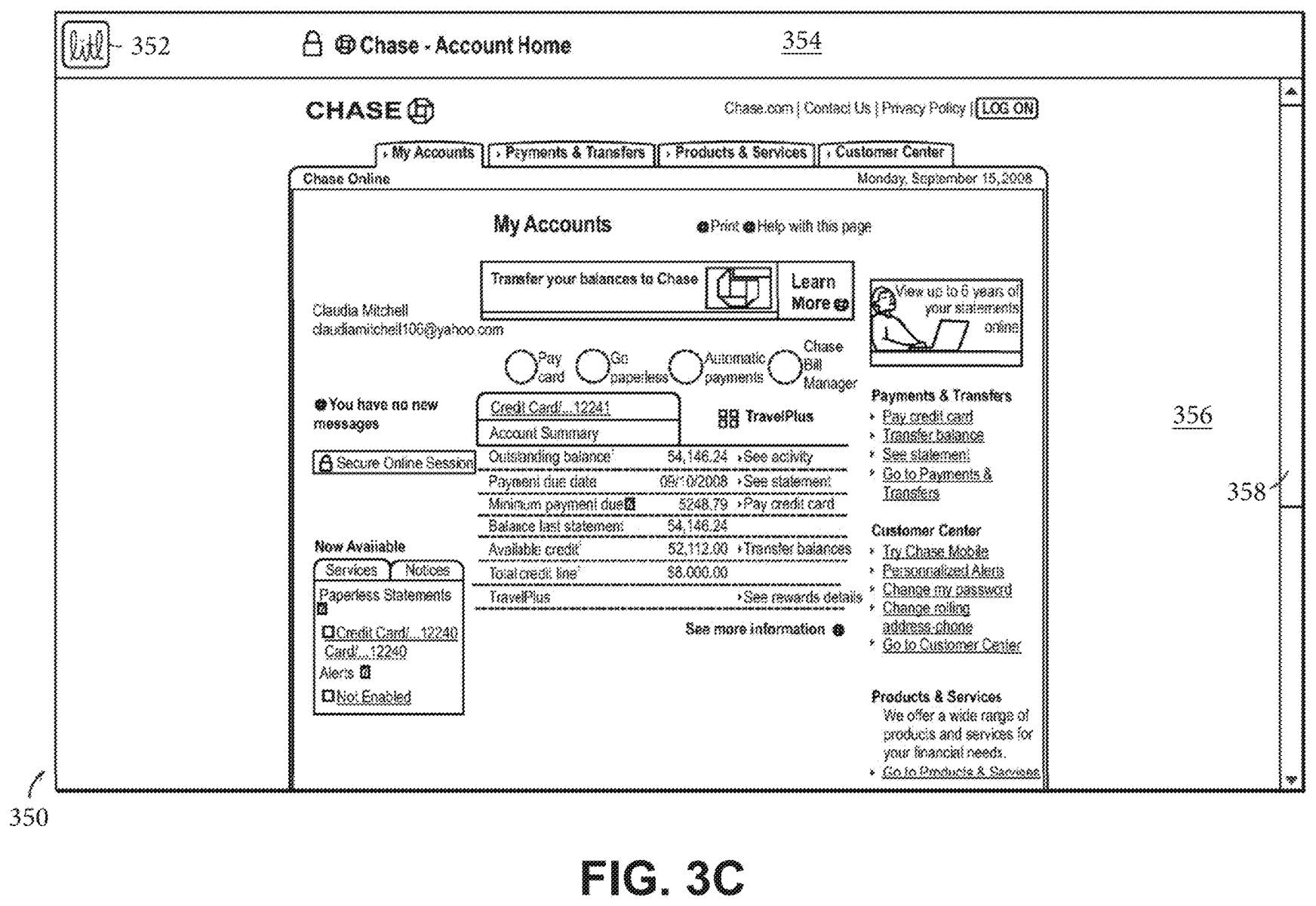

According to some embodiments, the web page view includes a navigation tool, 350, FIG. 3C, and in response to selection, causes the computer to display the home view, 200. Other elements included in the home view, for example, header 252 are configured to provide consistency in the home view across pages and in some embodiments across the user interface. Each page of the home view, 200, further comprises a body, 258, in which cards 202-216 are displayed. The body is associated with a maximal display threshold. The maximal display threshold governs the number of GUI elements displayed per home view page. In one embodiment, the displayed elements may comprise cards, and the maximal display threshold is set to display twelve cards. In addition to the maximal number of displayed elements, the home view may also comprise indicators of adjacent content at 256. The device generates a new page display for the home view, 2000, in response to exceeding the maximal display threshold.

Home view 200 is the default view in laptop mode, and may be implemented as the default view in other device modes (e.g. frame, easel, flat modes). According to some embodiments, the home view is the primary mechanism for permitting users to access cards and navigation through content viewed on the device. In the home view a user can access open web sessions, view and manage their channels, initiate new web sessions, and launch other activities.

Cards, e.g. 202-216, form comprises a plurality of types. Some card types are organized by function, some by content. The home view is comprised of various cards, each card providing access to computer based content. According to one aspect, cards can be thought of as the building blocks of the user interface, providing access to a plurality of views and/or content. Indeed, cards as elements of the GUI, are configured to be shared across users and across other streamlined devices. The ability to employ the features and functions of card based elements may be limited to streamlined devices, although cards and settings may be shared with traditional devices.

Figure 10:
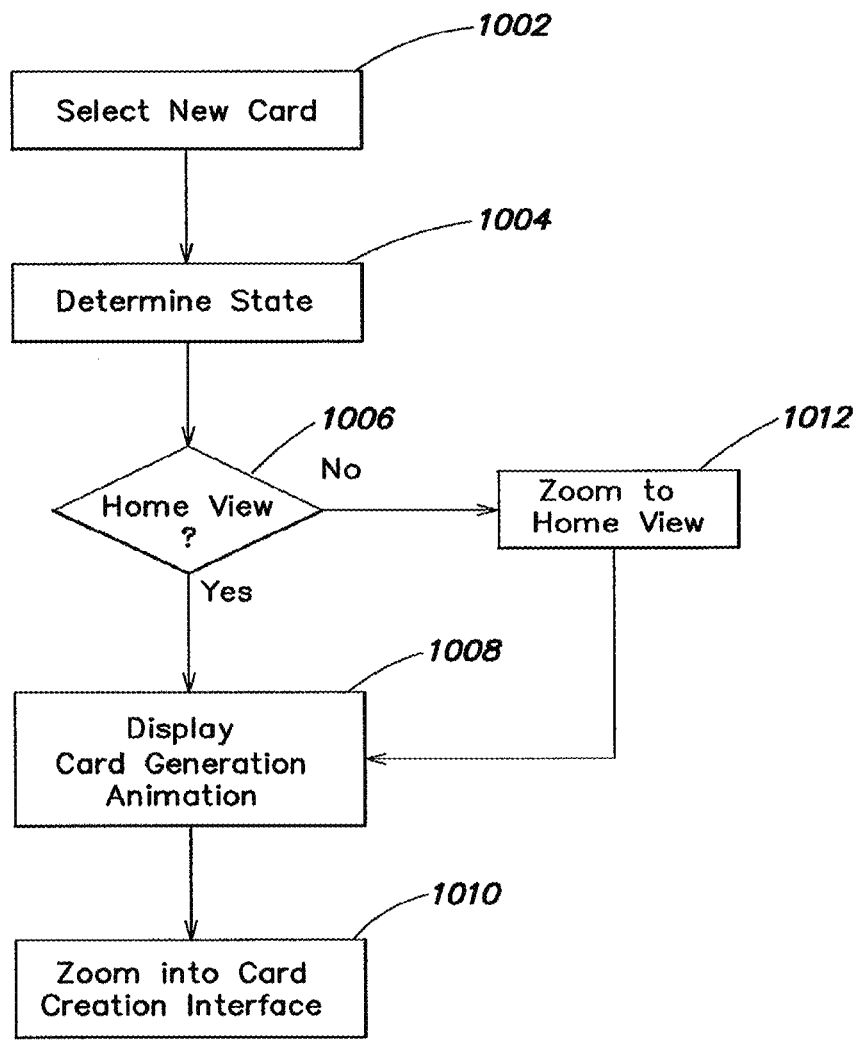
FIG. 10 illustrates an example process for generating a visual representation of computer content, according to aspects of the invention.

Shown in home view 200, are web cards 206, 208, and 216, channel cards 204, and 210, further shown in home view 200 are special system cards that map to content and system operations, for example bookmark card 212. The bookmark card 212 is configured to provide traditional computer operations associated with conventional systems and browsing methods. The bookmark card serves as learning tool, to provide features with which user are familiar in a new format that encourages further integration of card based interactions. According to one aspect, card interfaces are generated by a user for each web based interaction, eliminating the need for convention navigation in the form of bookmarks. Another example of a system card appears at 214. 214 maps to functionality that when selected causes the computer system to execute a web card generation process. FIG. 10 illustrates an example generation process, 1000. Example processes, 1000, begins at 1002, in response to selection of a card or embedded web link (e.g. 214 of FIG. 2) that is associated with a mapping to functionality that generates a new web card. For example process 1000, may be initiated from a page view of a web card in response to selection of link. According to one embodiment, the behavior of the streamlined device depends on instruction embedded within a selected link. In particular, the device in response to selection of a navigation link navigates to the identified location in the same page view. If the link encodes an instruction for open in new window and/or open in new tab, the device in response to selection generates a new card and displays the page view of the new card. Alternatively, defaults may be established for link handling, including a default for selection of a link contained inside an e-mail, which may default to a "new card" mapping, whereas in some embodiments, links directed to the same domain as the current view default to navigation functionality within the same window. In other words, in response to a selection of a link within a certain web-page, directing navigation to another location with in the same web page, the default functionality executed, caused the device to navigate to the selected location within the same window.

According to another embodiment, handling of web links may also be governed entirely by the settings contained in the selected link. For example, the device may execute process 1000 in response to execution of a link including the instruction to open in new window. The device may also execute process 1000 in response to execution of a link including an instruction to open in a new tab. In one embodiment, links without such references are processed by the web page view navigating to the linked location without invoking process 1000, for example.

At 1002, the mapping is executed and the computer device determines its state at 1004. The state determination is configured to identify a current view setting for the device. Current view setting may be limited to an indication that the device is current showing the home view. At 1006 Yes, the device is currently showing the home view, and the device executes a card generation animation, at 1008. In one example, the animation causes the device to display a browse the web card 214, FIG. 2, sliding away from a new visual representation the takes the former place of 214. One the new card image is shown the computer display renders an animation the causes the user to perceive zooming into the newly created card at 1010. Alternatively, it is determined that the device's current display is not the home view at 1006 NO. At 1012, apparent motion relative to the user is rendered by the device to provide the appearing of zooming to the home display. Other animations may be employed to establish for the user the perception of motion to the home view. Once at the home view, process 1000, proceeds as before.

According to one embodiment, the home view, FIG. 2. 200, is configured to manage and organize cards. The home view provides a simple and convenient mode of navigating through the features and content accessible through the device by organizing and managing cards.

Card Examples

According to some embodiments of systems and methods for streamlining user interaction with electronic content, visual representation that render computer operation and/or content in a consistent manner further comprise cards. According to one embodiment, cards may further comprise types, including web cards, which map to active web pages. In some embodiments, device configuration sensitive displays are provided through a graphical user interface. In some embodiments the device configuration sensitive displays include cards. Cards may come in a number of forms. In some embodiments cards may be classified according to the functionality that they provide to a particular user. For example, system cards provide and display computer system functionality that maybe frequently accessed during ordinary computer user and/or may be required for computer use. In some embodiments, web cards provide a user interface for web based content and/or web based activity. In some embodiments, channel cards provide additional features that enable a user to better interact with web based content, and in another example, channel cards provide interactive views by utilizing different content presentations provided by a web source. Consistent user interfaces provide an access layer to system and web based content. Consistent user interfaces are used to access web based content, and even content and applications provided by third parties.

Figure 14:
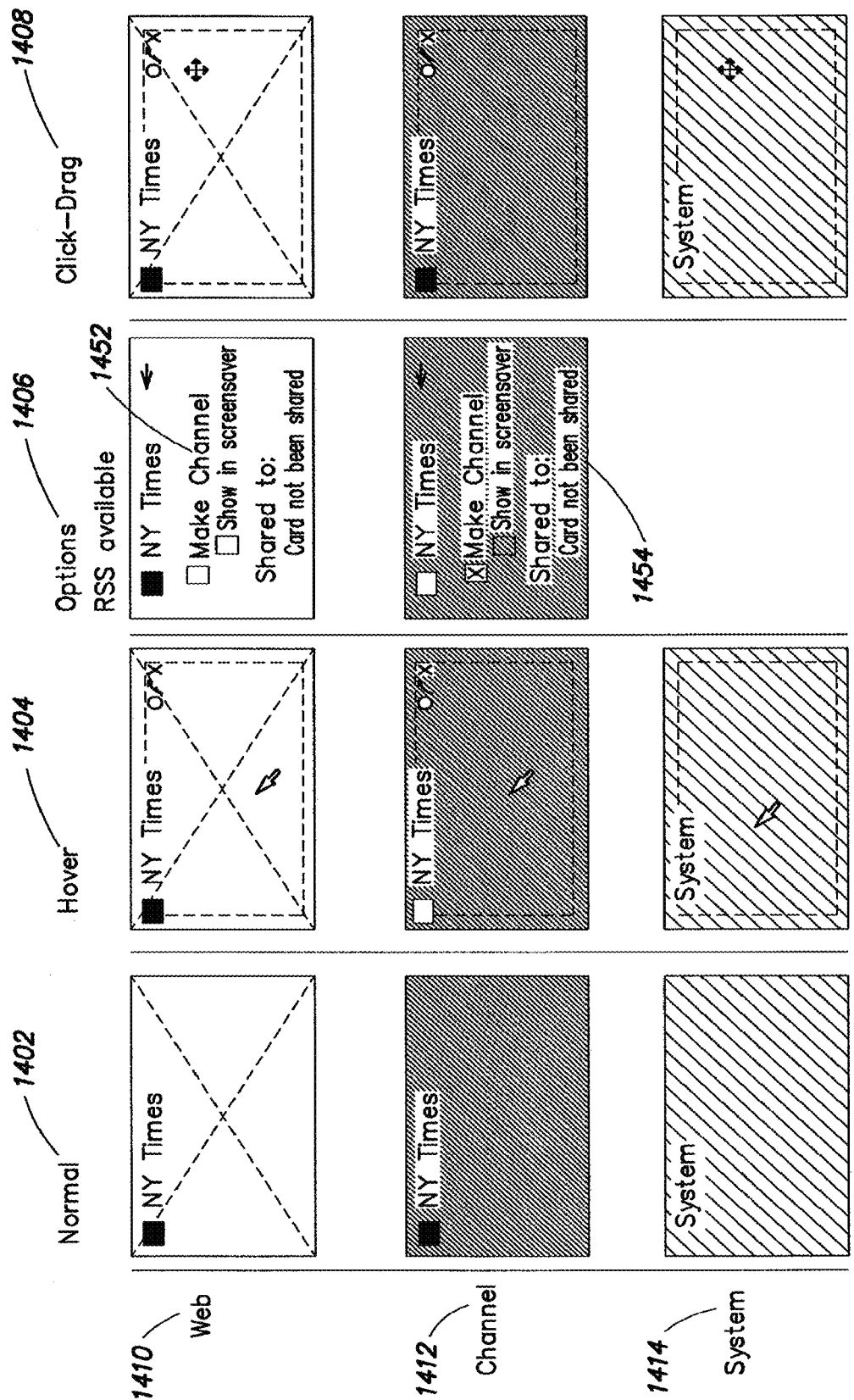
FIG. 14 illustrates an example of a behavior model for display of cards responsive to computer focus, according to aspects of the invention.

In one example, a web card presents a thumbnail view of the current state of the web page. In another example, the web page card presents a cut out view of the web page based on computer focus within the page at the time the web page view was exited. FIG. 14 illustrates, according to one embodiment, the behavior and rendered display of certain cards responsive to computer focus and selection by a user. A card may be in a number of states based on computer focus. One example of computer focus would include "hover" 1404—hover indicates the movement of a pointer, typically represented by a white arrow on the computer system display, over a card. A card may be in a normal state 1402 when not in focus.

Focus is intended to include any identification by the computer system of the card, short of execution of the mapping associated with it. For example, focus should include identification by tabbing through available cards, identification by using hotkeys, among other options that result in computer focus resolving on the card. The terms computer focus and focus should be read to include hovering over a screen element, tool, or other visual representation displayed on a computer system display. In one example, focus follows a displayed pointer, and movement of the pointer with, for example, a mouse causes the computer system to resolve computer focus on the visual object under the pointer display. Selection by a user or a computer system may include focus and visual objects displayed on a computer system display may be selected by moving a displayed pointer. In some embodiments, selection may be accomplished by clicking on a visual object using a pointer displayed on the computer screen. A second "click" may then cause the computer system to execute functionality associated with the visual object. Execution should be read to include initiating an operation associated with a visual object, in one example execution will include clicking on a visual object (single or multiple "clicks"), by positioning a pointer display over the visual object and depressing a button to initiate the operation.

Focus may be resolved on a computer system by analyzing content intended to be displayed before its display on the computer system, additionally focus may be responsive to actions taken on the display through for example pointing devices.

According to one embodiment, when a web card or channel card appears is in a hover state 1404, additional options are display in the card header, for example at 1450. The additional tools displayed in the card header permit a user to select the options associated with the card. The options view for a card 1406, displays available selections contained in the options. For a web card 1410, the options include make a channel 1452. The selection of make a channel at 1452 causes the device to execute functionality that transforms the web card into a channel card. The transformation from web card to channel card includes transforming the display image of the card element on any corresponding view.

Typically the transformation may only be made for a web card that references a content including a rss feed. The items in the rss feed are configured into a customized presentation—as for example a channel card 1412 (discussed further herein). For a channel card 1412, additional options are include show in screensaver, for example. Other states may impact the display of web card including a drag and drop state. Upon focus, the additional tools will resolve in the header section of the card, the additional tools may be displayed as icons, as shown in FIG. 14, and may also be rendered as selectable text options include "bookmark," "share," "options," and "close." If a user depresses the button control and does not release, the user may user drag and drop the card within the home view. The card may be dragged across pages of the home view, and the user may reorder the presentation of cards in the home view using multiple drag and drop operations. According to one embodiment, as a card is dragged across the home view, all displaced cards will appear to move into new places.

According to another aspect, computer content and interactive functionality is recast into cards. In one embodiment, the card comprises a visual representation of web content that simplify the user's interaction with even the most sophistication on-line tools. Cards are configured to present a summarized view of available content and/or present a visual indication of available functions. According to one embodiment, cards form a part of the structure of the graphical user interface between the system and the user. In various embodiments, cards are configured to be context and/or content sensitive. Some cards are configured to be persistent. Persistent card may be removed by an affirmative act of the user.

With cards, content can be easily and visually absorbed by a user. In some embodiments, cards serve to maintain a current state of the user's activity. And in some embodiments, cards also serve to focus the displayed content on contextual information. Cards may be configurable by the users. Configurations options are presented to the user consistently. In some examples, this includes displaying consistent animations designed to draw the user's focus to the particular activity and to provide comfort level for the activity being displayed.

Figure 43:
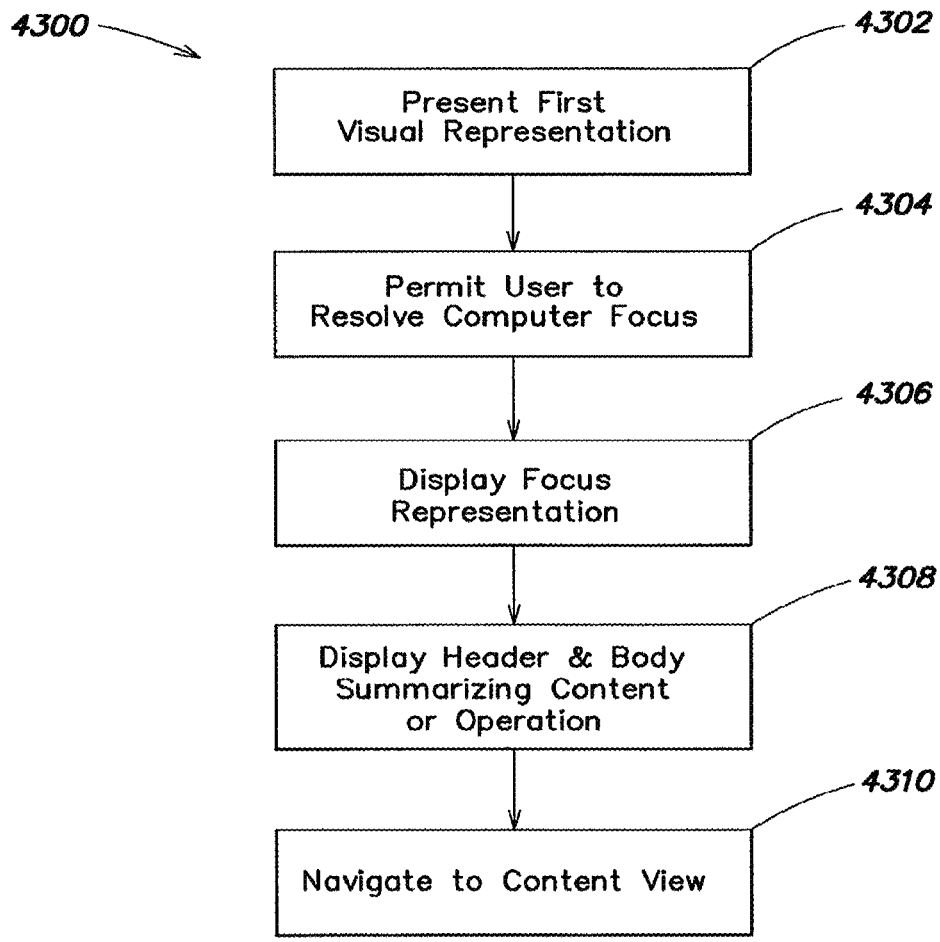
FIG. 43 is a flow diagram of one example process for streamlining user interactions with computer content, according to aspects of the invention.

Shown in FIG. 43 is an example process 4300 for streamlining user interactions with computer content. The process includes presenting a consistent look and feel for user access to computer operations and computer content for user interface elements that also provide for a reduction in decision making requirements imposed on a user during conventional computer use. At 4302, a user is presented with a first visual representation in a computer display, the visual representation is responsive to computer focus and at 4304, and the user is permitted to resolve computer focus by selecting the visual representation. Selection and focus can be thought of in terms of a visual pointer display on the computer system display, by moving the pointer over an object displayed on the computer display, computer focus may be resolved on the visual object. Alternatively, a user may have to indicate a selection of the object by clicking on a mouse button for example.

According to one embodiment clicking is not required. In another embodiment, the pointer being displayed above a visual object activates a "hover" state. In response to hovering, computer focus is resolved on the visual object. At 4306, a focus visual representation is displayed to the user. According to one embodiment, the visual representation and the focus representation are configured to have common elements, and in particular, a header and body display for rendering computer content associated with the visual representations. The focus visual representation including a header and body display summarizing at least one of computer content and computer operations are shown at 4308. The visual representations present a multitude of computer content in a streamlined form, in other words, the visual representation forms an indirection layer of functionality that provides a window into digital content, and/or computer operations linked to the visual representation. In particular, a visual representation mapped to a web page for example, provides a view of the web page in the body of the visual representation and provides additional information about the web page in the header display. The header display may also include tools for providing easy access to computer functionality associated with the web page and/or its content. In one example the header display only display the tools in the focus visual representation so the initial view of the content is not cluttered with tools that are not needed. Further, in one embodiment, the tools only display in response to focus, in other words, only when a user indicates they are necessary by moving a display pointer over the visual representation. Further computer logic may be embodied in process 4300, responsive to a display position of a pointer displayed on the computer screen. In response to the display position of the pointer occupying the same location as another visual object, computer focus is resolved on that object, causing the computer system to determine functionality associated with the object.

In one example, the object is a visual representation, and in response to moving the pointer over the visual representation, the computer is caused to display a focus visual representation associated with the visual representation. In one example, computer focus remains with the focus representation and functionality associated with the focus representation is made available for execution. Other operations including display of a header responsive to focus may be executed. At 4310, a mapping associated with at least one of the focus visual representation and the visual representation is executed causing the computer system to navigate to a content view. The content view may include a display of computer operations. In one alternative, the content view provides an interactive view of computer content. In one example the computer content, comprises online content viewed through a web browser. In another example, the content view is presented in a similar format as the visual representation used to navigate to the content. In one particular example, the content view includes a header display and a body display, and the content is displayed in the body portion. The header portion provides additional information on the content, for example a title, and may further provide additional tools that are responsive to focus. Again providing tools that resolve when needed and disappear when not reduces the amount of information a computer user need to assimilate in order to use a computer system.

All computer content and operations can be configured to display in visual representations and respective focus visual representations, providing a user with a streamlined presentation of computer content and operations. According to another example, different content types are presented through visual representation of a similar format. In one embodiment, the visual representations comprise cards as discussed herein.

Figure 44:
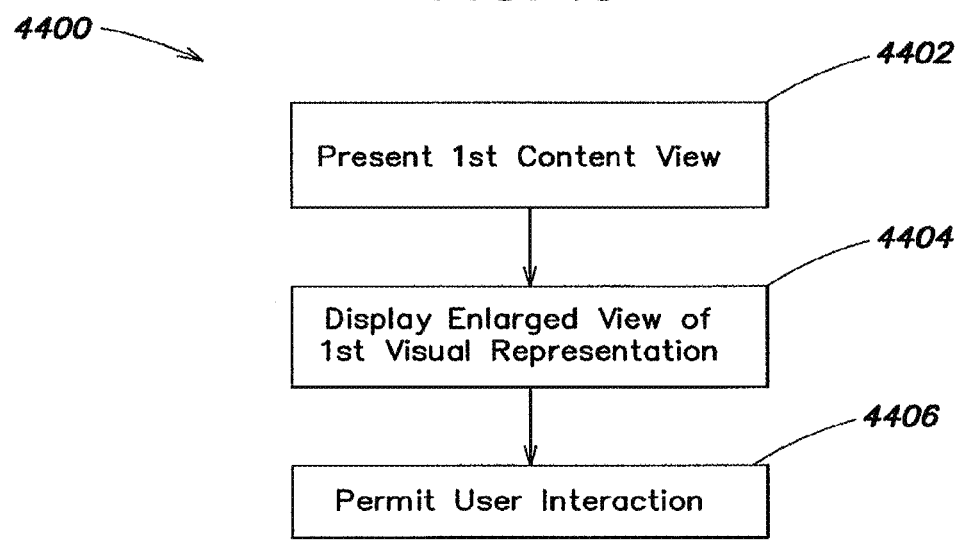
FIG. 44 is a flow diagram of one example process for permitting a user to interact with computer content, according to aspects of the invention.

A process 4400 may be invoked by streamlined computer system as part of process 4300. Additionally, process 4400 may operate independently or be called from other processes. Shown in FIG. 44 is a process 4400, for permitting a user to interact with computer content. At 4402, a computer system displays a first content view. The first content view is configured to display in a similar format as a visual representation selected by the user to navigate to the content view. In one embodiment, the first content view includes a header and body display. In another embodiment the content view is a zoomed in view of the visual representation used to navigate to the content view. At 4404, an enlarged view of the first visual representation is displayed. In one example, the content view comprises a web browser view of a web page displayed in the body of the content view. The visual representation used to navigate to the content view displays a portion of the web browser in the body of the visual representation. At 4406, a user is permitted to interact with the content displayed in the body of the content view. The user is further permitting to access options associated with the content through the header display. Optionally, further computer logic may be included in process 4400 for presenting focus and unfocused views of the header in the content view.

According to another aspect, cards types should be clearly defined by color scheme and appearance, while at the same time maintaining a similar format. For example the similar format should include header placement and sizing, display of tools, title and frame size. In one embodiment, a color scheme configured to differentiate card types provides for web cards with white headers with the content displayed on the web card showing as a thumbnail of the current state of the page. Channel cards are configured with black headers, and the content presented in the channel card comprises a simplified representation of web content based on RSS feeds or custom visualizations of some non-RSS websites. Customized visualizations may be pre-loaded on the device for specific websites, or may be provided as part of a remotely stored device profile and/or global profile. Updates to the device profile and/or a global profile would include development of customized visualizations of non-RSS websites, and access to remote storage trigger delivery of the customized visualizations. According to one embodiment, only sites for which RSS or custom visualizations are available can be displayed as channel cards.

System cards are shown either with blue headers or grey headers. System cards may be further classified to include nascent cards. "Browse the Web" card, FIG. 2, 214 is an example of a nascent card. The nascent card may be configured so it position is not configurable, nor is a user able to remove the card from the home view, or any view. The nascent card maps to functionality necessary to operation of the streamlined device, and thus no option to close and/or remove it is available. Other system cards are configured to represent activities that have been specifically designed such as for example, photos & video card(s). The other system cards map to functionality also regarded as necessary so that the other system cards can not be deleted, however, the other system cards can be reorganized in for example the home view. Functionality mapped to by the other system cards include communications card, for configuring wireless access of the device, bookmarks for presenting conventional styled web page bookmarks, camera for providing for configuration and operation of a camera, either embedded in the device upon construction, or incorporated through for example a USB port.

In one embodiment, a system card is mapped to functionality to provide a user with streamlined access to web bookmarks. In one example, a bookmark card is provided that is always accessible from the home view. As with other system cards, the bookmark card comprises a header and a body. According to one embodiment, the body display for the bookmark card is unique to the bookmark card. Bookmarks are retrieved and displayed in the bookmark card one at a time. In one example, the bookmark card indicates in the body display the number of the bookmark in the list and the total number of bookmarks available.

According to some embodiments, the interactivity of individual cards is limited to navigation to a page view. For example, a user can not change the content of a card by interacting only with the card. In other embodiments, channel cards, for example, provide a user with the option of interacting directly with the card. Upon hover, channel cards presenting news feeds may resolve navigation tools configured to step through individual rss items displayed in the channel card. Additionally, selection within a channel card presenting a news feed causes the device to execute different mappings depending on what part of the channel card was selected for execution. Clicking directly on an rss feed headline for example, caused the device to execute a mapping to the web page view for that article. Selecting the body of the channel card causes the device to execute a mapping to the channel full view. Selection within the channel full view causes the device to display a content menu, responsive to manipulation of a scroll wheel.

In an embodiment employing a three card presentation, the cards that are presented provide the user with the ability to interact with system specific features. System features may be invoked and display using consistent presentation and/or animation. Consistent presentation of like features may engender a comfort level in the user for new features that appear using the same and/or similar presentation. Additionally, where a user invokes features in a similar or consistent manner, access of new features is facilitated and user comfort level may be increased. For example, a nascent card, is a system card that provides for consistent implementation of user activity and/or a computer objective desired by the user. In one embodiment, the "new card" card is a visual representation of a system placeholder for generation and presentation of new card that a user may created during the course of ordinary activity. By selecting the new card (for example, creating a web card used to interact with web content) a consistent animation may be employed to display to the user the creation of the new web card utilizing the nascent "new card" card. Other system features may be presented through system cards. Typically, system cards will represent functionality used most frequently and/or functionality that should always be available and not subject to removal by a user. Other card types, include web cards that are used to present web content, and channel cards that are used to provide to a user easy and/or consistent access to additional features.

According to another aspect, features of cards may include consistent navigation tools, consistent content display—including limiting the ability to alter content of a card through user interaction with the card, state representative images of content, state and context representative images of content, customized visualization of content, and in some examples customized visualizations include information derived from rss content. In one embodiment, user interactions with cards are also streamlined. In another embodiment, when card configurations and/or card options are selected by a user (if available) a consistent animation is presented to the user. For example, selection of a card's options may cause an animation displaying the flipping of the card and the revelation of user selectable options. Options, for example, may include permitting the content reflected in the card to be displayed as a screen saver. Certain features may only be available for certain cards types. In one embodiment for example only channel cards (discussed in greater detail herein) may be displayed in the screensaver mode, thus only channel cards will display the option to permit display in screensaver. In another embodiment, certain card types may be converted through user selection. In one embodiment, web cards may be converted into channel cards. It is realized that the segregation of functions between the card types may improve user interaction and adoption of the different feature sets available to each.

Figure 47:
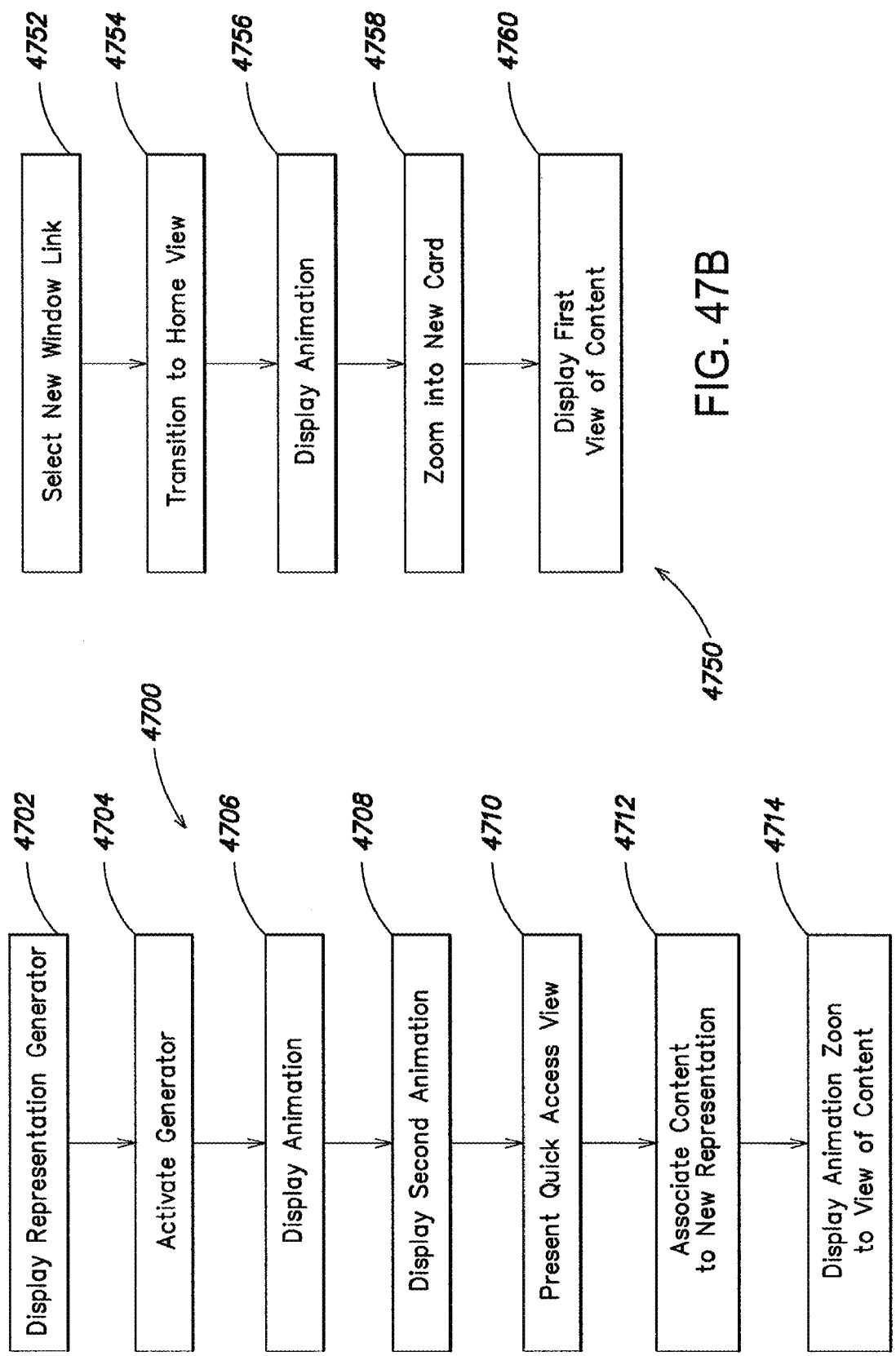
FIG. 47A-B are flow diagrams of example processes for generating a user interface element, according to aspects of the invention.

According to another embodiment, systems and methods for streamlining user interaction with electronic content may include a process for generating new visual representations mapped to computer content. Shown in FIG. 47A is an example process 4700, for generating a user interface element. At 4702, a visual representation associated with a computer operation for creating a new visual representation is displayed on a computer system display. The visual representation may comprise a nascent card. Nascent cards are configured to always be available to a user, that is, they are configured so a user can not remove them. In some embodiments, the position of the display of nascent cards cannot be changed by the user. In one embodiment, the nascent card is always displayed in a home view, at the bottom right corner of a home view page. For a new page this may include the nascent card appearing in the upper left corner of the page, when no other cards are displayed on the same page. At 4704, execution of the functionality associated with the visual representation occurs. At 4706, a first animation is displayed to the computer system user showing the visual representation sliding away from its present location to reveal a new visual representation. At 4708, a second animation is displayed to a user showing the computer system zoom into the new visual representation to present a quick access view at 4710.

The quick access view is configured to permit a user to select computer content to associate with the new visual representation. In one example, this includes presenting a display of frequently accessed web content (e.g. web pages) to the user in the quick access display. It is likely that the user will intend to return to a page frequently accessed, in which case, the display will meet the users needs, however, the quick access view is further configured to permit entry of a uniform resource indicator (e.g. a url), and further configured to allow a user to request display of bookmarked locations. At 4712, a user is permitted to select computer content to associate with the new visual representation, and in response to selection of the computer content, the computer system displays an animation to the user depicting the computer system zooming into a first view of the selected content at 4714.

In one alternative, new visual representation may be generated without selecting a nascent card, in process 4750, FIG. 47B. For example, a web card may include a hyperlink directing a computer system to display the linked web page in a new window. At 4752, a user selects an open in new window link. In one alternative, the link may include instruction to open an new tab. In response to a request to display a web page in a new window, a new visual representation is generated and associated with a mapping to the web page. The computer system displays a transition from the current web card view to the home view, 4754, displaying the nascent card. In an optional step, the process zooms out the home view so that the nascent card is rendered on one page. The system presents an animation to the user, 4756, similar to step 4706, showing the nascent card sliding away from its position, revealing a new visual representation. The system then zooms in on the new representation, 4758, displaying a first view of the mapped content, 4760.

Common Card Configurations

According to one aspect, cards should have common features to promote user acceptance and improve adoption of different cards, while providing familiar a form. According to some embodiments, most cards are configured with a similar anatomy. According to some embodiments, cards comprise certain common elements described with reference to illustrated examples.

Figure 15A:
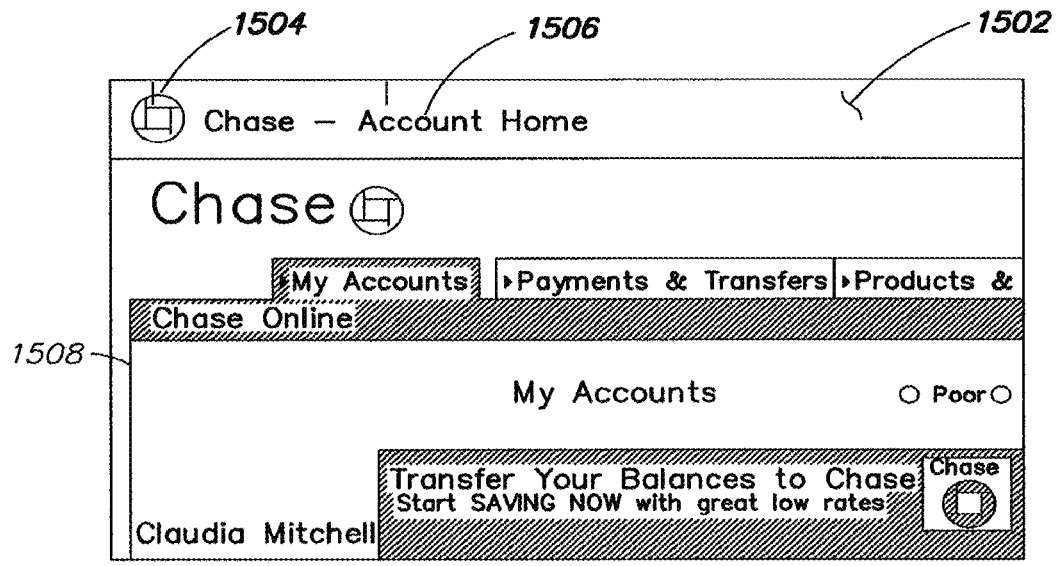
FIG. 15A is a screen shot of an example web card in a non-hover state, according to aspects of the invention.
Figure 15B:
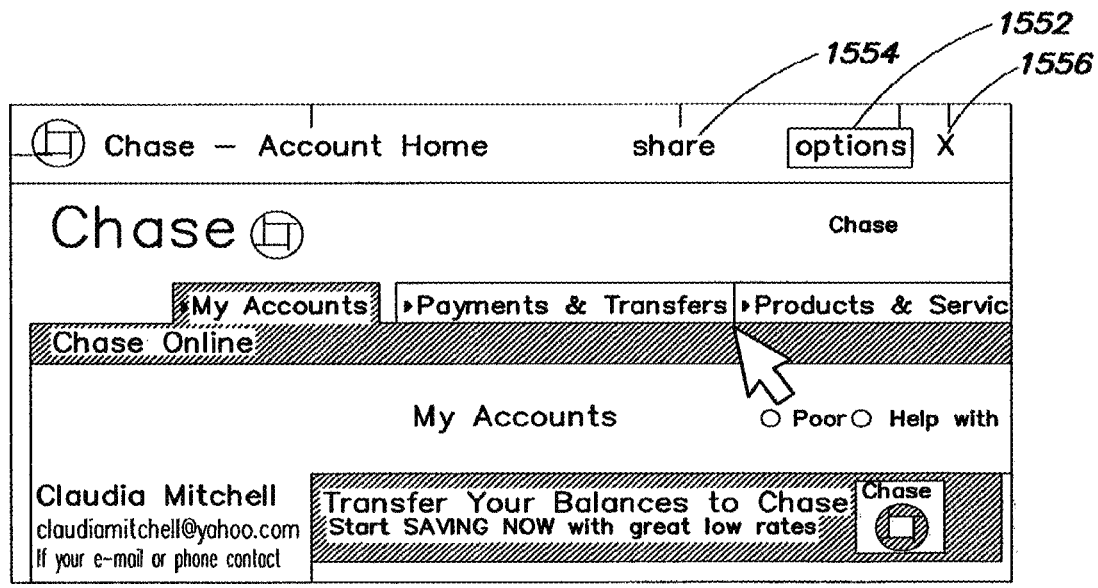
FIG. 15B is a screen shot of an example web card in a hover state, according to aspects of the invention.

With reference to FIG. 15A shown is an example of a web card when not in focus, however, the common features among the cards are discussed in greater detail. Header 1502 run along the top of the card. The color depends on the color scheme employed to differentiation the type of card: in one example white is used for web cards, black for channel cards, and blue and grey for system cards. Optionally the header includes a favicon 1504 (the favicon may be retrieved from the site being view in the case of web and channel cards and a custom favicon is employed for system cards). The header further comprises a title 1506 for the site or activity conducted, and a body 1508. In response to focus on a card the display of the card becomes a little larger relative to its display when out of focus and the card controls 1552-1556, FIG. 15B, are revealed on the header, when in a focused state.

Card options 1552, reveals the card options, and may in some embodiments invoke an animation of the card flipping to reveal selectable options. Share, 1554, is configured to permit a user to share the card with other user. Delete, 1556, removes the card from the home view. Card controls, such as 1552-1556 are typically not available for system cards, which typically can not be shared or deleted. According to one embodiment, the photos & video system card is configured to display the card options (in one example the photo & video system card permits selection of "Show in screensaver"). 1508, FIG. 15A, card body varies by the type of card displayed. In one embodiment, a web card body 1508 comprises a thumbnail of the current state of the web page. The current state thumbnail may be updated. Updates may occur in conjunction with a timer. Typically the timer is set for default operation, and is not configurable by a user, although in some embodiments a user may access and modify an update interval for web cards through system configurations.

The body of a channel card (not shown) comprises a visualization of the rss feed from the web site source. Sites that do not have rss feeds, typically, will not be able to be displayed as channel cards. However, customized visualizations for some static sites are preloaded and for the preloaded static sites an rss feed is not used to display the web site content in a channel card. System card body (not shown) comprises a custom image configured to represent the system activity mapped to by the system card.

Options and Information Associated with Various Card Embodiments

Figure 16:
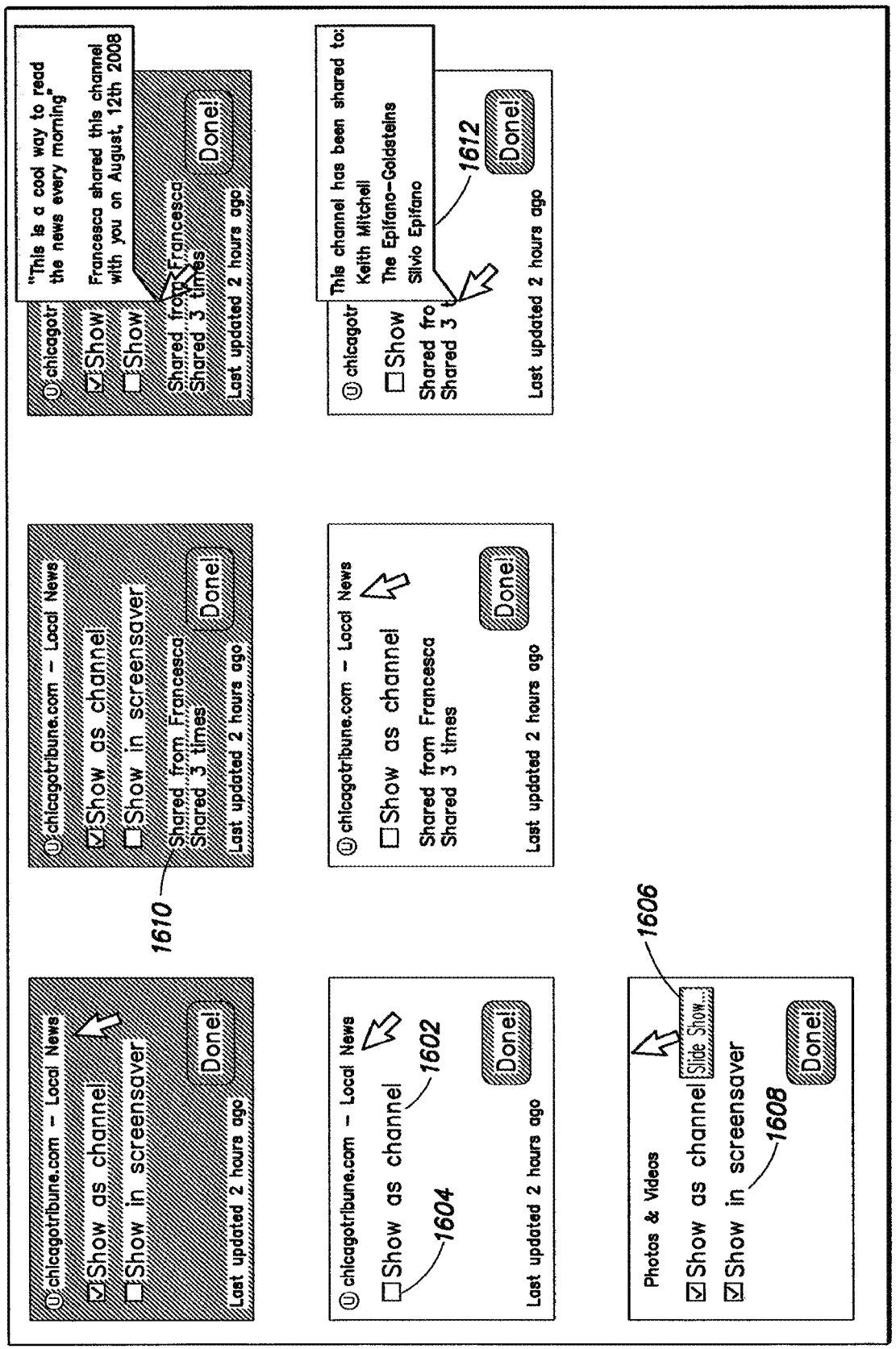
FIG. 16 is a screen shot of examples of option views of cards, according to aspects of the invention.

According to one embodiment, selection of the card options icon causes the device to display a visualization of the card turning over. The "back side" of the card, FIG. 16 (showing a plurality of examples of the backs of various card types) comprises the following options: Show as channel 1602, which transforms a web card into a channel card, and vice-versa, based either upon checking or unchecking box 1604. If the channel is a photo and video channel, this control reads "Show as channel using [lens]." A lens is a customized visualization for computer content. Shown in FIG. 16 is an example lens "Slideshow" at 1606.

According to another embodiment, the option for show as channel is either shown as permanently checked for system cards that are always available as a channel (e.g. the photos and video card), or as absent for system cards that are not available as a channel (e.g. a system settings card or communications card). Show in screensaver, 1608, is an available option for channel cards. Typically 1608 is not an available option for other card types, however, the photo and video system card does permit its content to be displayed in the screensaver. According to one example, new channel cards are configured to not display in screensaver mode by default and this option is not checked for new channel cards. Shared from, 1610, provides information on the user or device from which the card was shared. According to one embodiment, system cards cannot be shared, and do not display "shared from" information. Additionally, shared from 1610, does not display for card generated by a present user. In one example, shared from 1610 is responsive to computer focus (e.g. hover). Hovering over the Shared From line, 1610, causes the device to display an informational bubble with a list of people to whom the card was shared. Other options may be employed for displaying shared from information. Other options may include linking to a display list for share from information, and in some embodiments may include displaying the shared entities on the back of the card without selecting 1610, Shared From. In such embodiments a maximum number of shared entities may be displayed before requiring selection of a more control. The more control expands on the list of shared entities to provide for listings that do not fit within the space provided on the back of a card.

Shared to, 1612, provides information about whether and to whom the card has been shared. According to one embodiment, system cards can not be shared, thus no shared to information is displayed. By default shared to, 1612, does not display until a card has been shared. According to some embodiments, the "shared to" field is responsive to focus. In one example, hovering over the shared to line causes the device to display an informational bubble with the list of people to whom the card has been shared. Other options may be employed for displaying shared to information. Other options may include linking to a display list for share to information, and in some embodiments may include displaying the shared entities on the back of the card without selecting 1612, shared to. In such embodiments a maximum number of shared entities may be displayed before requiring selection of a more control (not shown). The more control expands on the list of shared entities to provide for listings that do not fit within the space provided on the back of a card. Optionally the more control may cause the device to display an information bubble containing the remaining shared entities and/or all the shared entities.

Organization of the Home View

Typically, the home view is configurable by the user. New items may be added, existing items may be moved and/or removed based on user selection. The home view further comprises some visual representations that can not be removed. Commonly requested system operations have visual representation displayed on the home view that can not be deleted. According to one embodiment, a user may reorganize the display but not remove representations for system operations. For example, visual representations that map to system operations (e.g. a communication card and a camera card) cannot be remove from the home view. Nascent cards, for example, the Browse the web card, can not be removed from the home view. According to some embodiments, the Browse the web card is further limited in configurability, in that, the positioning of the card will not change relative to the other cards. For example, the Browse the web card will always be displayed last. In other examples, nascent cards may have other positions that do not change, first to be displayed, last displayed on first page of the home view, etc. In some embodiments, even nascent cards may be reorganized in the home view display.

The user interface may include default settings for organization. For example, a default organization for the home view comprises an arrangement roughly based on order of creation, from left to right, top to bottom. Other organization may be employed right to left, top to bottom. In one example, the user of the streamline device is located in China, and the default organization is presented from right to left.

One example default setting for the home view establishes a number of cards to display per page of the home view. In one example the default caused the computer to render twelve cards on a page. In another example, the display of the twelve cards further comprises the tops of the cards on the next page or the bottoms of the cards on the previous page, as appropriate. In one embodiment, the home view includes maximal display thresholds configured to improve the ability of the user to absorb the information presented. In some embodiments, a maximal number of visual representations per screen is set. In one example, the maximal number of visual representations is used to define a GUI page. In another example, the maximal number of visual representations is associated with a maximal number of full view visual representations, and the page is configured to include portions of views of other visual representations available on adjacent pages. A computer operation that would cause the computer device to exceed the maximal number results in the creation of a new display page. The home view is organized into as many pages are required in order to maintain the maximal threshold of display items.

It is to be appreciated the different organization options may be employed for the home view. In one alternative, frequency of use may be employed to organize the cards displayed in a home view. The most frequently accessed content may be display first with the least frequently accessed content being display last. Another option includes the use of last accessed information associated with a particular card. The most recently accessed card may be displayed first and the card with oldest use would be displayed last.

Creating New Cards

An example process 1040, FIG. 10B may be executed to generate a new card. Process 1040 is executed in response to a user clicking the Browse the Web card on the home view at step 1042. In response to the execution of the Browse the Web card, the devices displays the card sliding to the right (or down to the far left on the next row if it is already on the far right) as a new web card is created in its place at 1044. At 1046 the system renders apparent motion in the display, showing the system zooming into the new web card. At 1048, the system displays a quick access view configured to generate a mapping between the new card and web based content. According to some embodiments, newly added cards (whether created by the user or received as a shared card from another user) always appear at the bottom of the home view next to the Browse the Web card. In other embodiments, the Browser the Web card may display a different title, for example, "New Card." It is to be appreciated that the title is not particularly relevant to the nascent card, but rather, the functionality for generating new card is.

New cards may also be created on the fly during a browsing session as part of process 1080, FIG. 10C. Process 1080 begins at 1082 in response to either a user clicking an "open in new window" link on a web page, or in response to a user executing a keyboard shortcut (e.g. Shift-click) to perform the same function. Additionally links that contain computer instructions to open link in new tab will invoke the same functionality at 1082. In these cases, the system shows an animation zooming out of the current card to the home view at 1084, optional step 1086 cause the system to display movement to the last page of the home view (if not there already), at 1088 the Browse the Web card slides out of the way, revealing the new card in its place at 1090, and finally zooming into the new card, 1092. Process 1080, may be implement in association with a timer to govern the overall execution time of process 1080. In one example, the process and animations should take no more than about half a second.

According to one embodiment, selection of the Browse the Web system card causes the system to execute a process for generating a new web card. As part of the process for generating a new card, the system presents a quick access view to the user. Referring again to FIG. 5, shown is an example of a quick access view. As discussed earlier, the body 502 of the quick access view may display a frequently accessed list of content. A user may select from the displayed content to generate a mapping for the new cards, and enter the web page view for that content. Additional at 510, the quick access view presents news from, for example, the device manufacturer. At 510, news regarding operation of a streamlined device may be shared with the streamlined device user community. Advice on new features may be provided, 512. And awareness drawn to new features. Hints and suggestions may also be displayed, for example, 514, referring users to GOOGLE DOCS, and on-line word processing/office suite solution.

According to another embodiment, creation of a channel card is available for sites with rss feeds or sites for which customized visualizations are available. From the home view any web card with rss feeds or with customized visualizations can be used to generate a channel card. From a web page view, hovering over the option add channel caused the system to display a preview of the channel card. In one embodiment a channel card includes features not observed in web or system card. For example, channel card 204, includes a display, 280, for an individual rss item received from the online source. In this case the rss item is a headline that permits direct access to an article (typically through a web card). Channel card, 204, will display a plurality of rss items one at a time through the channel card, thus the content in a channel card periodically changes, until al content items have been displayed. At that time the channel cards starts again from the beginning displaying each one of the plurality of source items.

Removing Cards

According to one embodiment, the home view may be configured by a user. A user may remove visual representations from the home view. In a card example, a user may access card option by providing focus on the card. As discussed above, card options are revealed in response to focus. Options may comprise a delete option. In one example, a delete option is display as an "X" in the upper right corner of a hover view of a card. To delete a card from the home view, a user executes the delete option by clicking on the "X." In response to removal of a card from the home the view, the remaining cards on the home view are reordered by the device. In one example, the reordering comprises shifting of the displayed cards to rearrange them into the organizational schemes discussed above. In order to ensure a close/delete selection was intended and to provide the user with the ability to change their mind, an information display bubble may be generated in response to the delete execution. The information display bubble maps to functionality that causes the device to undo the delete operation in response to selection by the user.

According to one embodiment, a dialog bubble is displayed off of the header of the home view. The dialogue bubble displays a message confirming the delete operation and further comprising a mapping to functionality provided, the causes the device to undo the delete operation in response to selection. According to another embodiment, hot-key functionality is provided that cause the device to undo that last activity performed by the device. In one example, ctrl-z, is mapped to functionality that permits the last activity to be undone.

Home View Navigation

According to one embodiment, the home view in configured to display a maximum number of visual representations. For embodiments employing cards that map to computer content and/or operations the maximal number of visual representations will restrict the number of cards displayed per page of the home view. In one example the display number is set to twelve. In response to exceed the display number, the device executes operations designed to render a new page for the excess. In response to multiple pages, the device is configured to display indications of content (e.g. cards) on adjacent pages. In response to movement of a pointer, visual representation displayed on the screen tracking computer focus, new pages may be displayed. In one example, multiple pages are provided by the view. The display rendered by the device give a user the impression that adjacent pages appear above and below the current page view. For example, indications of adjacent card content appear at the top and bottom of the home view body. By scrolling the pointer towards the bottom of the screen the user causes the device to display the next page of the home view, further by scrolling the pointer towards the top of the screen the user causes the device to display the previous page of the home view. Additionally, according to one embodiment, arrow keys provided on the device's keyboard may be used to navigate pages of the home view. In one alternative, keyboard shortcuts mapped to navigation functionality. In one example, keys with mapped navigation functionality include shift-arrow, crtl-arrow, alt-arrow to provide further navigation options.

One may navigate away from the home view at any time by selecting a visual representation and causing the device to execute the mapping associated with the representation. In one embodiment, a user selects a card and in response the device renders a page view appropriate for the selected card (e.g. web page view for a web card). In one embodiment, an integrated scroll wheel provides navigation functionality from the home view. Scroll wheel functionality may be dependent on state of the device, and may also be dependent on configuration of the device. In one example, the device's present state is its home view and manipulation of the scroll wheel causes the device to display the channel card view. According to one embodiment, returning to the home view is streamlined for the user. This may be accomplished through navigation buttons on the keyboard, for example 168, FIG. 17. The navigation button operates as a toggle between present view and home view, returning a user to the home view when the present view is elsewhere, and returning the user to the previous view when the present view is the home view. A navigation element provided in visual representation of computer content may also provide the same functionality. For example, navigation button 250, in home view 200. In another example, a navigation button, 352, FIG. 3C is provided in a web page view.

Reorganization of visual elements in the home view may implicate navigation with the home view. In one example where the home view presents cards to a user through multiple pages, moving cards across the pages requires navigation within the home view. According to one embodiment, specialized navigation options are provide to render sufficient context for the relocation across pages. In one example, a user drags a card across pages within a home view. The device in response to the drag across pages modifies the display of the home view to show a zoomed out display of the home view. The zoomed out display is permitted to violate any associated threshold with respect to number of displayed items on a page of the home view. The zoomed out display in a view of multiple pages with each element of the pages being reduced in size to allow them to be displayed in one screen. For long lists of cards, or other visual representations, this may result in extremely small visual representations or cards. It is realized that even thought the result may be visual representations so small that they cannot be fully appreciated, the user goal is to relocate a card, and the temporary loss of interactivity to the user will not impact the user operation. Once a card is relocated, the device caused the display to "zoom" back out to conform to management and organization scheme discussed, including maximal display thresholds, for example.

Navigation away from the home view may also occur through selection of the visual representations that map to computer content and/or functionality. In one embodiment, clicking on a card will zoom into that card, revealing the page view for that card. In one example, clicking on a web card caused the device to display the web page view for that card's content. In another, clicking on a channel card may invoke different behavior. In a channel card example, the navigation behavior depends on the location within the card that is clicked.

Some channel card embodiments, display items from rss feeds one at a time, scrolling through the rss items based on a timer, and in one embodiment, based on selection of navigation tools within the card. If a user clicks on the body of the channel card for example, the device causes the channel page view to be displayed for that card. If a user clicks on an rss item displayed in the channel card, the device causes a web page view for the specific content to be displayed. In one embodiment, a channel card maps to a content feed from the NEW YORK TIMES. Clicking on an article title in the channel cards causes the system to execute a mapping to the content by opening a new web card and zooming into the new card's web page view of the selected article. Clicking elsewhere the channel card causes the system will zoom in to the channel page view for that card.

According to one embodiment, searching from the home view causes the user interface to navigate away from the home view. For example, entering search terms into search box 254, FIG. 2, cause the device to execute a process for generating a new web card and navigating to the page view of the newly created web card. The device in creating the new web card automatically creates a mapping to web content based on default settings. In one example, the default settings provide for searching to occur through the well known search tool GOOGLE. Other search tools may be established as the default. By accessing a system card for settings, in one example, displayed as a Settings card, a user may change the default for the search tool. Further default operations are provided by the user interface. While in the home view, any typing that occurs on the keyboard (except for hot keys and keyboard shortcuts) will be default populate the search box of the home view. Pressing return or clinking on the search tool 255, will execute the process for a new card and pass the search terms to the default search tools, and the device displays the web page view of the default search tool and its response to the search terms.

Example Page Views

According to one aspect a streamlined user interface is provided, that permits a user to access electronic content on a device responsive to context and responsive to device configuration. According to one embodiment, an element of a graphical user interface that provides streamlined access includes a plurality of views of computer content. Another element of the GUI, includes visual representations of computer functionality and/or content that are associated with a mapping to at least one of the plurality of views. In one example, the visual representations comprise cards, as discussed above. The various types of cards can each be associated with one of the plurality of views, and may also be associated with multiple views. A high level view may be provided to manage and organize the (for example in a home view). The card may be associated with a lower level view which permits more direct interaction with the viewed content. In one example, a web page view permits a user to interact with displayed web content for a web page. Other views including a channel page view, provide lower level views that permit interaction with content specific to channel cards, and system page views provide, for example, a lower level view of system functions mapped to by the system cards. System cards may be further classified into nascent cards, and different page view provided according to classification.

Figure 45:
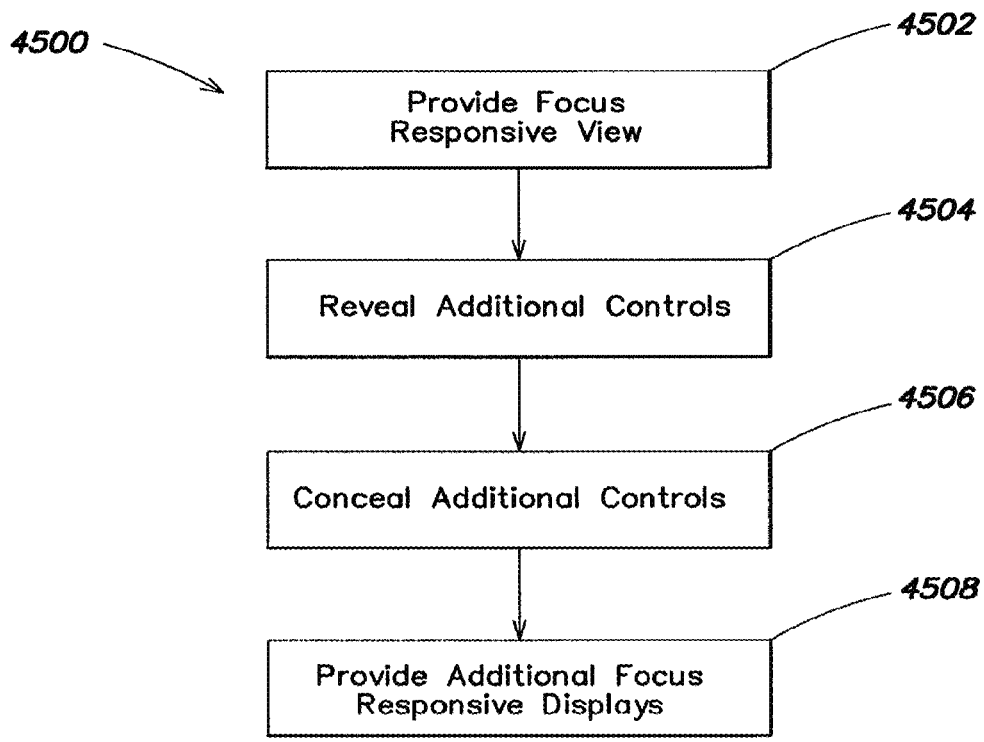
FIG. 45 is a flow diagram of one example process for providing consistent accessibility to computer content, according to aspects of the invention.

According to one aspect, methods and systems for streamlining user interaction with computer content and operations may include a process for providing consistent feature accessibility across a plurality of views and a plurality of visual representations of computer content. FIG. 45 illustrates one example process, 4500, for providing consistent accessibility to computer content across a plurality of views and a plurality of visual representations of computer content and/or operations. At 4502, a view of computer content is provided. The view is configured to include visual elements responsive to computer focus, however achieved. The view of computer content includes a header display further comprising a focus header display and an unfocused header display. In response to focus, the focus header display reveals additional controls associated with the computer content, 4504. At 4506, focus is removed from the focus header display and the computer system transitions the view of content to an unfocused header display, concealing the additional controls at 4506. In one embodiment, responsiveness to focus provides for user consistency in accessing a plurality of views and with respect to visual representations of computer content, and at 4508 a plurality of representations and views provide additional focus responsive displays, which are configured to include focused and unfocused presentations.

Figure 46:
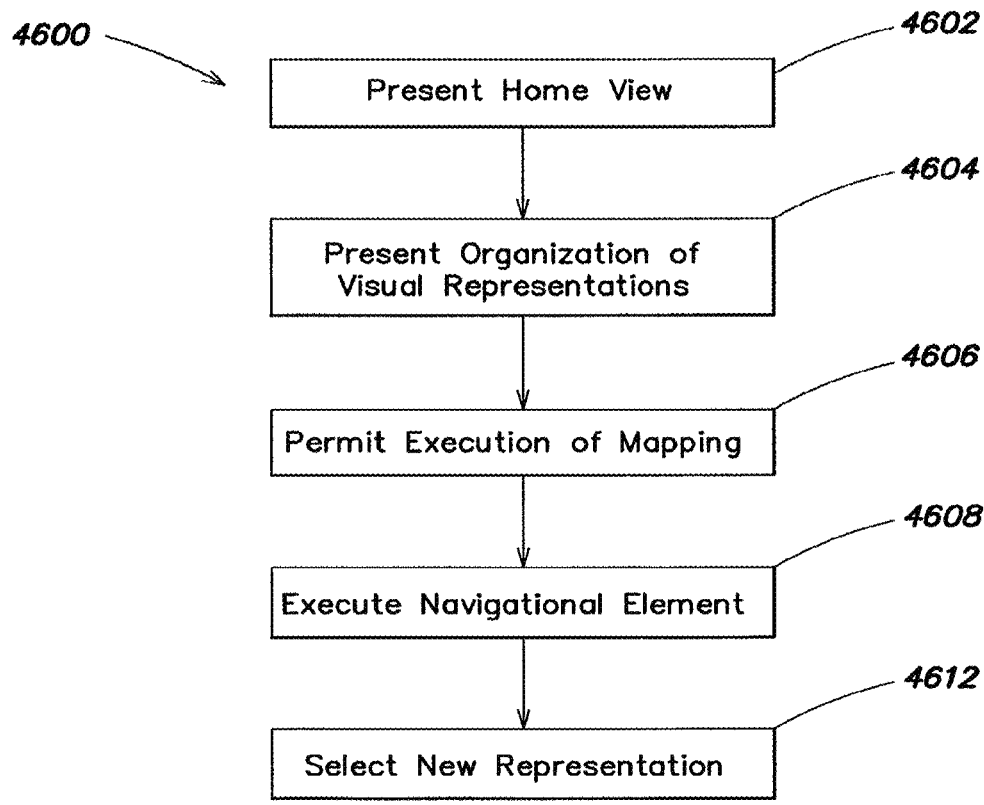
FIG. 46 is a flow diagram of one example process for providing consistent navigation operations to a user, according to aspects of the invention.

According to another aspect, methods and systems for streamlining user interaction with computer content and operations may include a process for providing consistent feature accessibility by providing a primary means for navigation to computer content and computer operations to occur through a consistent view. FIG. 46, shows an example process, 4600, for providing consistent navigation operations to a user. At 4602, a home view is presented to a computer user. The home view presents an organization of a plurality of visual representations of computer content, 4604. The visual representations form the building blocks of the home view. Each visual representation is mapped to computer content and/or operations that a user may select by, for example, hovering on the visual representation, by clicking on it, and by using hot keys—among other options. At 4606, a user executes the mapping to the computer content and/or operations. In one example, execution of the mapping causes the computer to navigate to a first view of the content. In some embodiments, process 4600, comprises further computer logic executed by a processor to access a stored mapping, and to generate the rendered presentation on the computer display of the first view.

Typically the first view comprises a navigational elements displayed in a portion of the first view. The navigational element is mapped to the home view. In one example, the home view also comprises a navigational element, and a user may toggle between the first view and the home view by executing the navigational element. In process 4600, a user executes the navigational element to return to the home view at 4608. In one alternative, a button, a sequence of keyboard keys, a hot key may also cause a computer system to execute a transition to a home view. In another alternative, the same button, sequence, of keyboard keys, and hot key may cause the computer to return to the first view upon a subsequent execution. Returning to the home view at 4608, presents the user with a consistent view of content options, and the user may select a new first visual representation mapped to other computer content at 4610. Execution of the new first visual representation caused the computer to navigate to a first view of the mapped computer content, returning process 4600, to step 4606. Again the user may select a navigational element to return the home view at 4608 to select yet another first visual representation. In some embodiments, process 4600, represents a resident process that runs in the background throughout operation of a computer device. In other examples, process 4600 may be exited by powering down the computer system (not shown). And in one alternative, a user may exit process 4600 by selecting different navigational tools that execute mappings to other views. In another alternative, (not shown) a view selector may be invoked by changing a configuration of a streamlined device. Invoking the view selector can cause the computer system to execute a transition to a different view without a return the home view. In one example, invocation of the view selector by changing the device configuration from laptop to easel, causes the computer system to transition from a home view to a channel view.

Example Web Page View

According to one embodiment, a web page view is the computer implemented expression of a selected web card. The web page view is configured to present a consistent view of web based content to a user. The web page view comprise a number of elements that are maintained across the web page view of different content, although in some examples additional features may be provided to address unique aspects of the content being viewed. In one embodiment, the web page view includes a header, 354, FIG. 3C, a body, 356, optionally a scroll bar 358, and a navigation element, 352. It is to be appreciated that individual web page views may comprise additional elements, and should not be read as limited to elements discussed with respect to this example. The Header 354, is responsive to focus of the device. In another embodiment, the header is responsive to the type of content being displayed. In one example, the header is further responsive to the communication protocol user to access the web based content. The header portion may also be responsive to the state of the device, and state of the computer operation being performed (e.g. loading content).

Figure 18A:
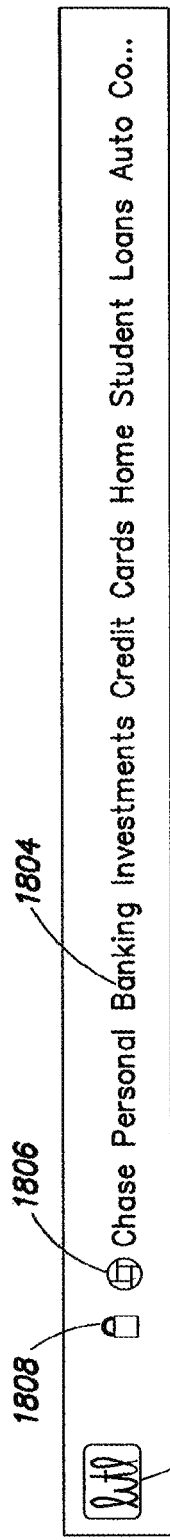
FIG. 18A-E illustrate examples of a header display responsive to focus and user activity, according to aspects of the invention.

Accordingly, in one embodiment the header 354 element of the display appears differently based on focus, content, and context of the web site being viewed. When the header is out of focus, for example, the header may be rendered in an out of focus display, shown by example in FIG. 18A. The header display comprises navigation element, 1802, page title 1804, optionally a visual element associated with the web page is displayed 1806, the visual element may be a favicon (reduced scale image associated with a website), and where appropriate the header displays a lock symbol 1808 to indicate a secure site. For secure sites, hovering over the security symbol 1808, caused the device to display additional information regarding the security of the site. In one example, a dialogue box appears including information on the security signature for the site.

Figure 18B:
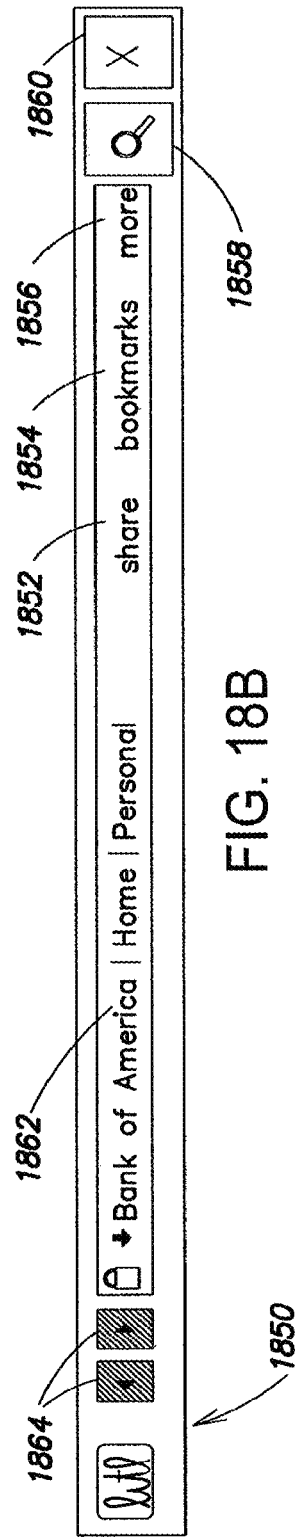
Figure 19:
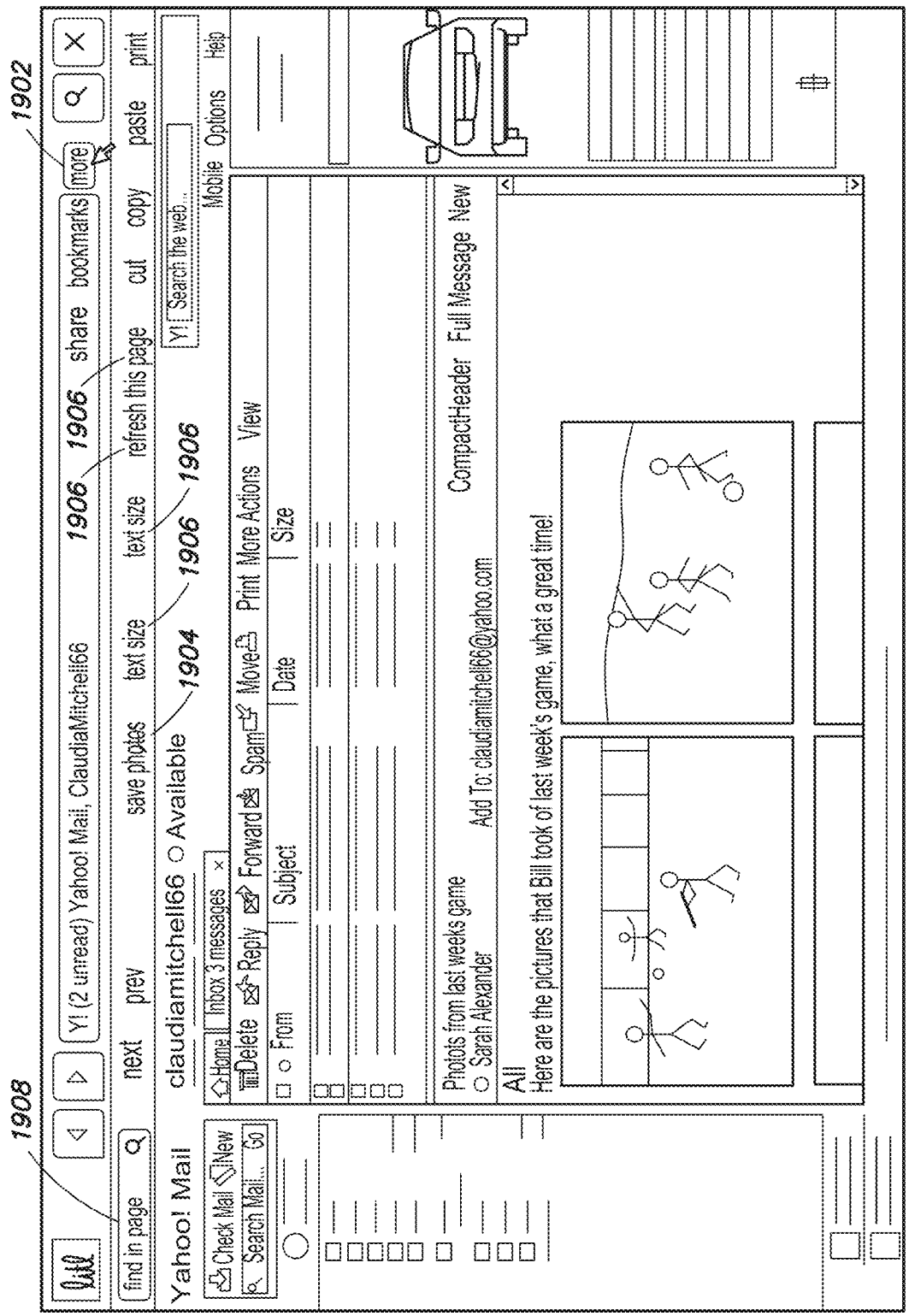
FIG. 19 is a screen shot of a web page view including a toolbar, according to aspects of the invention.

Page title provides the user the name of the page s/he is on in human-readable form. In some embodiments, when the header is out of focus, the title of the page extends to the right as far as possible. How far the title is display is dependent on what other elements are included in the header. For example, when the header is out of focus the title has the most room in the display. Upon focus, the device causes the header display to change. In one example, FIG. 18B illustrates a header, 1850, in focus, and device now displays additional tools in the header. Additional tools may comprise a share tool, 1852 (for sharing the web card mapping to the view), bookmark tool, 1854 (adds web page to bookmark list), more tool, 1856 (permits revelation of additional tools), search tool, 1858, and close tool, 1860. Additional tools may be displayed in the header on focus, including, for example, back and forward buttons, 1864 that may be used to access other pages in browsing history. Additionally, the title display from unfocused view, 1804, FIG. 18A, may be transformed into a web address box 1862, FIG. 18B. In one embodiment, focus on the header display 1850, causes the device to transform the title display into an address box, 1862. The address box maintains the title of the web site, until a user interacts with the address box, by for example typing into it. Once the system detects interaction with the address box, the display in the address box will indicate a url and/or uri for the current site (or whatever the user is typing). Other options may be made available through the header by display and selection of a more tool, 1856. For example, the device displays a toolbar, 1904, in response to user selection of the more tool 1902, FIG. 19. The toolbar supports operations, 1906, provided by conventional browser of other known systems. The toolbar 1904 may also be revealed in response to keyboard short-cuts, for example, crtl-f opens a search box, 1908, permitting the user to specify terms to find within the web page view. The toolbar display may be responsive to the content appearing in the web page view. For example, the device will display zoom tools instead of −text size and +text size in response to .pdf content.

Other standard operations and options may be supported in the toolbar. In one embodiment, the toolbar supports, find in page, find in page Next/Prev, for scrolling through hits within the page, save photos, −text size/+text size, to increase or decrease the size of the text (text sizing may be implemented globally so that changes in text size for one web page view will affect all web page views—alternatively the setting may be local to the present web page view), refresh, cut, paste copy, and print. Print and save behavior for a streamlined device does depart from conventional operation.

Figure 18C:
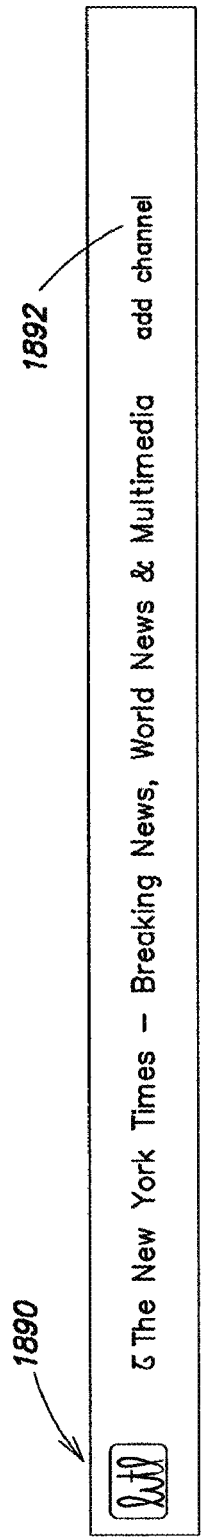

According to one embodiment, the header may also display additional tools whether the header is in focus or out of focus, responsive to the content of the page. In one embodiment, the header, 1890-1891, FIG. 18C, displays an add a channel tool, 1892, regardless of focus (1890 out of focus, 1891 in focus). In one example, the device determines that the accessed content has either a rss feed, or a custom view for the static web-page, and in response reveals the add a channel feature in the header. Selecting the add a channel causes the device to execute a process for generating a new channel card as discussed further herein.

Figure 18D:
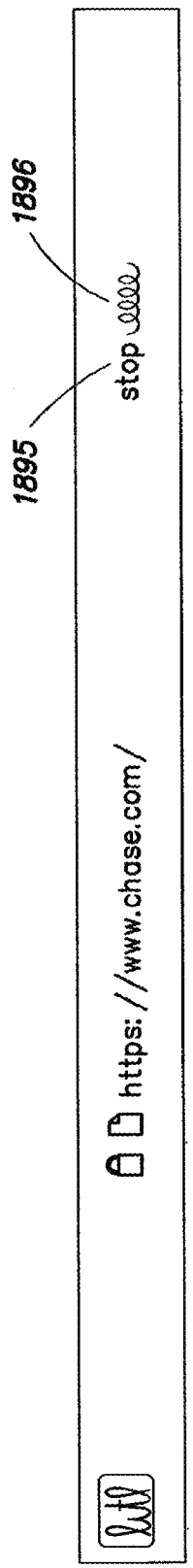

According to another embodiment, the state of the content in the view may impact the tools displayed. For example, when a user is interacting with the address box (e.g. to enter a URL or URI) or when a page is not fully loaded, possible actions are limited. The device causes the header display to adjust to remove options that are unavailable (e.g. namely Share, Add channel, Bookmarks, and More), and adds the following elements Go/Stop tool 1895, FIG. 18D, and a status indicator 1896. Selecting Go causes the device to initiate navigation and start loading a URL or URI listed in the address box. The stop button appears while a page is loading—clicking the button will stop the page from loading. The Go/Stop tool toggles between a presentation of Go when a page ahs not yet been loaded and Stop when a content is being accessed, for example. The status indicator may include a customized visualization. The customized visualization may be configured to tie various functions and features together. In one example, the status indicator is configured to display as a "loading spring," 1896. 1896, is animated to show that the device is actively downloading content. It is to be appreciated that although the Go/Stop tool is display in the same space on the header in the described example, the display for either function may also be rendered separately, or display above and below, among other options.

Figure 18E:
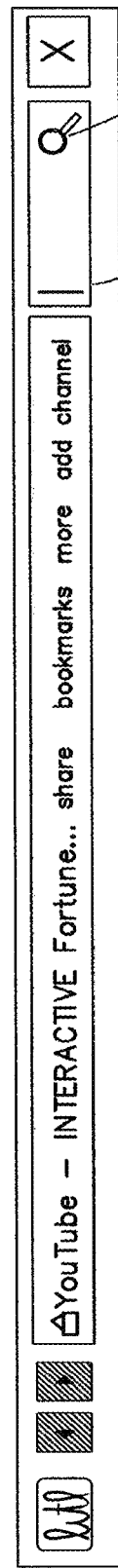

The header display may be further responsive to focus and selection. In FIG. 18E, shown is a header after selection of the search tool 1858. In response to selection of the search tool, the device alters the heading display to include an search box 1898, for entry of search terms. Once the search is initiated the device alters the header to eliminate search box 1898.

Navigation within Web Page View

According to one aspect, navigating web pages within the web page view is similar to existing browsers on other systems. For most links, when a user clicks the link, the device executes a process to load a new web page into the body of the current web page view, replacing the contents of the current page. The device operates different in response to links that request a new window. For new window links or new tab links the device executes a process to generate a new web card, and further the new card is mapped to the link destination. The device executes functionality that causes the display to "zoom" into the new card and present the content from the link destination.

According to one aspect, transitions between active web page views occurs through the home view. The user selects a navigation element (e.g. 352 FIG. 3C) to return to the home view, alternatively, a navigation button (e.g. 168, FIG. 17) will return the user to the home view. In another embodiment, hot keys and/or shortcut keys may be employed to cause the system to return to a home view. In response to selection of the shortcut and/or hot keys, the device executes a transition to the home view. From the home view a user may select any other card or generate new cards, as discussed above.

Creation of channel cards occurs differently from a web page view, than when done in a home view. In one embodiment, in response to selection of add channel in a web page view, the system returns to the home view, displays the creation of the new card, and presents the creation of the new card so that both the new card and the web card from which add channel was selected is displayed. In this example process any maximal display threshold may be ignored in order to display both the originating card and the new channel card. Once the card generation is complete the system zooms back into the original web page view for continued browsing. Alternatively, a system may enter a channel view of the newly created channel creation. In one embodiment, the behavior of the system may be altered according to settings accessed through a system card, and in one example a settings card.

Channel Page View

Figure 20A:
FIG. 20A-B are screen shots illustrating examples of a graphical user interface showing a channel page view, according to aspects of the invention.

According to one embodiment, the channel page view is the zoomed-in computer implemented expression of a channel card. A channel page view presents a unique view into content made available through a website. The channel page view employs visualizations similar to corresponding visualization on channel cards but the large format of the view allows for a better display of content, and provides for increased interaction with users. The channel page view also comprises a mapping from the display content to the source from which the content is derived. Typically, content displayed in the channel page view is derived from an rss feed associated with a web-site. Additionally, some non-rss sites have customized visualizations that can be accessed through a channel page view. According to one embodiment, the channel page view configured to present a consistent framework for user interaction with rss style content. The channel page view comprises a number of elements that are maintained across the channel page views of different content, although in some examples additional features may be provided to address unique aspects of the content being viewed. An example channel page view is illustrated in FIG. 20A, 2000. The channel page view shown includes a header 2002, which includes a display for the title of the channel page view, 2006, a share tool, 2006, web link 2008, and status indicator 2010. The header may also include navigation element 2012 for returning to a home view among other functionality. The channel page view also includes a body 2014, for displaying available rss items 2016-2022. Selection of the displayed rss items 2016-2022, caused the system to display the web page view of the selected article, web link 2008, shown as "go to web page" in FIG. 20, creates a new web card for the page from which the channel was created.

Figure 20B:
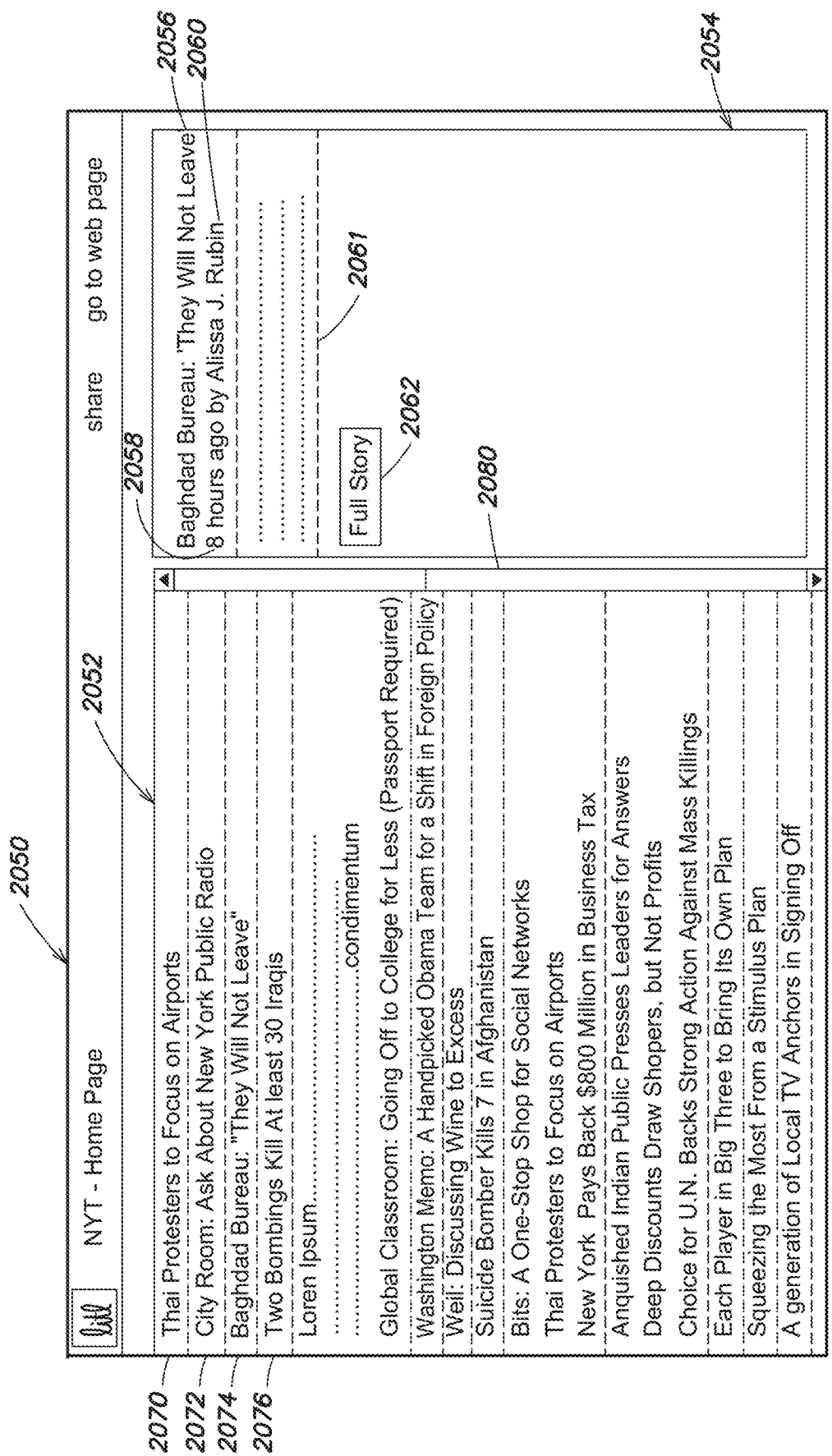

Other channel page views may also be employed. FIG. 20B, illustrates another example of a channel page view, 2050. Shown in 2050 is a specialized channel view for a news channel. Example view 2050 is separated into two scrollable columns, providing a headline column 2052, for displaying individual rss items and a content column. Content column, 2054, presents the details of rss items (if the content does not require additional space other than the displayed screen a scroll bard will not be displayed). The content column shows the headline, 2056, includes the time the item was posted 2058 (in one example relative to current time), the author, 2060, and the item's description, 2061, in its entirety. According to one embodiment, images and/or script (html, xml, etc.) may also be displayed in the content column (not shown). The content column may also comprise a navigation element, 2062. In one example the navigation element is labeled "full story." The system launches the item's url as a new web card, and transitions to a web page view of that url in response to selection of 2062. Optionally, focus and/or hovering over the full story button causes the system to generate a preview view of the new card that would be created in response to selection of full story.

Selection of one of the content items, e.g. 2070-2076, causes the system to display the headline, author, posting time, and full description for the selected rss item. Scroll bar, 2080, is displayed if the number of items in the headline column, 2052, require additional pages of display. A scroll bar may be display in the content column as well, if the content display requires additional pages. According to one embodiment, channel page views are configured to retain current state. The system accesses retained state when revisiting a channel view. According to one embodiment, a process for accessing a channel page view determines if any state information is retained for the channel page view. In response to a determination that state information exists, the system presents the last accessed content item in the content column. If the last content item is no longer available, the system selects the first content item by default.

Figure 21:
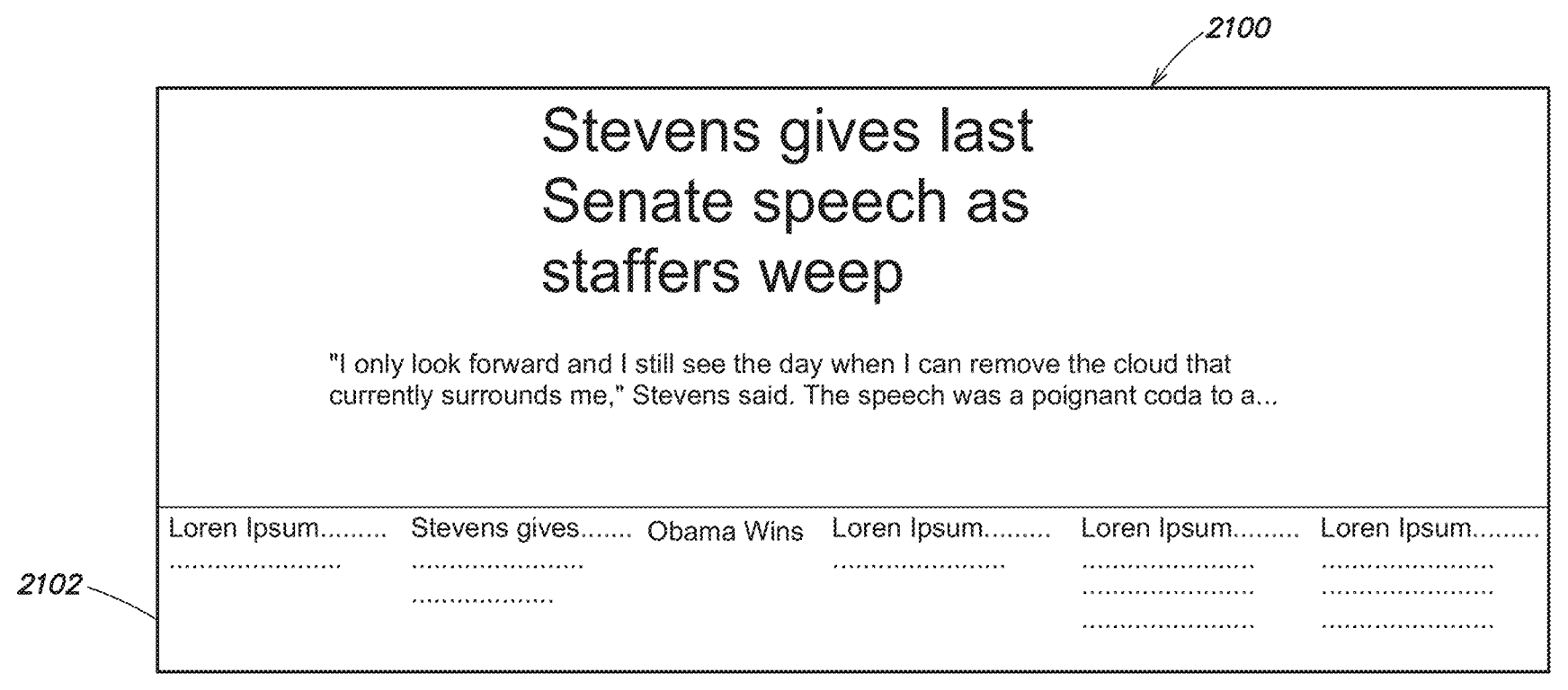

An alternative view of channel content comprises a full screen view of rss items. In one example a channel full view comprises a headline display center in the screen. According to another embodiment, preview text is displayed in conjunction with the rss item. In one example, the channel full view includes displays configured to identify the source of the rss feed. In another example, a logo for the source feed is captured and displayed as part of the channel full view. In response to selection within the channel full view, the system displays a content menu permitting selection of any of the rss items for the content source. In one embodiment, the content menu appears as a list of rss items displayed at the lower portion of the channel full view. The content menu is configured to be responsive to manipulation of the embedded scroll wheel. Manipulation of the scroll wheel progress through the displayed content menu, and in response the system displays the selected content in the full view with preview text appearing below. Shown in FIG. 21 is an example of a channel full view 2100, with content menu 2102 activated by selection. Manipulation of the scroll wheel causes the system to scroll through the items in the content menu. In one embodiment, the content menu transitions between selections by rendering the apparent movement of the entire content menu either to the left of the right depending upon the orientation of the manipulation of the scroll wheel. Alternatively, the content menu is also responsive to arrow keys on the keyboard. Depressing an arrow key cause the system to display the apparent movement of the content menu to the next item.

According to some embodiments, the various channel views, for example, page and full view may also include animations of transitions between available rss feed items. Default operation of the streamlined computer system and streamlined user interfaces cause the system to display transitions from one rss item to the next in association with a time period. Transitions may include animations that cause the system to display new rss items sliding into position as the previous rss item slides out of view. In one example, an rss headline item slides out of view in response to the next headline item sliding into view. The device and user interfaces may also be responsive to manipulation of the scroll wheel. For example, manipulation of the scroll may by default invoke a transition to a channel card view.

System Page View According to one embodiment, the system page view is the zoomed-in computer implemented expression of a system card. The system cards provide a user with the ability to interact with the device's settings and other computer operations. System cards also enable a user to access customized functionality, for example, photo and video interactions. According to one aspect, certain interactions with computer content are identified as special. The identification of special interactions is reflected in render those operations as system cards. System cards have the property, that they cannot be removed by a user. This insures that identified functionality remains available regarding of user intention. Additionally, the number of system cards can be limited, providing a distinctive interface element for system operation and important interactions even within the streamlined GUI. In one embodiment, system cards are limited to a photo and video card (controlling photo and video operations), a settings card (permitting access to device settings), a bookmark card (discussed herein), a camera card (permitting set and interaction with a camera), and a browse the web card (discussed herein). Although it is to be appreciated that other system card may be implemented and the invention is not limited to the system cards provide as example above.

Figure 22:
FIG. 22 is a screen shot illustrating one example of a graphical user interface showing a bookmark view, according to aspects of the invention.

The anatomy of the system card is similar to the anatomy of other cards. For example, an embodiment of the system card includes a header, 2202, FIG. 22, a navigation element, 2204, a title 2206, and a body 2208. As discussed herein, nascent cards may be categorized as a type of system card. Alternatively, nascent cards may comprise their own category. While nascent cards share a similar format as the other cards, nascent cards do not have a page view. Nascent cards map directly to system functionality, that is executed upon selection or as part of a call from another process.

Channel Card View According to one aspect, a channel card view is provided to display high level navigation options to a user, to enable streamlines selection of content and operations by making selections within a streamlines view. Similar to the home view the channel card view is configured to render a consistent organization of navigational elements of a streamlined graphical user interface. Unlike the home view, the channel card view is not based on pages of display, rather the channel card view is organized to display only one type of content, that is content that may be rendered in a channel (i.e. having an rss feed or customized visualization, and for special system cards). The channel card view is available in both laptop and easel modes of the streamlined device. In response to configuration of the device into easel mode, the channel card view is rendered by default. The content displayed in the channel card view is dependent on the channel cards displayed in the home view. Alternatively the channel card view may be invoked by operating the scroll wheel embedded in the device.

In response to operation of the scroll wheel, the system displays the channel card view, FIG. 23, illustrates an example of a channel card view, 2300. According to one embodiment, the channel card view comprises selector display 2302. In another embodiment, the channel card view includes a selector display, 2302. The selector view is invoke upon the first click of the scroll wheel while in easel mode, in laptop mode, additional clicks may be required to invoke the channel card view and selector. In one example, the three clicks are necessary to invoke the channel card view while the device is in a laptop mode. In another example two clicks are required. Upon invocation the channel card view comprises a visualization of the channel cards available for selection. In one example, the visualization resembles and behaves like a rolodex. As the user moves the scroll wheel individual channels 2304-2310 appear to flip around the hinge of the device. In response to selection, the foremost channel card displayed is selected and displayed full screen. In one example, selection includes activation of button 168, FIG. 17, from the easel mode of the device, although in laptop mode selection can occur in a number of ways including by operation of button 168. In another example, a different button may be selected or short cut keys selection, among other options.

Figure 24:
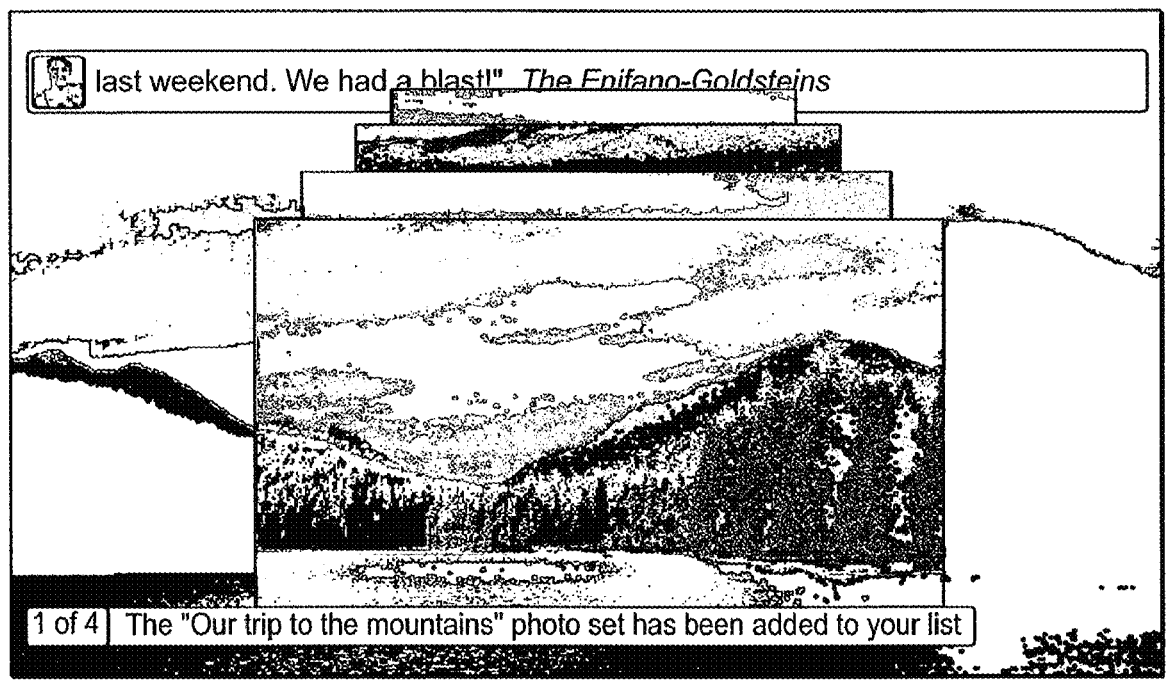
FIG. 24 is a screen shot illustrating one example of a graphical user interface showing a channel page view, according to aspects of the invention.
Figure 25A:
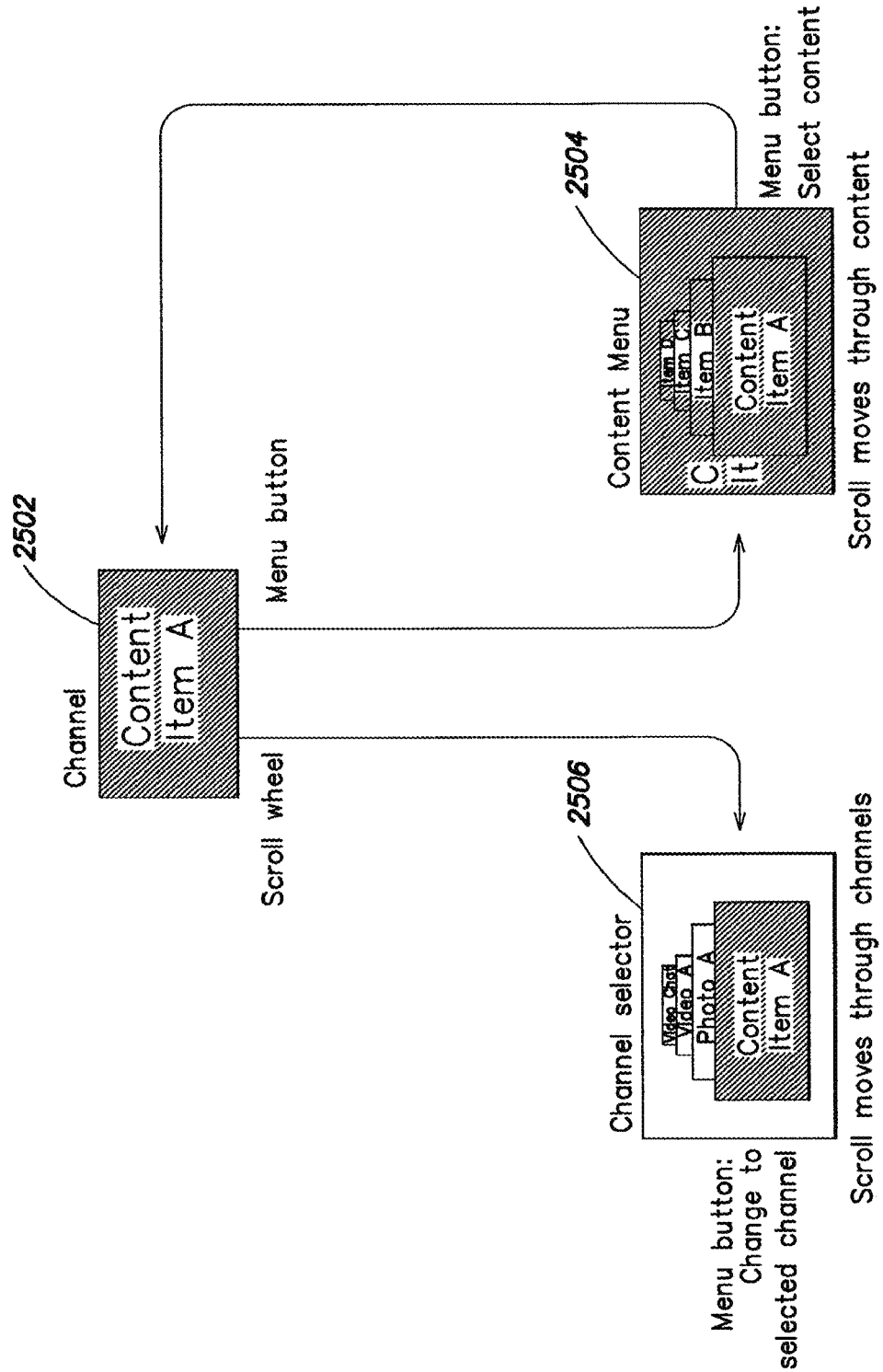
FIG. 25A-B are illustrations of example logical diagrams of the behavior for the channel view, according to aspects of the invention.

In response to selection from the channel selector view, the system displays a channel page view. On example of a channel page view for photo content is shown in FIG. 24. According to one embodiment, the channel page view of the photo content automatically scans though each photo by default in the channel page view. The photo display restarts again at the begin when the end of the photo content is reached. In another embodiment, the default operation is to display only the selected content item (e.g. photo). FIG. 25A, illustrates an example logical diagram of the behavior for the channel view. From channel page view 2502, selection of the menu button (e.g. FIG. 4, 166), caused the device to display the content menu, 2504, over the present channel page view. Selection of the menu button from the content menu, causes the device to display the selected content item in a channel page view 2502. From channel page view 2502, operation of the scroll wheel (e.g. FIG. 4, 132), causes the device to display channel selector view 2506.

Figure 25B:
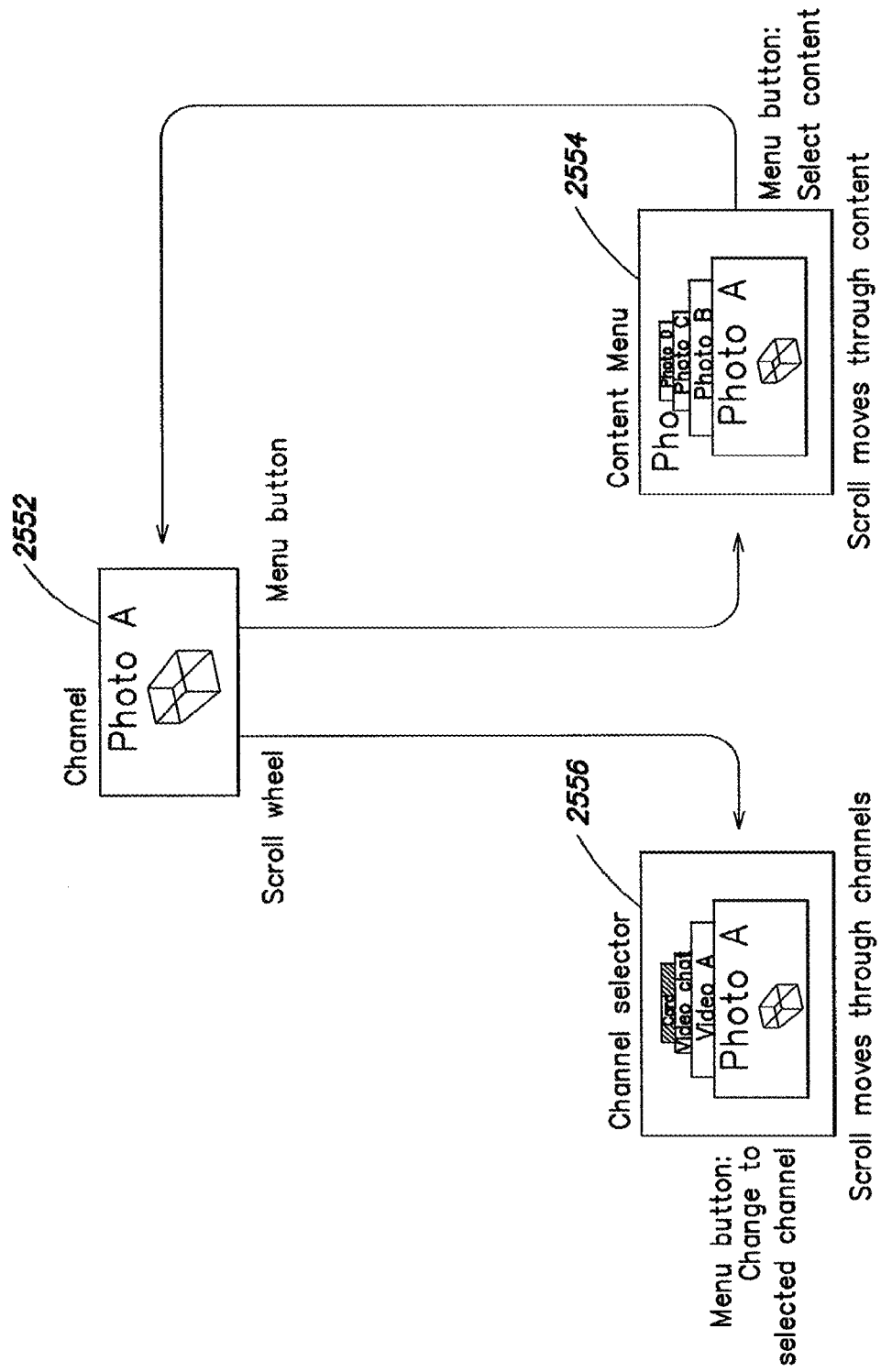

According to one embodiment, photo content displayed as a channel in the user interface, can be accessed similarly. Shown is an example of channel functionality, in logical diagram 2550, FIG. 25B. From channel page view 2552, of the photo channel, selection of the menu button (e.g. FIG. 4, 166), causes the device to display the content menu, 2554, over the present channel page view. Selection of the menu button from the content menu, causes the device to display the selected content item in a channel page view 2552. From channel page view 2552, operation of the scroll wheel (e.g. FIG. 4, 132), causes the device to display channel selector view 2556.

Figure 28:
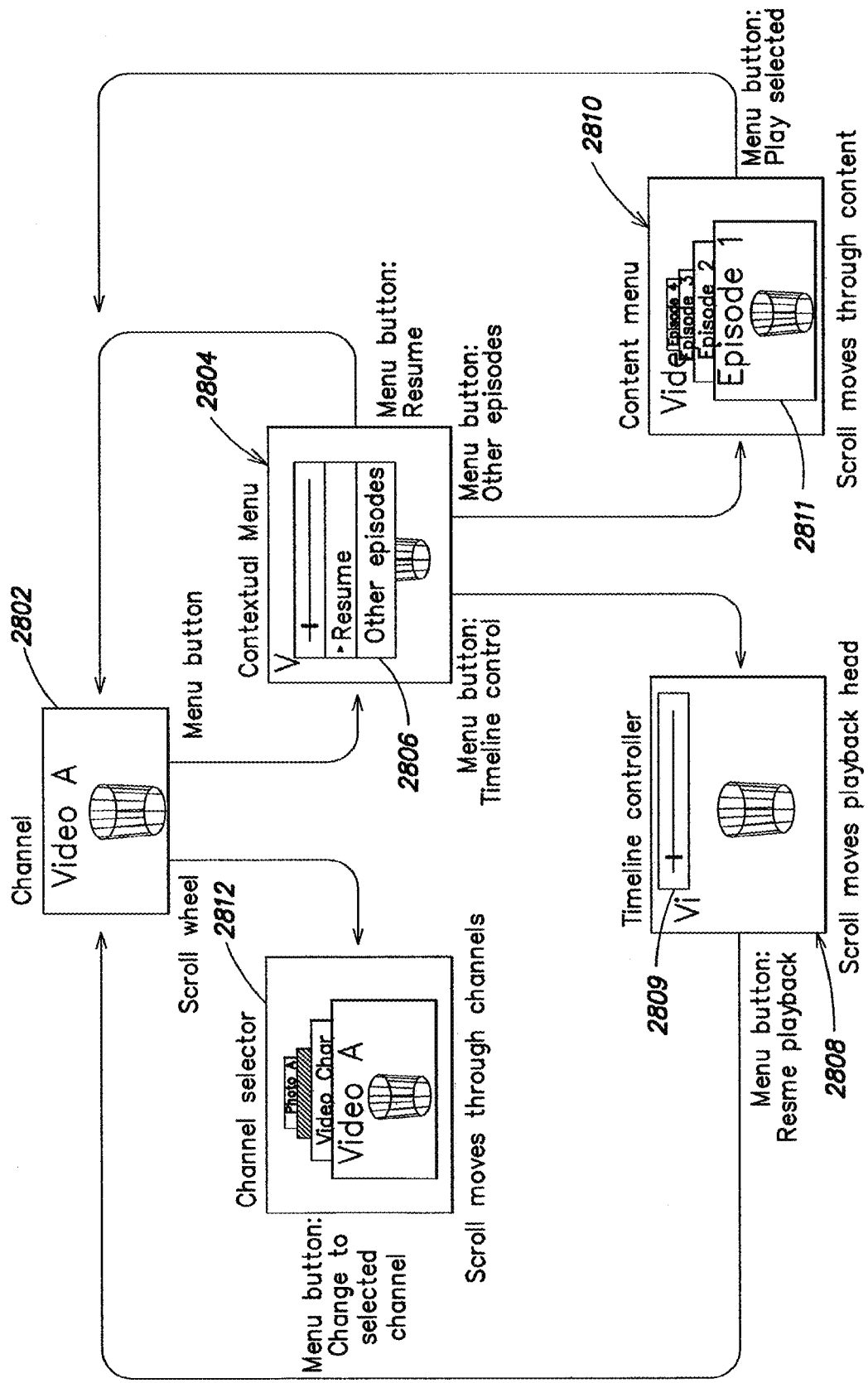
FIG. 28 is an illustration of an example logical diagram of the behavior for the channel view, according to aspects of the invention.

According to one embodiment, channels for displaying video content and/or audio content operate with a different logical flow. In one example, additional interactivity is required to allow a user to, for example, stop a video, start a video from the middle, among other options. According to one embodiment, the streamlined device must be able to accommodate routine operations through manipulation of only a scroll wheel and a mouse, for example when the device is in an easel mode. It is to be appreciated that in other configurations the logical flow for the behavior of the channel view may be different, and may take advantage of addition input/output devices available in other device modes. Shown in FIG. 28, is an example of a logical flow for device/UI functionality, during the normal operation of a channel view of video content. At 2802 shown is a channel page view of video content, select of button (e.g. FIG. 4, 132), causes the device to display contextual menu 2804. Contextual menu, includes a visual representation of selectable options, 2806. The selectable options rendered include at least a rewind/fast forward selector, resume selection, other episodes. Selection of rewind/fast forward selector invokes a timeline controller 2809 shown in the content page view, 2808. The time line controller is responsive to rotation of the scroll wheel, providing fast forward in one direction and rewind in the other. From 2808, selection of button 132 causes the device to return the view to channel page view 2802. Selection of resume form 2804, also causes the device to return the view to channel page view 2802. Selection of other episodes from 2804 causes the device to invoke content menu 2810, which provides a selector view of available content for the channel. Selection of content, 2811, from the selector view causes the system to play the selected content in channel page view 2802. From channel page view 2802, the devices displays channel selector 2812, in response to operation of the scroll wheel. The logical flow illustrated may be used for interactions with audio content as well, for example, to control playing of .mp3 or other audio file.

Selecting Device Configurations

According to one aspect, systems and method for streamlining user interaction with electronic content include a plurality of physical configurations for a streamlined device, the streamlined device may be, for example, a portable computer. As discussed above the plurality of configurations may represent modes of operation of the device, and include for example laptop mode, easel mode, among others. According to another aspect the user interface that governs interactions between the user the device and accessed content is responsive the selected mode and/or configuration of the streamlined device.

According to one embodiment, the streamlined device retains information on device configuration and/or mode. In on example, information is maintained as a state variable in a systems register. In another example, the system may obtain state from signals provide by an embedded sensor, as discussed above. The state information may be used to generate a system response, when the device detects a change in configuration and/or mode.

In a typical setting a user interacts with a streamlined device in one of two viewing modes. The two viewing modes reflect a level of interactivity with the device being viewed. A lean forward view encompasses interactions between a user and conventional computer systems. One example includes a user typing at the keyboard of their laptop computer, in essence, the user leans into the computer device and display to perform interactions and view content. Similarly a user's interaction with desktop computers are conducted through a forward mode of interaction. It is realized that traditional computer devices and systems are notorious bad at permitting interaction with content and the device from greater distances.

Interactions with content and other device for example a television are included in the second type of viewing mode. A lean back mode of viewing is meant to encompass ordinary television viewing, and the interactions a viewer has with their DVR for example. Television and their associated devices and configured to provide for lean back styled interactions. It is realized that conventional system and methods fail to provide for the transition from lean forward to lean back interactions. As discussed above, streamlined devices can accommodate a plurality of configurations, and individual configurations may be designed to accommodate the different viewing modes. Additionally, the streamlines user interface is configured to be responsive to the configurations. For example, transitions from a laptop mode of the device may trigger changes in the user interface. According to one embodiment, a transition from laptop mode to easel mode, causes the device to transition from either a home view or web page view to a channel selector view. The transition from laptop to easel, may also trigger a transition from a channel page view to channel selector view. In one alternative, the transition causes the device to display a channel full view for that channel card. The transition from easel to laptop may also cause the device to alter the view displayed to a user. In one example, if a new card has been shared, the device causes the home view to be displayed. The last page of the home view is displayed where the new card is rendered.

Figure 48:
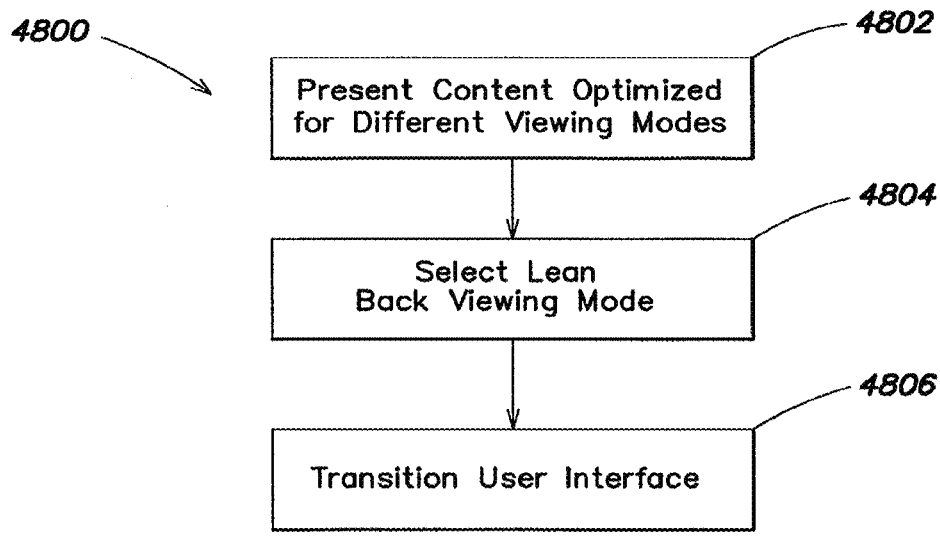
FIG. 48 is a flow diagram of one example process for permitting a user to select a viewing mode for a streamlined device, according to aspects of the invention.

According to another embodiment, methods and systems for streamlining user interactions may include a process for transitioning between different user viewing positions. Shown in FIG. 48, is an example process 4800, for permitting a user to select a viewing mode for a streamlined device, and in response displaying a user interface view configured for the selected viewing mode. At 4802, a streamline computer system presents computer content using visual representation optimized for different viewing modes. In particular, ones of the visual representations are configured to display in a "lean forward" user viewing mode and a "lean backward" viewing mode. In one example, a lean forward user viewing mode includes a user typing at a keyboard of a laptop computer. In another example, a lean backward user viewing mode includes a user viewing a television from a distance. One should appreciate that the examples provided are illustrative and are not intended to be limiting. A streamlined device permits a user to select a device configuration most suited to a particular user viewing mode. For example, a user may rotate a streamlined device's display relative to its based about an longitudinal axis, transitioning the device from a laptop mode to an easel mode. According to one embodiment, the easel mode of the device permits improved "lean back" interactions with computer content. In other words, the easel mode makes it easier to view the streamlined device's display from distances greater than conventionally used with laptop computers. Selection of a lean backward user viewing mode at 4804, triggers the streamlined device to transition to a content display that improves user interaction. On one example, in response to the user selection at 4804, the computer system display transitions to a channel viewing mode at 4806. The channel viewing mode is configured to present computer content, in large footprint displays, and further is designed to streamline user interaction with the streamlined device by permitting access through a first I/O profile associated with the streamlined device in easel mode. The first I/O profile in easel mode may consist of a scroll wheel and a selector button. In some embodiments, the first I/O profile may include a volume control.

Figure 49A:
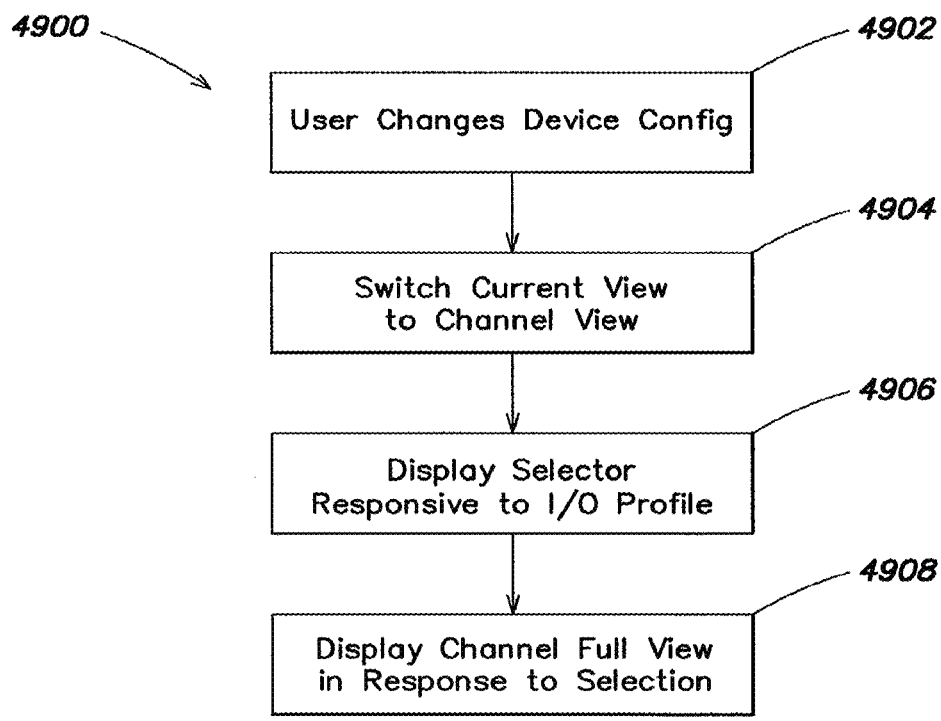
FIG. 49A is a flow diagram of one example process for transitioning between a lean forward view to a lean backward view, according to aspects of the invention.

Other processes may be invoked to cause a user interface to transition between views in response to changes in device configuration. Shown in FIG. 49A, is an example process 4900, for transitioning between a lean forward view to a lean backward view. At 4902, a user changes the streamlined device configuration from laptop to easel mode. In response the computer system switches view from its current view to a channel view. In some examples, the computer system is already in a channel view, and no transition is implemented. The easel mode of the streamlined device is associated with a first I/O profile including an integrated scroll wheel and a selector button. Upon manipulation of the scroll wheel, a view selector causes the computer system to display a progression through a sequence of channel cards as the scroll wheel is rotated, at 4906. Optionally the sequence may include other customized cards (in one example a photo and video card). Upon selection of a displayed channel card, a channel full view is invoked at 4908. The channel full view displays the content of the selected channel card in the entirety of the computer system display screen. The system returns to the channel view in response to further rotation of the scroll wheel.

Figure 49B:
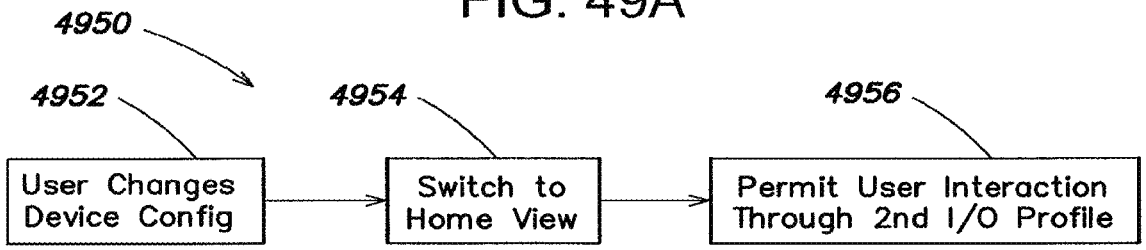
FIG. 49B is a flow diagram of one example process for transitioning between user views, according to aspects of the invention.

Shown in FIG. 49B, is another example process, 4950, for transitioning between user views. At 4952, a user changes a device configuration from an easel mode to a laptop mode. In response to the change in mode, the device displays a home view of available content, at 4954. In some examples, the system may already be in a home view and no transition occurs. The user may interact with the streamlined device through a second I/O profile at 4956. In some embodiments, the second I/O profile includes a keyboard, a touch pad, buttons, web cam, and a scroll wheel.

Streamlined Device Community

According to one aspect, a common experience may be created for multiple users, fostering a community experience. According to another aspect, the common experience may also include a community aspect. The community aspect includes sharing of content between users, sharing of content and configurations, sharing of content, configurations, and customizations, among many other options. In particular, sharing may involve the transmission of user interface elements to other users. The visual representations that map to content and/or computer operations on one device may be transmitted to another device or another user. In one example, a user may share a card and any of its configurations with another user. Access to the shared user interface elements, in some embodiments, facilitates communal computer usage. In one example, a first user may be watching media on their streamlined device, another user known to the first user, may receive a user interface element that retains information related to the accessed content and information related to the present context. That is for the first user watching a movie, the first user may share the user interface element (e.g. a channel card mapped to video content) through which s/he is accessing the move, and permit the another user not only to watch the movie, but to take up the movie at the same point in time, so in essence, they get to enjoy the movie together. Content and context retention by user interface elements that can be shared provides unique advantages to the users of the streamlined devices.

In some embodiments, the community aspect incorporates formation of groups. In one example, groups are formed based on at least one of a social relationship, familial relations, work relationship, etc. Different groups may share different content and even different context for the same content through for example, shared user interface elements. Groups may be further organized into nodes or a node may comprise the group. In some examples, a family forms a node regardless of the family's location relative to each other. As part of the configurations that may also occur as part of the device's purchase, at least one of the users identifies his/her family members. The family members are configured into a node. The node may be used to permit sharing of content. The node may be used to permit sharing of cards. Further updates to configurations on device in the node may be propagated automatically to other devices in the node.

Communication between groups members may take place over the internet. In one embodiment, a sub-network utilizes the internet or other communication network to communicate between streamlined device users. In another embodiment, a service is hosted for streamlined device users to facilitate communication. The service may also be connected to the internet and in one example functions as a gateway between users, their devices, content, sharing, and communicating. The service facilitates real time sharing, in one example a user may share a movie s/he is viewing with another. Not only may the user share the information that s/he is watching a movie, but the user may allow another to watch the movie starting at the same place, allowing the users to perceive they are watching the movie together.

Figure 29A:
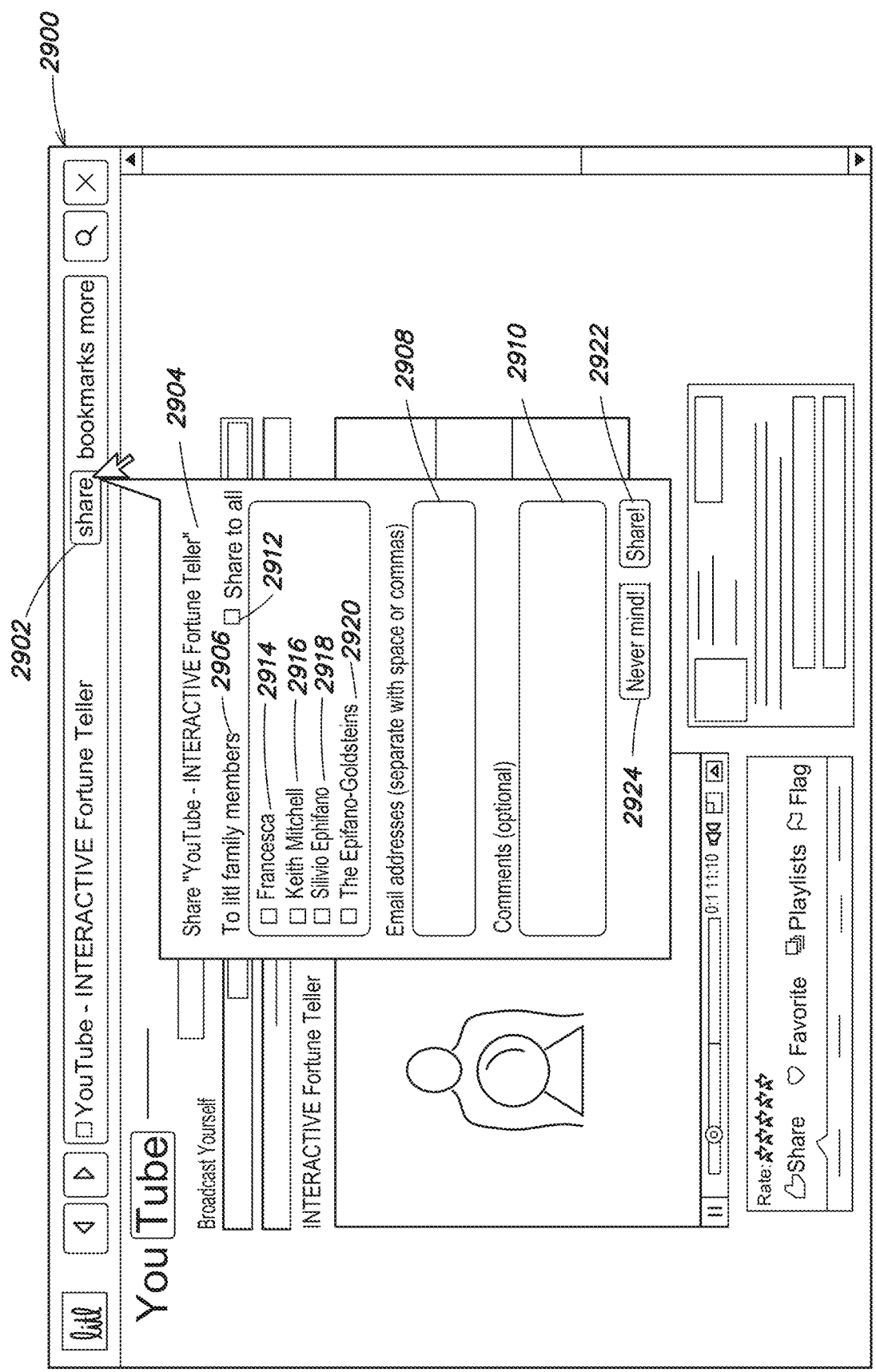
FIG. 29A-B are screen shots illustrating example graphical user interfaces showing a web page view with a share interface, according to aspects of the invention.
Figure 29B:
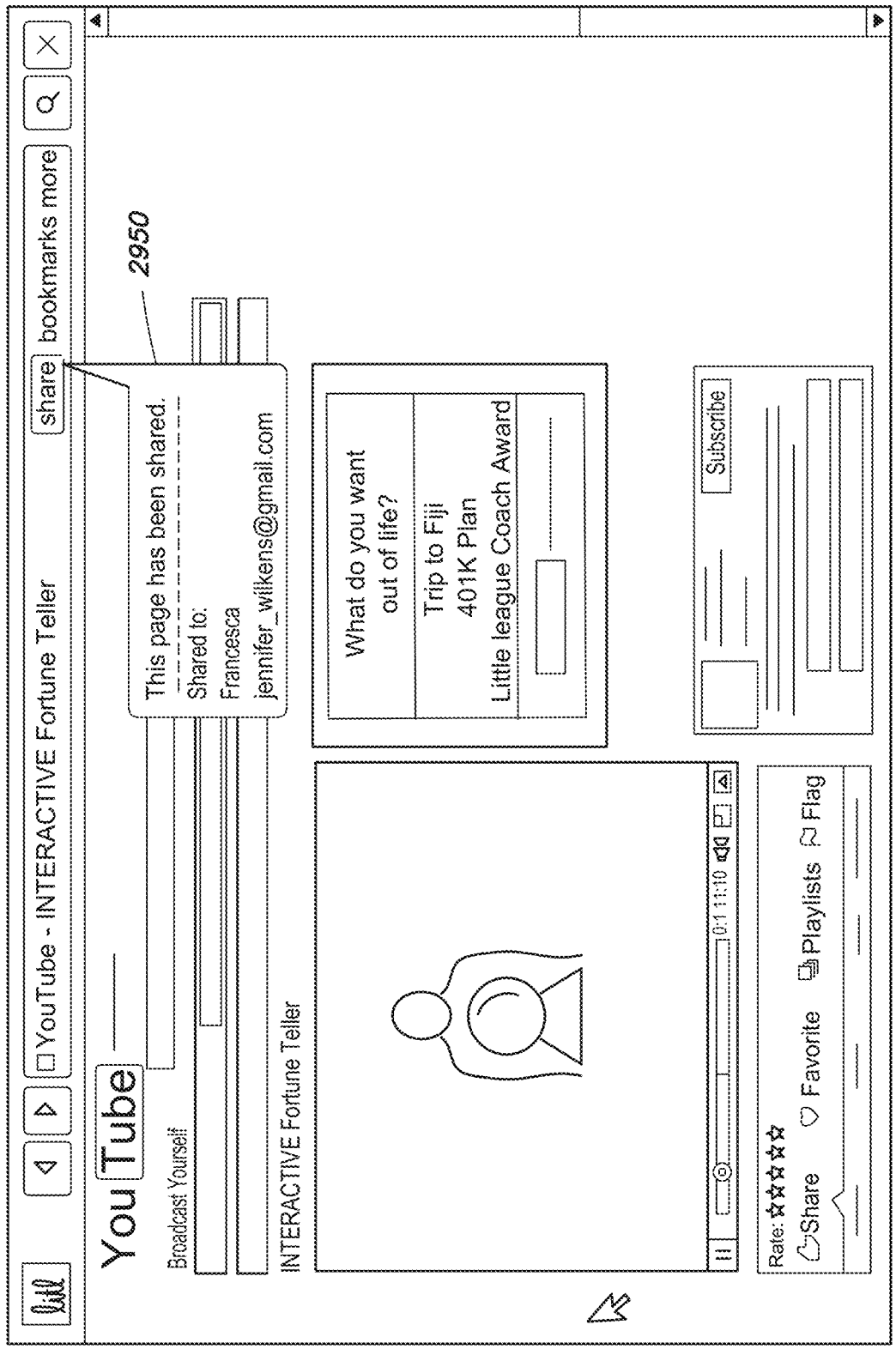

FIG. 29A, illustrates an example interaction between a user, the device, and the user interface, where the device causes a web card to be shared to other users. Shown is web page view, 2900, in response to user selection of share 2902, the device displays a share interface 2904. The device accesses the user profile to determine any groups or nodes that the user has created. In example view, 2900, the user has only one group, family members 2906. Each entry listed in family members represents another streamlined device/user. Box 2908 permits sharing of the card with other users of conventional systems. Comment may be included. For example, a user may type any comment on the card being share into box 2910. Comments entered on a shared card are display with the card on receipt by another streamlined device user. The user selects any one or more of the listed members 2914-2920, or the user selects 2912 to share the card with all the listed members. Once the selections have been made and any comments entered the user selects 2924 Share! And the card is transmitted. By selecting Never Mind 2924, the device closes the share interface. In FIG. 29B, shown is an example of a web page view after a share operation has been completed. At 2950, the device notifies the user that the selected item has been shared. For other streamlined device users share content is received by their streamlined device as a web card. For other users, an e-mail with a link to the content is delivered. It is to be appreciated that FIG. 29A, illustrates a user with one group or node. In other embodiments, a user may be permitted to generate a plurality of groups or nodes. Box 2926 may first display a list of groups, that a user may select from, in order to show the members of the selected groups. In one embodiment, box 2926 lists more members that can be accommodated in the space provide by the interface. An optional scroll bar may be displayed into to permitting display of additional group members.

Figure 30:
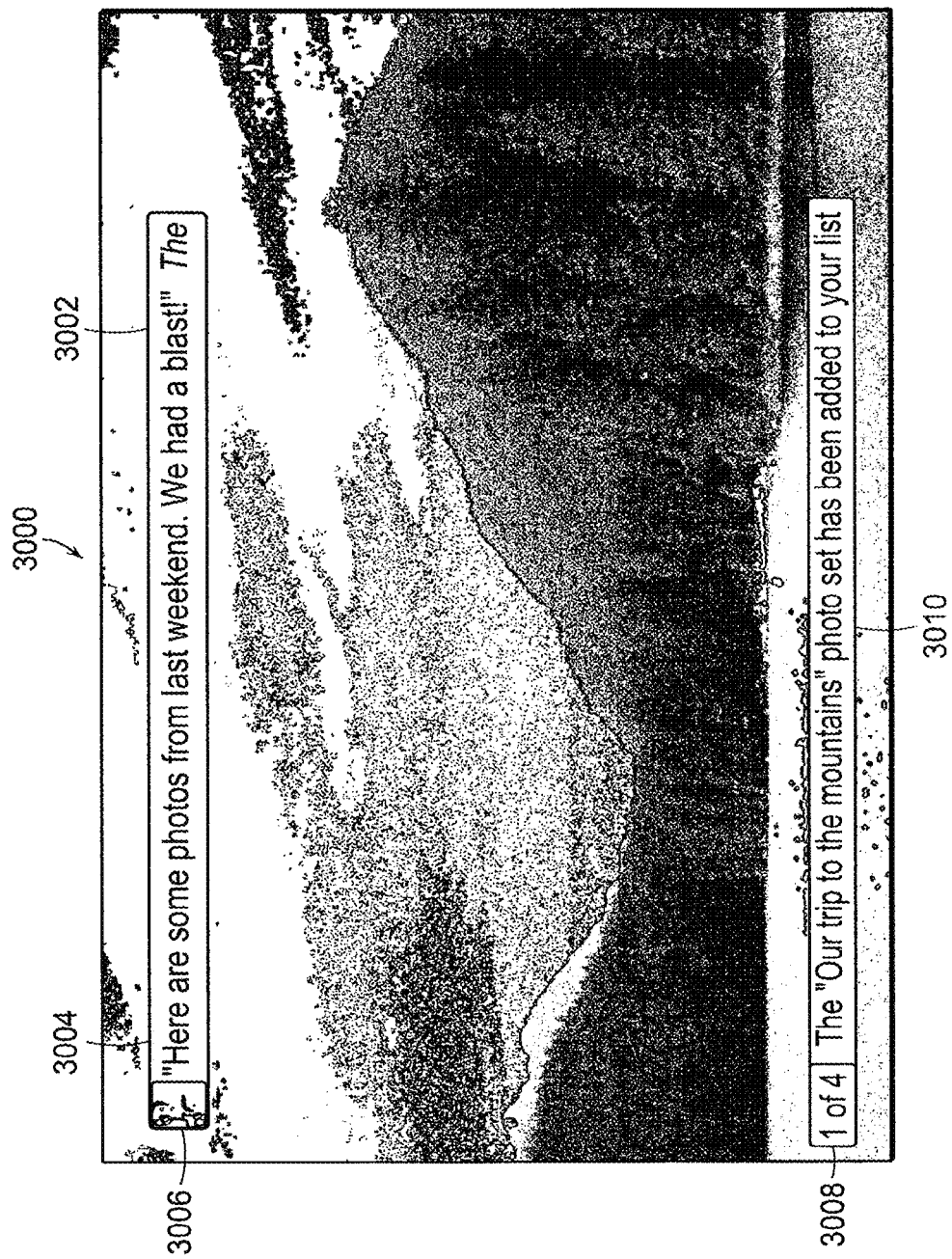
FIG. 30 is a screen shot illustrating an example graphical user interface showing a shared card, according to aspects of the invention.

FIG. 30 illustrates an example of a received shared card, 3000. The state of the streamlined device may impact behavior of the device in response to receipt of a shared card. In screensaver mode, a streamlined device presents received shared cards as part of the screen saver view, 3000. Comments included with the shared card, are presented in an overlay box 3002, and any text that does not display is a first screen is scrolled into view 3004, while the content of the shared card is displayed. The overlay box 3002, may include an image of the user who shared the card and/or content, at 3006. Shared display 3000, may also include an indicator regarding the number of content items in the shared card. For example at 3008, the number of content items in the photo set being displayed indicates 1 of 4. Other information associated with individual content items may also be displayed at 3010. In the screen saver mode, the shared content items are each display, a timer controls the length of time each item is display before continuing on to the next item. The device then returns to any screen saver content that was being displayed when the shared card came in.

Figure 31:
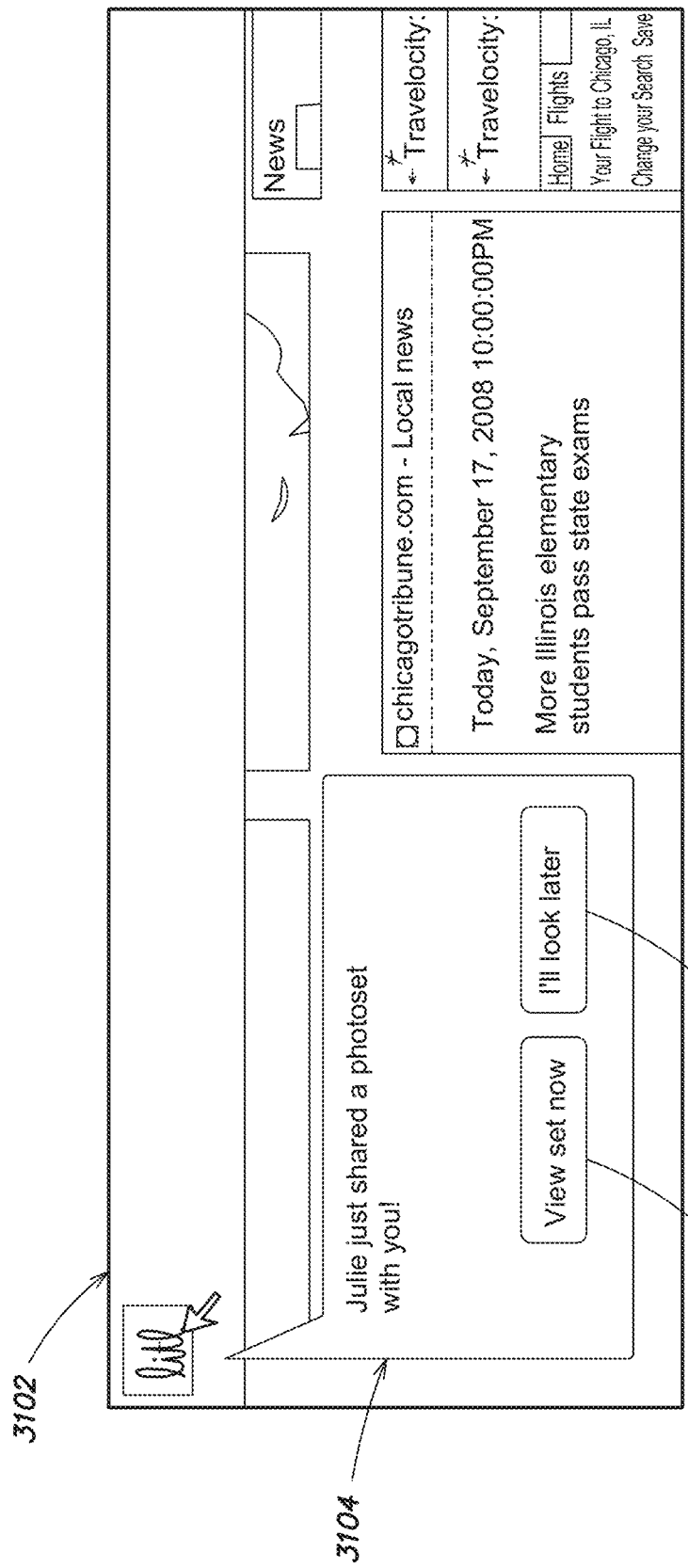
FIG. 31 is a screen shot illustrating an example graphical user interface showing a shared card notification, according to aspects of the invention.

For users receiving shared content while in an active view (e.g. non-screensaver views), the system may provide a notification message to indicate shared content. From the home view, for example, the system generates notification message to display in a message bubble. An visual indicator is employed to notify the user that a system message is present. In one example, the navigation item displayed in the home view (e.g. FIG. 2, 250), is animated to indicate a message. An example notification is illustrated in FIG. 31. Navigation element 3102 may be animated, the device displays message bubble 3104 upon focus resolving on element 3102. The user may select 3106 or 3108. Upon selection the device displays the shared card of 3106, or the device returns to the home view 3108.

Figure 32:
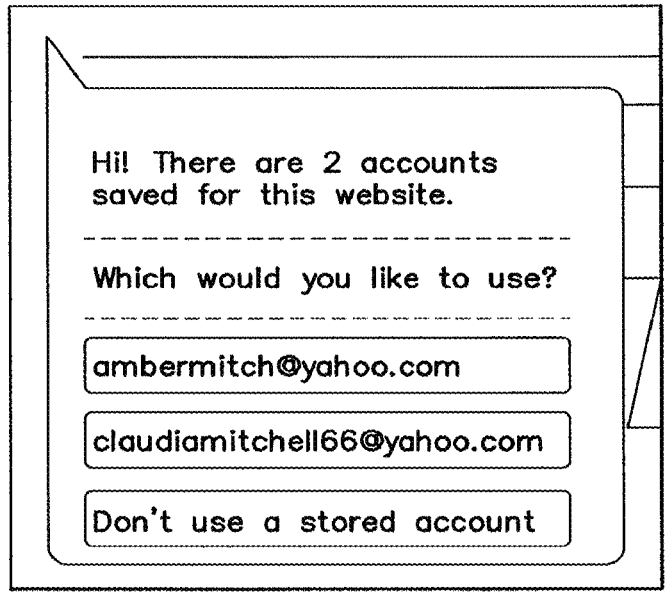
FIG. 32 is a screen shot illustrating an example graphical user interface showing a notification messages, according to aspects of the invention.

Similar notifications may be employed in conjunction with other views. Further similar notifications may be used for other contexts. In response to displaying a web page view of a web page with stored user name information, a device may present a notification message regarding the availability of account information. FIG. 32 illustrates an example message for a site with two stored accounts. By default the system displays the content without using the stored account information. The device causes the message to disappear if a selection is not made, or if browsing activity continues without selection of an account. According to some embodiment, notifications can either require a response/action or the notification may disappear if no action is taken. Typically, notifications that do not require an action are used to convey information.

Figure 33:
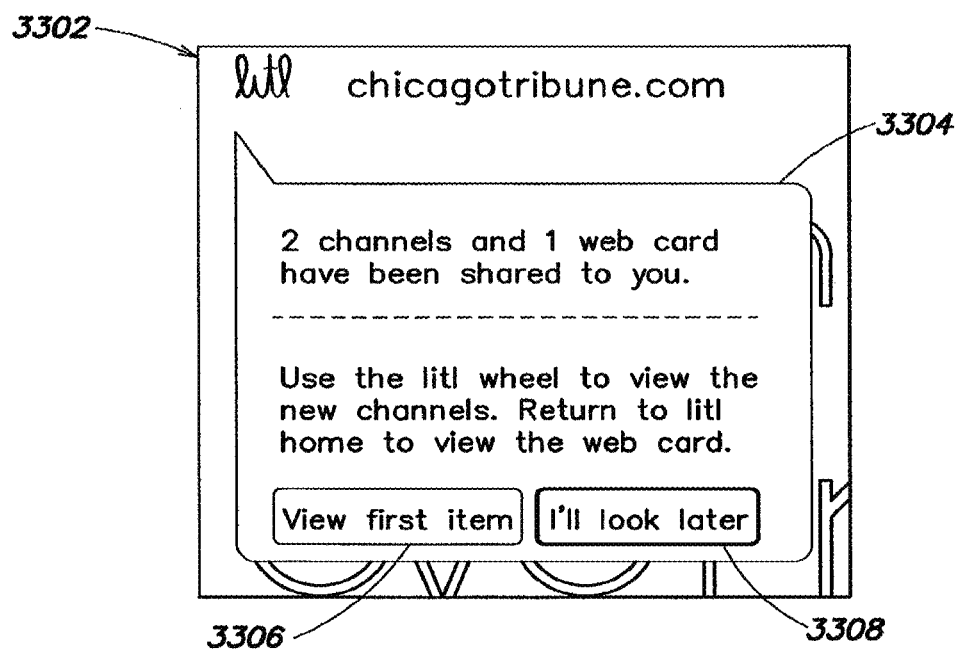
FIG. 33 is a screen shot illustrating an example graphical user interface showing a notification, according to aspects of the invention.

In one embodiment, from channel view in laptop mode, the notification of the arrival of new cards is the same as in home or page view. Typically navigation element 3302, FIG. 33, does not appear in the channel view. In response to a new card, the device displays 3302 and may animate its display. In response to focus on the 3302, a notification bubble 3304 appears. The system displays the home view for the page containing the first new card in response to selection of 3302 or 3306.

Figure 34:
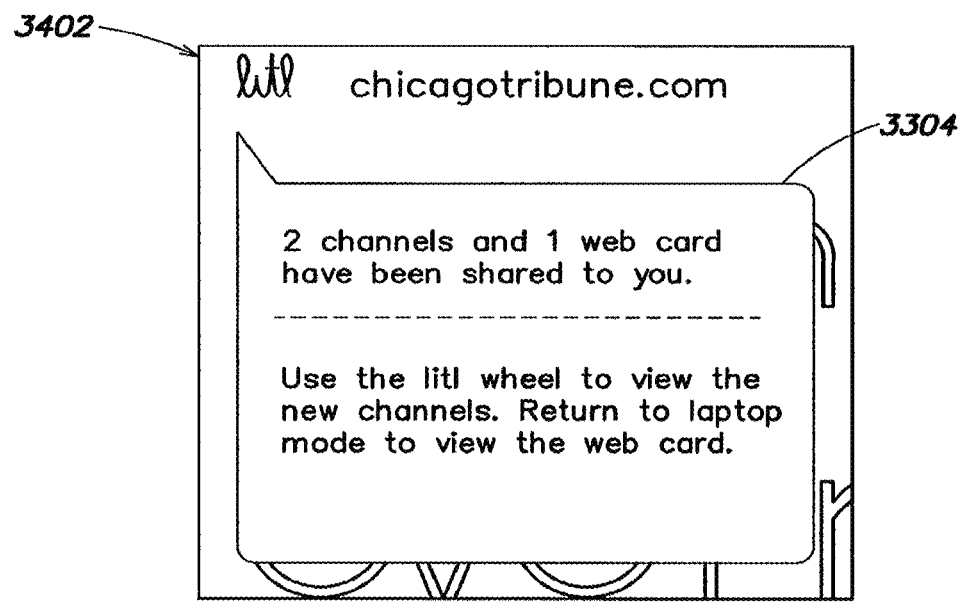
FIG. 34 is a screen shot illustrating an example graphical user interface showing a notification, according to aspects of the invention.

When a notification is available in channel view, moving the scroll wheel invokes the Channel Selector view, but the system displays the first new card default (instead of the current channel). When in channel view in easel mode, the notification of the arrival of new cards is similar as above, except that both the navigation element and the notification bubble may appear at once. Shown in FIG. 34, is an example of a notification message from a channel view while in easel mode. The system displays both 3302 navigation element and 3404 message bubble together in response to shared content.

In one embodiment of a streamlined device, the user interface is configured to provide for passive viewing of selected content through a screensaver mode. The device enters screensaver mode in response to the expiration of a idle timer expiring. Any interaction with the device causes the device to exit screensaver mode. In screensaver mode, channel cards and content are display in order. An idle time out period may be established to force a transition to a new channel in the event the idle time out period is exceeded before all the content of the channel is displayed.

According to some embodiments, the community experience is enhanced through particular features and functions facilitated by the device, the user interface layer, and/or configurations designed to facilitate interaction among users (either with the device features themselves or also with third party services). According to another aspect, community experience and/or community learning furthers adoption and/or integration of new computer features into a particular user's routine. It is realized that facilitation of communication and/or content sharing across users improves introduction of features and increases the likelihood of their adoption. Context and content sharing are provided for and through streamlined interfaces. The sharing opportunities may be device sensitive, that is, a user with a same/similar device can be identified by a specific user. The users with identical devices may have the most options for how to share, what content to share, context settings, and may also include the ability to share features associated with the content. In one embodiment, a user may enable features associated with a card based interface and through sharing the card make another user aware of features of the card interface that the receiving user was unaware of. In another embodiment, the shared card provides all of the configurations established for the originating card. In one alternative, security features may be invoke to clear certain settings of a card to insure that for example, banking information is not shared to another user. In another alternative, the user selecting share is prompted to confirm the share request. In response to a security identifier, the prompt to confirm includes a warning banner regarding the identified security issue. In one example, a user receives a warning that sharing a card including banking content may compromise the bank accounts referenced. In another embodiment, a share request with an identified security issue is denied.

In some embodiments, the community aspect incorporates formation of groups. In one example, groups are formed based on social relationship, familial relations, work relationship, etc. Different groups may share different content and even different context for the same content through for example, shared user interface elements. Groups may be further organized into nodes or a node may comprise the group. In some examples, a family forms a node regardless of the family's location relative to each other. As part of the configurations that may also occur as part of the device's purchase, at least one of the users identifies his/her family members. The family members are configured into a node. The node may be used to permit sharing of content. The node may be used to permit sharing of cards. Further updates to configurations on device in the node may be propagated automatically to other devices in the node.

According to another embodiment, sharing options may also be adapted to different devices being operated by sharing users. For example, certain features may be disabled when a card or content is shared outside of a streamlined device community. In some embodiments, communities may be based on the device being employed, membership in a group, and/or membership in a node. Additionally communities may be based on social interactions, familial relationships, etc. Examples of communities include name lists of user identified by the device operator. In one example, community lists and/or community groups are pre-generated in response to questions asked of a potential purchaser. User names may also be added and maintained by the user. Additionally, the system may create community lists on behalf of a user based on the user's activity.

For example, when composing and sending an e-mail, the system may query the user to determine if the recipient should be within the user's community. In one alternative, the system may add the recipient to a potential community and make the addition subject to a later confirmation. In another option, the e-mail recipient is added by default to a group with minimal sharing options. The user is provided the option of changing the group associated with the recipient. Additions to community list may require additional configurations to become effective. For example, the device user may be required to accept additions, a device user may be required to identify if the added name corresponds to another user of a similar/same type of device, among other configurations options.

Specialized Operations

According to another aspect, certain features of convention computer interactions have been specially configured to present streamlined interaction between a device, a user, and content. In one embodiment, the device does not incorporate mass storage (i.e. a hard drives), instead the system is configured to employ RAM and Flash memory storage. The capacity of the flash memory is significantly less than traditional mass storage options. Thus in some embodiments, traditional features such a download, have been configured to operate differently for a streamlined device.

In one example, download links do not cause a streamlined device to download content. Instead, a download link is interpreted by the device, which initiates a process for handling download links. An example process includes accessing a third party provider of remote storage to retain the content identified in the download link. According to one embodiment, the purchase of a streamlined device, include creation of an account with access to on-line storage. In one example, remote storage for a device is provided in conjunction with user information stored to customize the device and configure its operation to the particular user.

In one embodiment, customized configuration files supply information required for integration for known third party providers. In some embodiments, customized configuration files are used to establish default interactions with for example, Shutterfly, an on-line third party photo management and sharing service. In other examples, customized configuration files are used with other third party on-line service providers. Other third party provides include GMAIL, HOTMAIL, YAHOO! MAIL to provide examples of e-mail service providers. Other provides include, for example, on line banking providers, financial system providers, university systems, web site development providers, dating services, and social networking sites. One should appreciate that the integration of an on-line service need not depend on a predetermined configuration file or settings, rather, various embodiments of the systems and methods are adapted to learn from user interaction and develop appropriate configurations. Certain embodiments are further configured to take advantage of configurations developed by other users of such systems and methods, permitting sharing of content, sharing of configurations, etc. According to one aspect, by using input from the users, learning from user interactions, permitting content sharing, permitting sharing of configurations, and by providing default configurations for more popular services almost any on-line service can be integrated.

Still other embodiments, may query the user upon entry/access into a new service for any information necessary to configure the device to provide streamlined presentation and integration of the third party service. In some embodiments, the process of streamlining user interactions with electronic content includes querying the user regarding subscribed services and/or functions the user would like to use on their computer. For example, during processing of a purchase of a streamlined device a prospective purchaser receives a query form, or the user may receive individual questions regarding the purchaser's present computer use. In one example, the questions will generate a profile of subscribed services, whether pay or free, and customize the user interface to permit streamlined interaction with those services out of the box. In one example, default configurations and/or questions designed to elicit required configurations, allow the user to interact with GUI elements customized to his/her current use and preferences.

A process for handling download links may be responsive to the particular content selected for download. In one example, the system analyzes the selected download link to determine the type of content selected for downloading. In response, the system identifies accounts held by the user for processing the selected content. If multiple accounts exists that handle the selected content, the account first created is used by default. A user may alter default operation through use of system settings. For photo content, as one example, the system identifies the content as a picture (.jpg, .gif, .tif, etc.). The user's profile contains information for accessing FLICKR, a third party provider of photo access and management services. The download link is interpreted into an operation to transfer the file into the user's FLICKR gallery. Other services may be used to host the content, for example, the download link may be interpreted to cause the system to upload the photo to the well known MYSPACE or FACEBOOK services. For content that cannot be identified, the streamlined device causes the download request to be interpreted as a delivery request to a generic remote storage service. The remote storage service may be one provided through a third party provider, or may be the remote storage space provided by a seller of the streamlined device.

Figure 42:
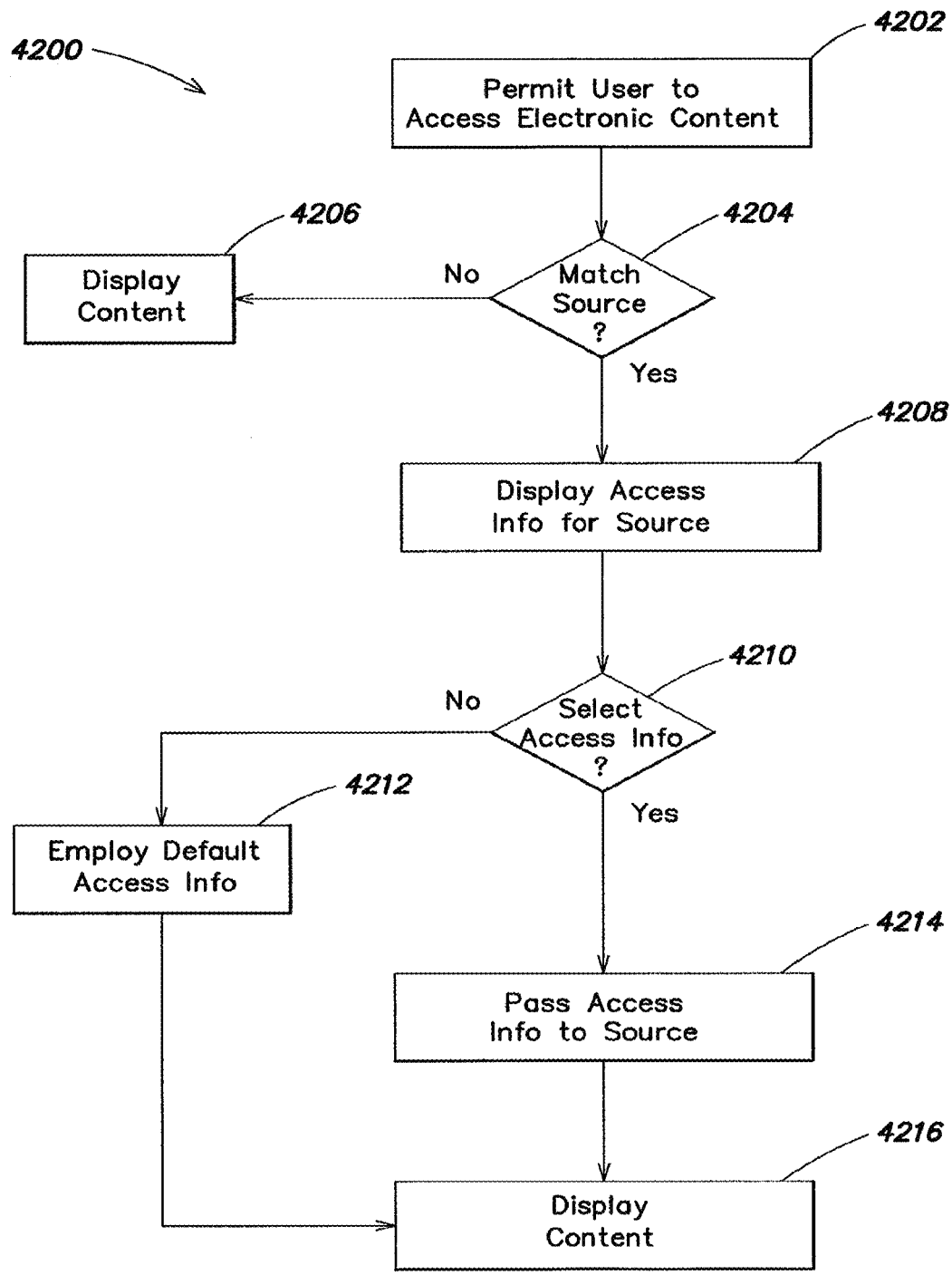
FIG. 42 is a flow diagram of one example process for streamlining user interactions with digital content, according to aspects of the invention.

An example process, 4200, is shown in FIG. 42 for streamlining user interactions with digital content. The user interaction with digital content is streamlined by enhancing features for simplifying user decisions by providing access information associated with multiple user accounts for a particular online source. Multiple account profiles can be retained and presented to a user of a streamlined device. Example process 4200 begins at step 4202, permitting a user to access electronic content through the streamlined device. At 4204 the source of the electronic content is determined and matched against available access information. Access information may be stored in a device profile or in another example in a user profile. These profiles may be loaded at startup of the device or may be accessed in real time when a content source is determined. At 4204 (NO) no access information is available for the content source, and the electronic content is display at 4206. Example electronic content includes web pages and other online resources. At

4204 (YES) the content source is matched against available access information. At 4208, access information is displayed to a user in a user interface. The access information typically identifies a user account available to access the content source. In one example, for an e-mail service this will include the e-mail address displayed in the interface. A plurality of access accounts may be available for a given service. The streamlined device is configured to handle multiple users with multiple account to any given services. The user interface permits the user to identify which access account is desired. At 4210 (NO) the user does not identify an access account, and at 4212 a default access account is used. The default access account does not provide any account information, and the content source page is display, at 4216, not including any sign-on information. At 4210 (YES) a user selects an access account and at 4214 the access information is passed to the content source, and the displayed content at 4216 will return content after the sign-on process has been completed.

Figure 35:
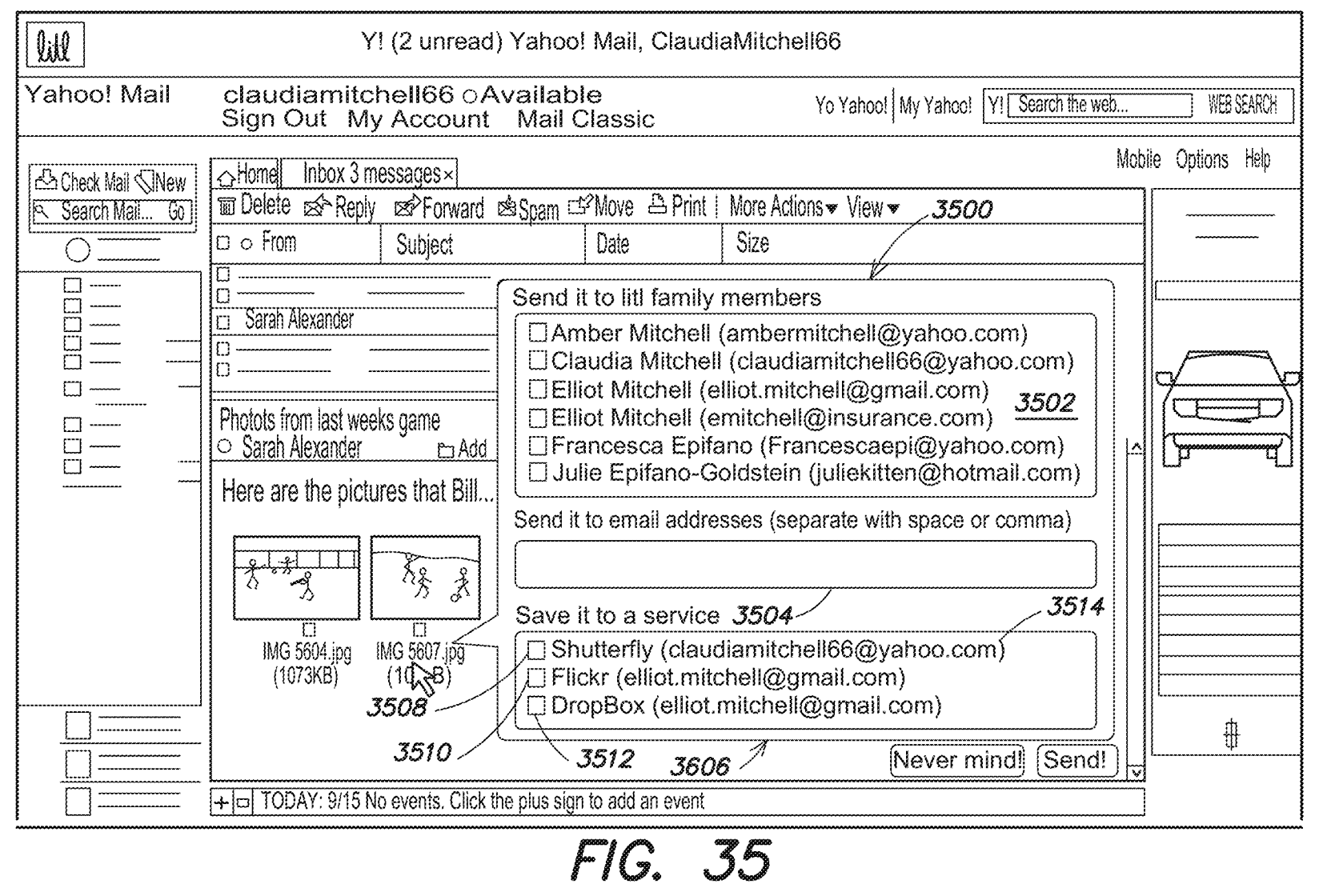

In another embodiment, a process for handling download operations is provided. The process includes causing the device to display a download interface, for example interface, 3500, FIG. 35. The interface presents the user with options for processing the download request. Box 3502, lists members of the user's group to whom the user may send the file. Box 3504, permits a user to enter e-mail addresses to send the file as an attachment or as a link if a size threshold is exceeded. For a user who has configured third party service capable of handling the file content, Box, 3506, displays the configured providers (e.g. Shutterfly 3508, Flickr 3510, DropBox, 3512). Each configured service displays with the account name configured for the service, for example at 3514.

In one example, process, for interpreting download operations also includes displaying the interface in response to computer focus on the download link. In another example, hovering over the link causes the system to display a download interface. For files sent by e-mail the system may be configured with a maximal file size for particular e-mail services. Typically files sizes of less than 5 MB are not filtered, thus is the e-mail domain address is not recognized, a default threshold of 5 MB may be used. For services with known size constraints the system will transmit the file to the e-mail address. If the constraint is exceed, the system transmits a link to the file instead of the actual file.

Figure 41A:
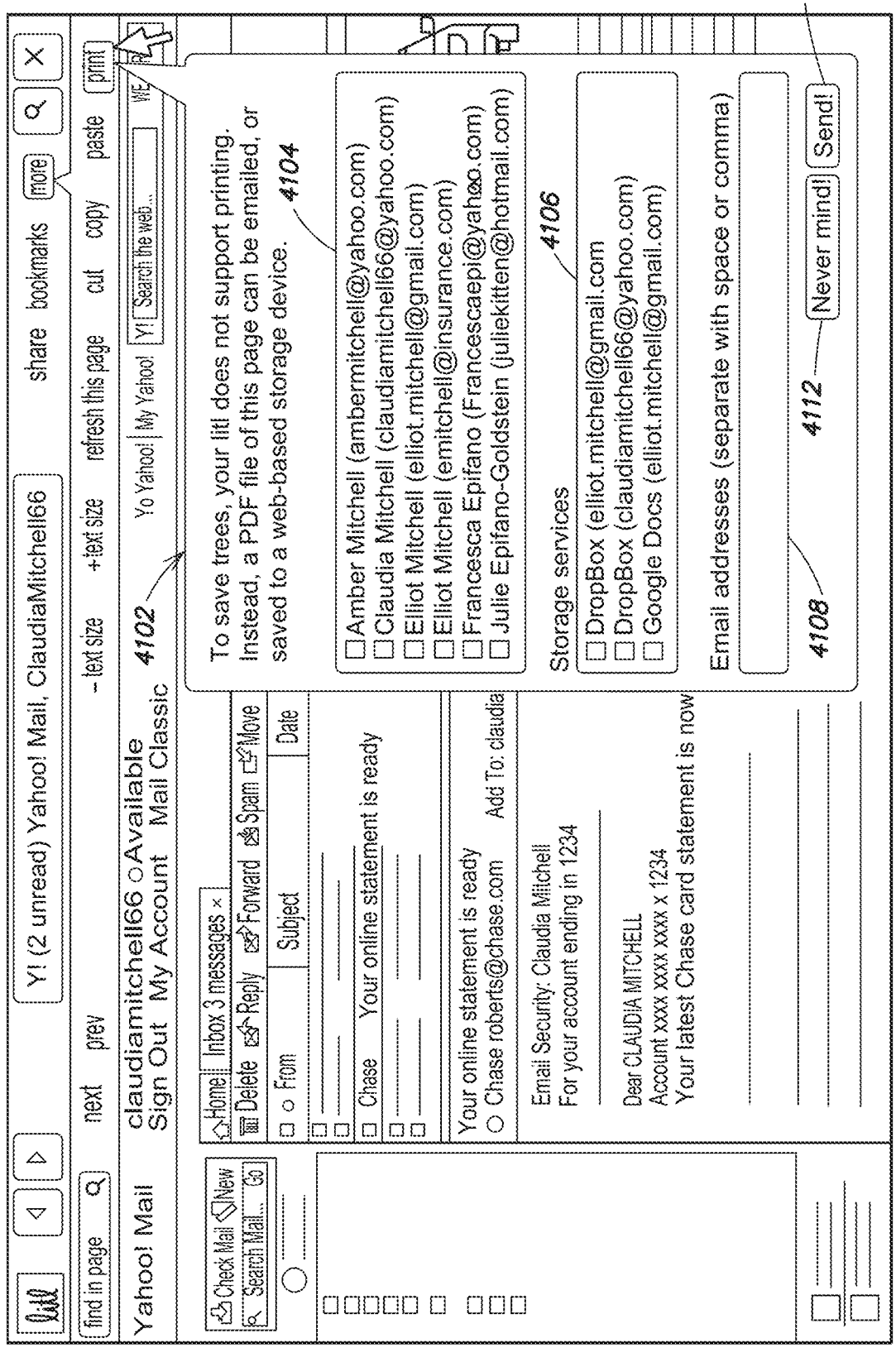
FIG. 41A is a screen shot illustrating an example graphical user interface showing a web page view with a print interface, according to aspects of the invention.
Figure 41B:
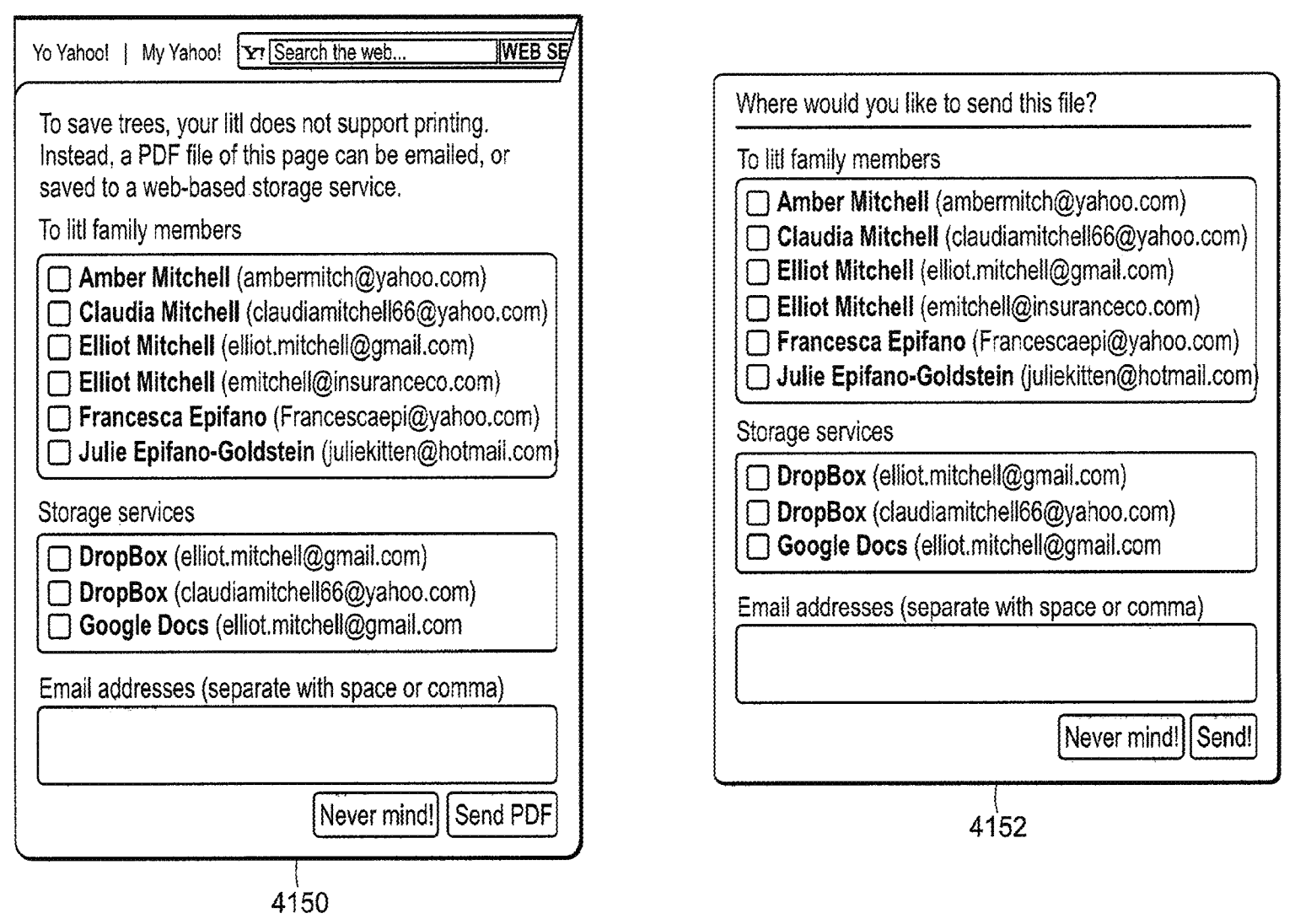

Another to another embodiment, selection of print operations may be handled in a similar fashion as to downloads. When a printing device is attached to a streamlined device, printing proceed as known conventionally. When a printer is not attached, a process for interpreting print operations may be invoked. The process for interpreting print operations, includes causing the device to display a print interface 4102, FIG. 41A. The print interface provides box 4104 listing group members, 4106 listing configured services, and box 4108, for entering destination e-mail addresses. Selection of 4110 sends the item in a print format, in this example a .pdf file. In other examples, different file formats will be displayed as part of 4110 (e.g. word, doc, txt, wpd, xls, etc.). in some embodiments, file size limitations will be employed on delivery of print format files. FIG. 41B illustrates in greater detail examples of print 4150 and download interfaces 4152. Print and download operations may invoke a progress bar displayed over the current view, with the option of canceling transmission.

Figure 36:
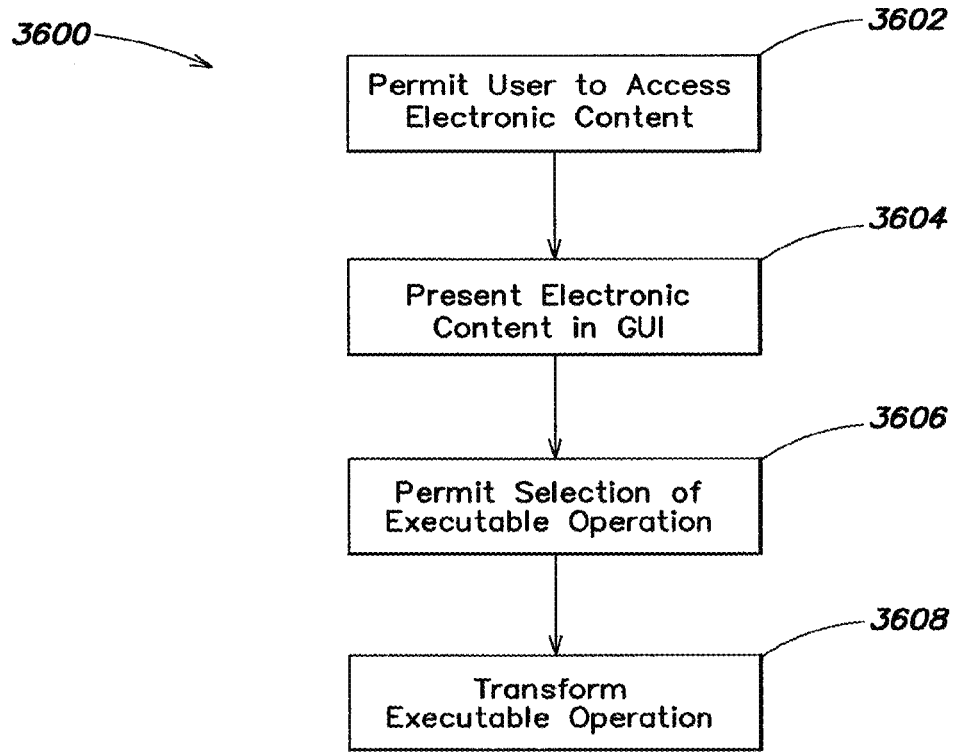
FIG. 36 is a flow diagram of one example process for interpreting executable operations into streamlined operations according to aspects of the invention.

In another embodiment, a streamlined system includes the following features:
  Employs remote mechanisms to access and/or deliver files
  Mechanisms include indentifying a remote action in response to file type
  Web Content Support for system that does not utilize local memory for storage
  In response to download selection (i.e. request to locally store content) display message regarding new functionality (transfer or remote store)
  Maintain user profile—associate web service providers for a particular user
  web services—remote storage, email, photo sharing, custom web page info, storage accts (e.g. Drop Box and Google Docs)
  In response to mouse over/selection/hover/indication of selection display interface to enable remote delivery of content/file
  Providing for selection of remote delivery to a domain (including home network) including an act of verifying the content/file's size does not exceed a threshold value
  In response to passing site check deliver content/file as attachment
  In response to fail, store in provided remote storage, generate link, and deliver link to content/file According to one embodiment, a method for streamlining user interaction with electronic content includes a process for interpreting online executable operations into streamlined operations. One example process, 3600, FIG. 36, for interpreting online executable operations into streamlined operations includes the step of permitting a user to access digital content online, at 3602. The online digital content is presented to a user through a graphical user interface at 3604. The GUI permits a user to select executable operations in the presentation of the online digital content, at 3606. In response to selection of the executable operation, the computer system determines if the executable operation requires local access. In one example, the executable operation includes a download operation that would cause a conventional computer system to store a file on a local mass storage device such as a hard drive. In response to the determination that the executable operation requires local storage, a streamlined computer device transforms the executable operation's local access request into a remote access operation, at 3608. In one example, the remote access operation includes a storage request to a online service provider. Various online service providers permits remote storage of various computer files. Certain service providers optimize the provided service for specific file types, such photo management and sharing services. Other examples include e-mail access providers, video and audio media management and presentation services. In other examples, a service provider may offer generic data storage not specific to any file type. In one embodiment, step 3608 includes transforming a download request to a local mass storage device into a storage request to a remote service. The example process can include acts of identifying the file type associated with the download request, and selecting a service provider based on the identified file type.

In another example, the executable operation that requests local access to storage on the streamlined device may include a print operation, a save operation, a copy operation, a paste operation. Typically the streamlined device is configured to transform save, download, and print operations into remote storage operations. According to one embodiment, a print operation may be streamlined to permit the print operation without an attached printer. According to one embodiment, in the absence of an attached printer, a print request generates a print file in response to execution. Conventionally the print file would be stored locally on a computer hard drive. In some embodiments, a streamlined device does not employ local mass storage devices such as hard drives. Such streamlined devices are configured to transform local storage request into remote storage operations. In one example the print file may be directed to a generic storage provider, and the file stored in the remote memory associated with the generic storage provider. In another embodiment, the system checks the resulting file size for the print file. If the size of the file exceeds a threshold, then the system may further streamline the operation. For example, by providing a link to the file and transmitting the link to a destination. A link may be transmitted through an e-mail instead of transmitting the file itself, for example.

Figure 37:
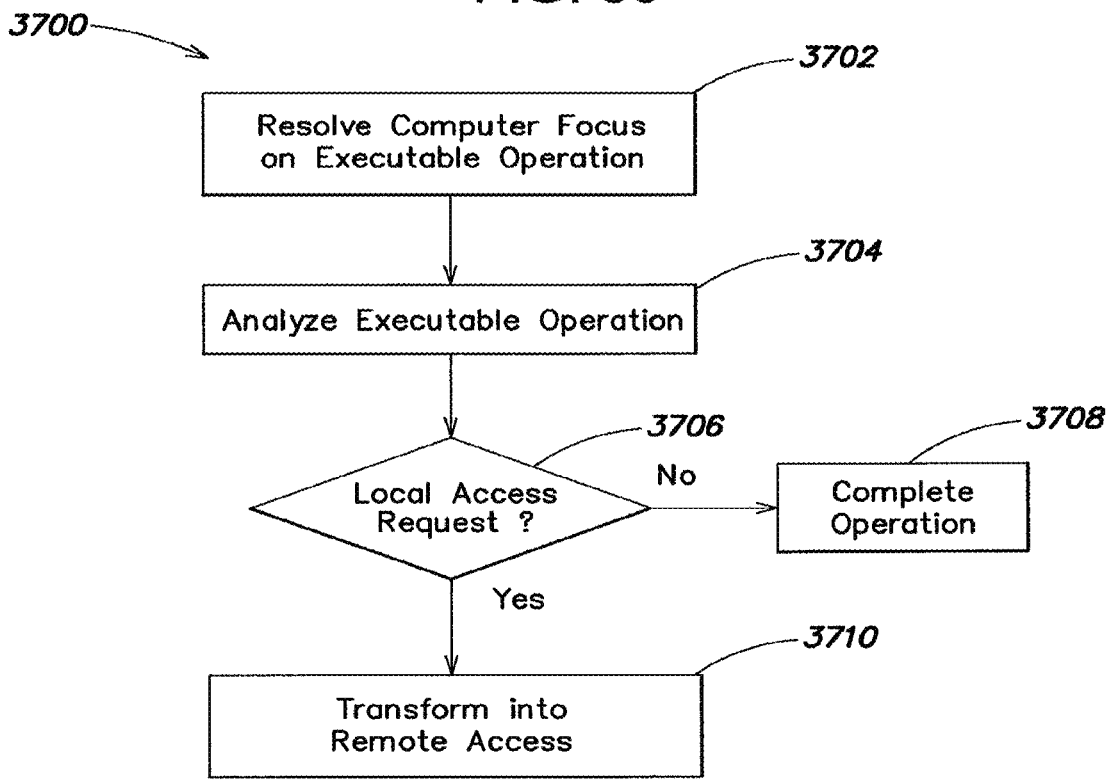
FIG. 37 is a flow diagram of one example process for permitting selection of executable operations in content according to aspects of the invention.

Another example process may be used in conjunction with 3600. In one example, a sub-process, 3700, FIG. 37, for permitting selection of executable operations in online content can be employed. At 3702, computer focus is resolved on an executable operation embedded in online content. Executable operations can include download, print, save, transfer, retrieve, get, fget, and generally comprise operations that require a large memory block of nonvolatile storage, and in particular hard drive space. A streamlined computer device includes logic stored in memory and executed by a processor to analyze a focused executable operation, and at 3704, the executable operation is analyzed. The logic may include programming to trap download request for example. Once a request is trapped the streamlined device can determine what action is appropriate based on the type of request. At 3706, it is determined whether the executable operation requires local storage. At 3706 (No) local storage is not required and the executable operation is performed at 3708. At 3706 (Yes) it is determined that local storage is required and the operation is transformed into a remote access operation at 3710.

Figure 38:
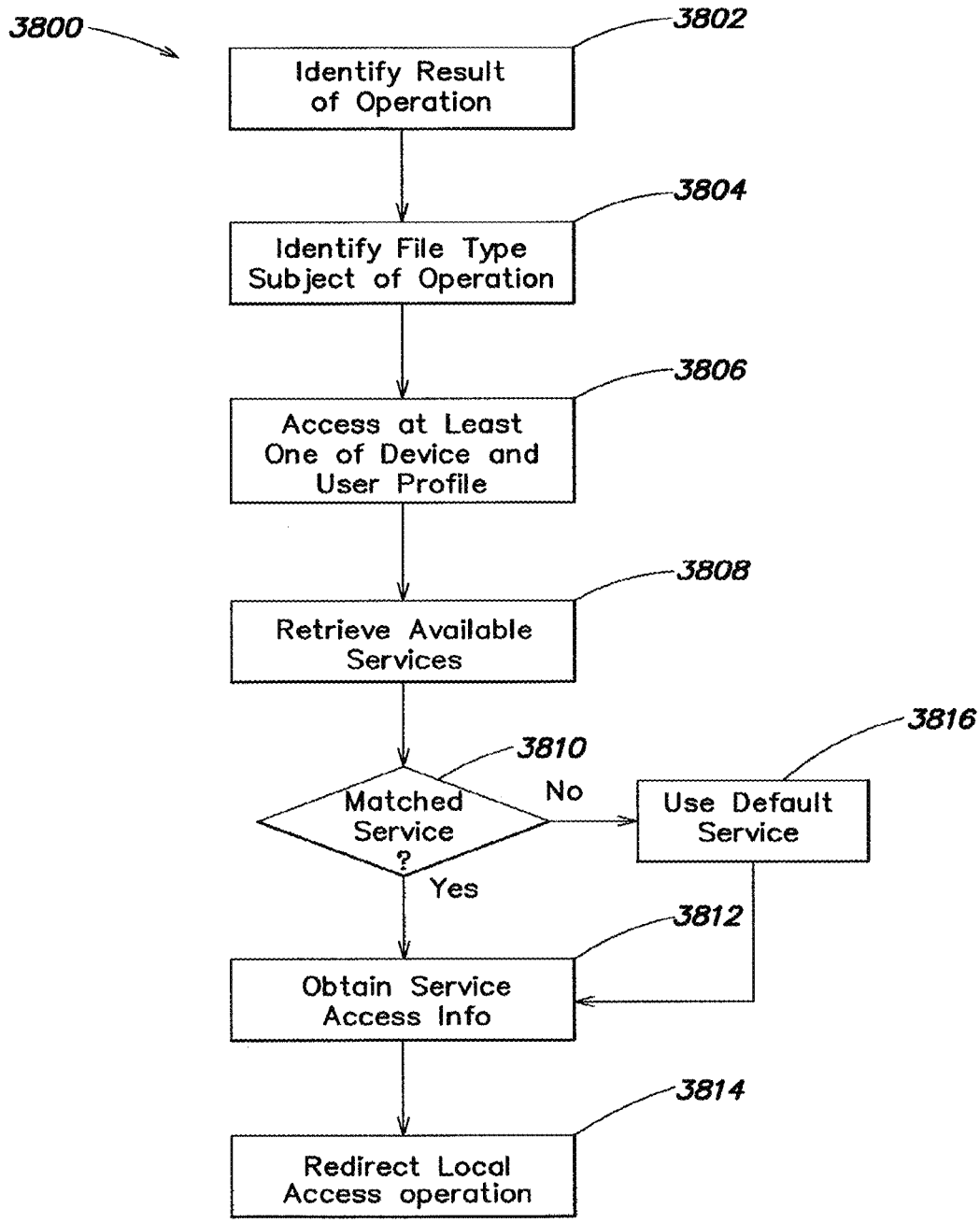
FIG. 38 is a flow diagram of one example process for transforming executable operations into remote storage operations according to aspects of the invention.

Example process 3600 may include additional sub-processes and/or individual steps performed in process 3600 may also comprise other processes. In one example sub-process 3800, FIG. 38, for transforming online executable operations associated with local storage into remote storage operations may be employed as part of a larger process, for example, process 3600. At 3802, a streamlined computer system identifies a result of an executable operation identified in a web browser displayed on the system. At 3804, a file type associated with the operation is identified. At 3806, at least one of a device profile and a user profile is accessed, to retrieve available services, 3808, that may be appropriate for the particular file type. Various services for a particular user may be associated with the device itself, and a plurality of users may have access to multiple services or even more than one account for an individual service. Logic stored in memory and executed by a processor may determine matched services at 3810 by accessing information stored in at least one of a device profile and a user profile. The access information may contain records on available services, their access information, and the access information may include a file type designation for a particular service.

In one example, executed logic matches a file type associated with the executable operation to a file type associated with a remote service 3810 (YES), and in response the computer system retrieves access information for that remote service at 3812, the local access operation can be redirected into a remote service operation at 3814. For example, the computer system may access the remote service using the obtained access information, and provide an interface to transmit the object (data) of the local access to a location within the remote service. In one embodiment, a default service may be configured for any streamlined device. In the absence of matched services at 3810 (NO), the computer system may invoke a default remote service at 3816, obtain the default service access information at 3812 and redirect the local access operation into a remote service operation at 3814.

In another example, process 3800 may be coupled with an interface display presented to a user of the streamlined device. And step 3812 may be used to populate a user interface with a plurality of matched services. The interface may also display additional information associated with the service, for example an account name may be display to permit a user to distinguish between an account s/he set up as opposed to another user. The system may permit the user to designate the remote service appropriate for use in the interface and step 3814 occurs to redirect the local access operation into the user selected remote service.

In another embodiment, an example sub-process, 3900, FIG. 39, for obtaining service access information may be employed to retrieve remote service information. Example process 3900, includes an act of accessing at least one of a device profile and user profile to obtain matched services at 3904. Obtaining matched services may include filtering from the available services, or it may include retrieving all available services listed in the at least one of a device and user profile. In one example, filtering is performed based on a file type that is the subject of a local access operation, in another example, filtering may be performed to return only remote services of the current system user, although it is to be appreciated that other filtering operations may be performed. Once available services are matched 3904, with or without filtering, the matched services are displayed to a system user at 3906 in a user interface. The user interface permits the user to select from the remote services at 3908. Selection may include clicking on a visual indicator shown in a computer display (e.g. a check box), other options include links to the service, other visual indicators may be used, including drop down boxes and other html, xml, and human readable computer displayed forms. In one alternative (not shown), if the user does not select a service within a predetermined period of time, the system may cancel the operation entirely, or alternatively select a default remote service automatically. At 3910, the object of the local access operation is delivered to the remote service.

Configuring Streamlined Devices

According to one aspect, streamlining user interaction with computer content includes improving user interfaces display, permitting configuration of streamlined device ruing operations. Streamlining user interaction may also include providing for the pre-configuration of a streamlined device with content customized to a particular user.

In one embodiment, a potential user may purchase a streamlined device on-line. During an order process, the user may establish an interactive session with an order management system. The order management system may be operatively connected to device management systems, including for example remote storage space, remote profiles, among other information. The order management system is configured to retrieve information on the potential user during a purchase session. The potential user is asked for permission to retrieve information from the computer system on which they are order from. The interactive session may also inquire if the user is ordering from home (and thus their home computer), or form another location. In response to granting permission, an executable object is downloaded to the potential user's home computer. The executable object may be encoded use any language, the specific coding language/environment is not important rather the operations performed by execution of the object on computer hardware is.

The executable object mines the home computer of the potential user for web usage information. Web usage information may include for example, browser history (IE and FireFox), favorites, stored accounts, bookmarks, access frequency information. The web usage information is retrieved from the home computer and processed either by the order management system or a streamlined device management system to generate visual representations associated with mappings to computer content. The content that is mapped to, is determined for example, be determined the most frequently accessed site for the potential user. In one embodiment, web cards are generated for the potential user. Each web card is pre-loaded on the device that will be shipped upon completion of the order. Further, for the web cards capable of being display as a channel card—both types may be pre-loaded. Other specialized cards may be generated and pre-loaded for the user based off of information obtained from their home computer. For example a bookmark card is generated from the retrieved bookmarks—The retrieved bookmarks may be passed through a filter to remove bookmarks that have not been accessed in for example 6 months. Although other time periods may be used to filter bookmark information. Web cards may also be created from the most frequently access bookmarks.

Additional information may be mined from the potential user's computer. In particular, communication settings for the home computer may be detected. Any wireless communication setting may be retrieved and preconfigured. After pre-configuration the streamlined device may be considered fully operations out-of-the-box.

The interactive session may also be used to supplement any retrieved data, for example, if the executable object detects frequent access to third party providers—Flickr and Google Docs for example but cannot detect account name and other access information, the interactive session may query the user to provide the required information.

In other embodiments, the user may be sent executable code via an e-mail during or after a purchase. For example, a user not on his/her own computer during the ordering process may be sent an e-mail containing an executable file, to be run when the user is on their home computer. In another example, a party may purchase a streamlined device for another. The purchaser may provide an e-mail address for the intended recipient, who may execute the file to transmit customization information for the streamlined device.

According to one embodiment an example process, 4000, FIG. 40, for pre-configuring a streamlined device is shown. Process 4000, beings at 4002 in response to a request to purchase a streamlined device. The request is accepted at 4002, and in response a management system requests permission to perform a data mining operation on a recipients computer. Typically the person/entity ordering the streamlined device is the same as the recipient, in which case an executable file can be transmitted at the same time a online request to purchase a streamlined device occurs. In one alternative, the request may be entered offline. During an offline request an e-mail address may be requested and the executable file deliver to the recipient's email, notifying him/her of the file and it use to pre-configure their computer. In another alternative, the party ordering the streamlined device intends it for another. When the purchaser and recipient are different, the e-mail address is requested for the intended recipient. At 4006 (YES), permission is obtained and the executable file retrieves information associated with online use of the recipient's computer at 4008. Additional information may be collected including configuration options on the recipient's computer. System settings such as network communication configurations may also be retrieved. In one example, wireless network data is retrieve to permit the streamlined device to connect immediately to a recipient's home network.

During an order for a streamlined device, demographic information is collected on the recipient at 4010. This often includes at a minimum a name and destination address for a recipient of a streamlined device. Thus even if permission is not granted 4006 (NO) information can be collected to pre-configured a streamlined device at 4010, in this case the information is constrained to what is provider by the purchaser during the transaction. At 4012, accumulated information is used to pre-configure the streamlined device. Pre-configuration includes establishing wireless network settings for the streamlined device, and may include generating visual representations of online content that are mapped to for example the most frequently accessed sites on the recipient's home computer. Other configuration can include generating visual representations that map to services configured on the recipient's computer (online banking, photo management services, file sharing services, media management services, e-mail providers, etc.). The visual representations may be configured with access information including user names and passwords so that a recipient can switch over the streamlined device seamlessly.

Special Purpose Computer

Figure 51:
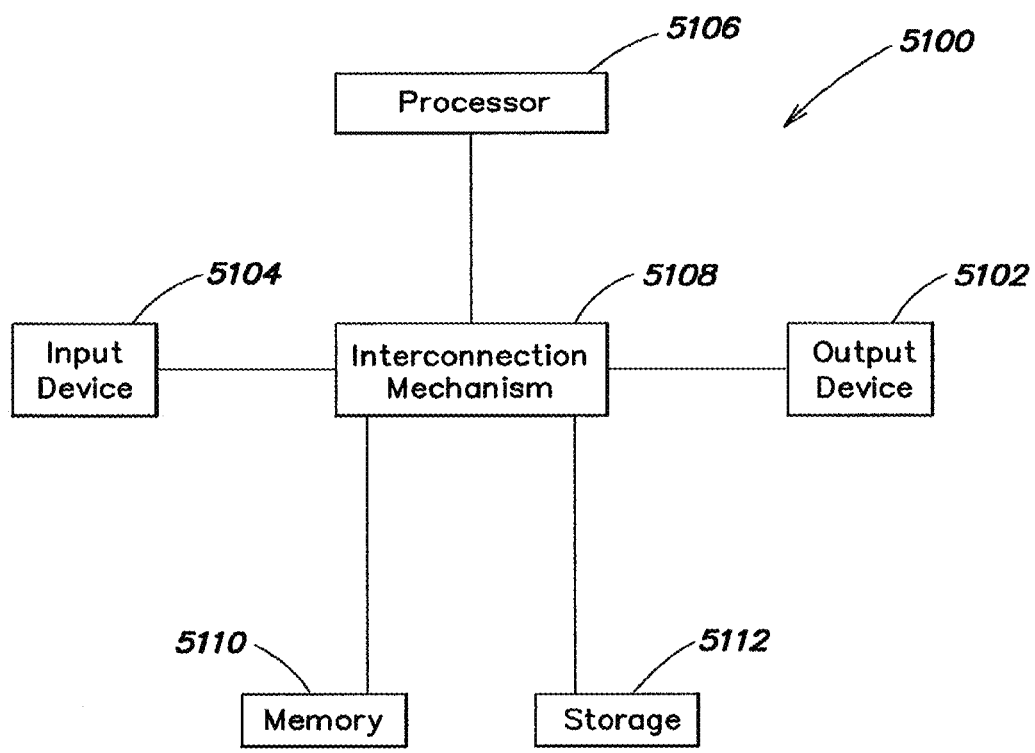
FIG. 51 is a block diagram of a computer system for streamlining user interactions with computer content according to aspects of the invention.

FIG. 51 shows a block diagram of a computer system 5100 in which various aspects of the present invention may be practiced. For example, various aspects of the invention may be implemented as specialized software executing in one or more computer systems including multiple computer systems communicating over network. Computer system 5100 may include a processor 5106 connected to one or more memory devices 5110, for storing data. Typically computer system 5100 is implemented without hard drive devices. Memory 5110 is typically used for storing programs and data during operation of the computer system 5100, and typically comprises Flash memory. Components of computer system 5100 may be coupled by an interconnection mechanism 5108, which may include one or more busses (e.g., between components that are integrated within a same machine) and/or a network (e.g., between components that reside on separate discrete machines). The interconnection mechanism enables communications (e.g., data, instructions) to be exchanged between system components of system 5100.

Computer system 5100 may also include one or more input 5104/output (I/O) devices 5102, for example, a keyboard, mouse, trackball, microphone, touch screen, a printing device, display screen, speaker, etc. Output devices may include video cards and separate video memory for improved processing performance. Storage 5112, typically includes a computer readable and writeable nonvolatile recording medium in which signals are stored that define a program to be executed by the processor or information stored on or in the medium to be processed by the program. The medium may, for example, be a flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM).

Referring again to FIG. 51, the memory may be located in storage 5112 as shown, or in memory system 5110. The processor 5106 generally manipulates the data within the memory 5110, and then copies the data to the medium associated with storage 5112 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software executing on hardware, hardware or firmware, or any combination thereof. Further, such methods, acts, systems, system elements and components thereof may be implemented as part of the computer system described above or as an independent component.

Although computer system 5100 is shown by way of example as one type of computer system upon which various aspects of the invention may be practiced, it should be appreciated that aspects of the invention are not limited to being implemented on the computer system as shown in FIG. 51. Various aspects of the invention may be practiced on one or more computers having a different architectures or components that that shown in FIG. 51.

Computer system 5100 may programmable using a high-level computer programming language. Computer system 5100 may be also implemented using specially programmed, special purpose hardware. In computer system 5100, processor 5106 is typically a commercially available processor such as the well-known Pentium class processor available from the Intel Corporation. Many other processors are available, including multi-core processors. Such a processor usually executes an operating system which may be, for example, the Windows-based operating systems (e.g., Windows Vista, Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. In one embodiment, the Litl cloud is maintained on server systems accessible from a plurality of devices. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Physical Configurations

Figure 52A:
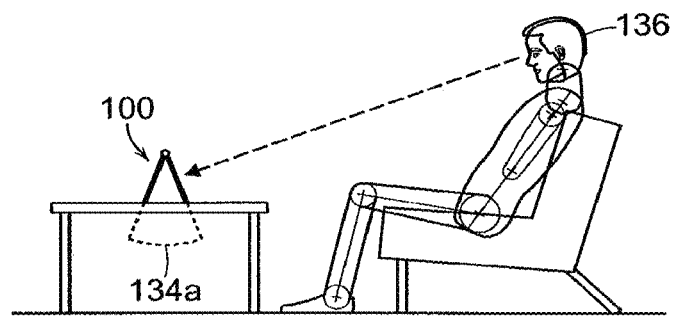
FIGS. 52A-C are diagrams illustrating different positions of the portable computer of FIG. 4 in easel mode.
Figure 52B:
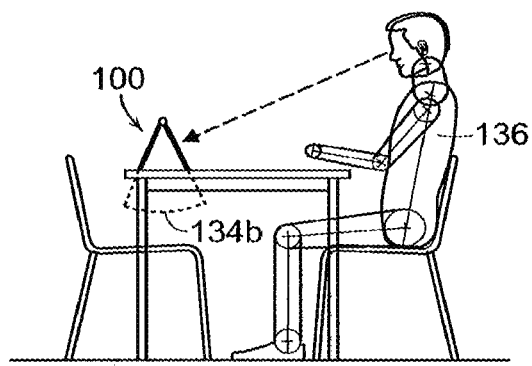
Figure 52C:
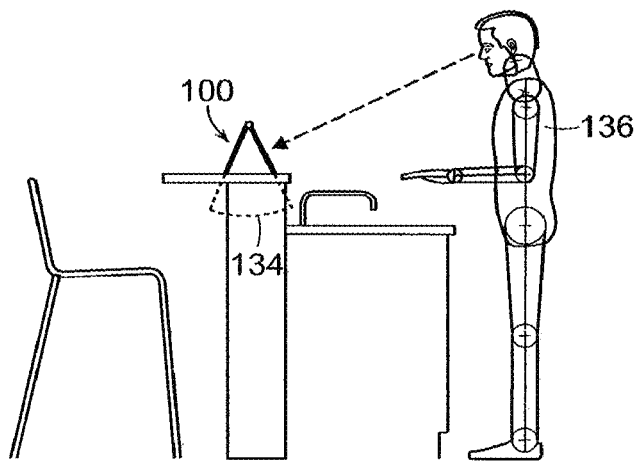

Referring to FIG. 52C, when the portable computer 100 is in the easel mode, the base is disposed at an angle 134 to the display component. This angle 134 is adjustable, for example, to allow a comfortable viewing angle to the display screen to be maintained for different positions of a user 136 and of the portable computer 100, as illustrated in FIGS. 52A, 52B and 52C. For example, when the user 136 is further from the portable computer, the angle 134a (FIG. 52A) may be made smaller than the angle 134b when the user is closer to the portable computer (FIG. 52B). As discussed above, in one example, the orientation sensor (not shown) may be used to detect, either approximately or precisely, the angle 134 and to provide the information to the computer operating system.

Figure 53A:
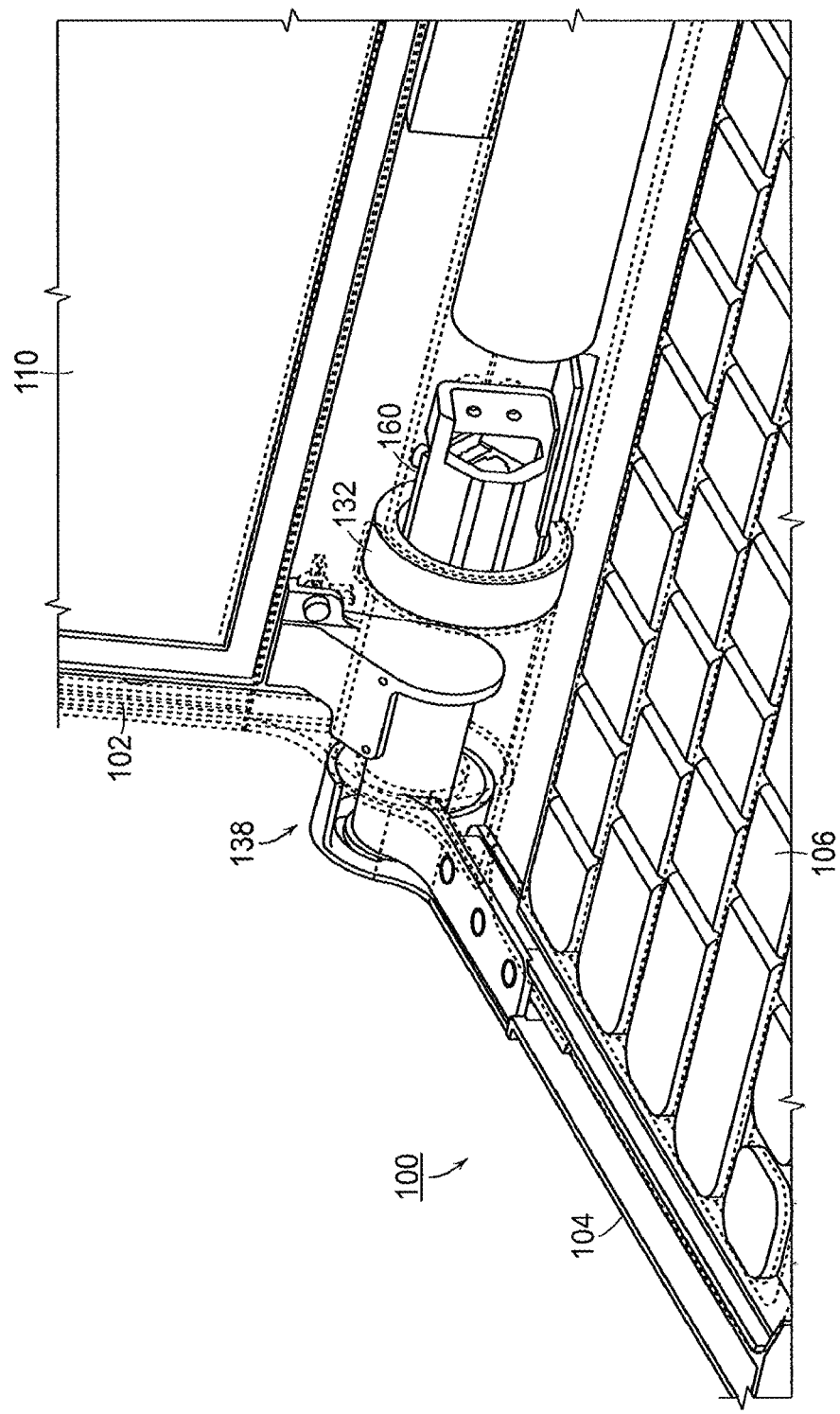
FIG. 53A is an illustration of a portion of the portable computer of FIG. 1 in the laptop mode, illustrating a hinge assembly according to aspects of the invention.
Figure 53B:
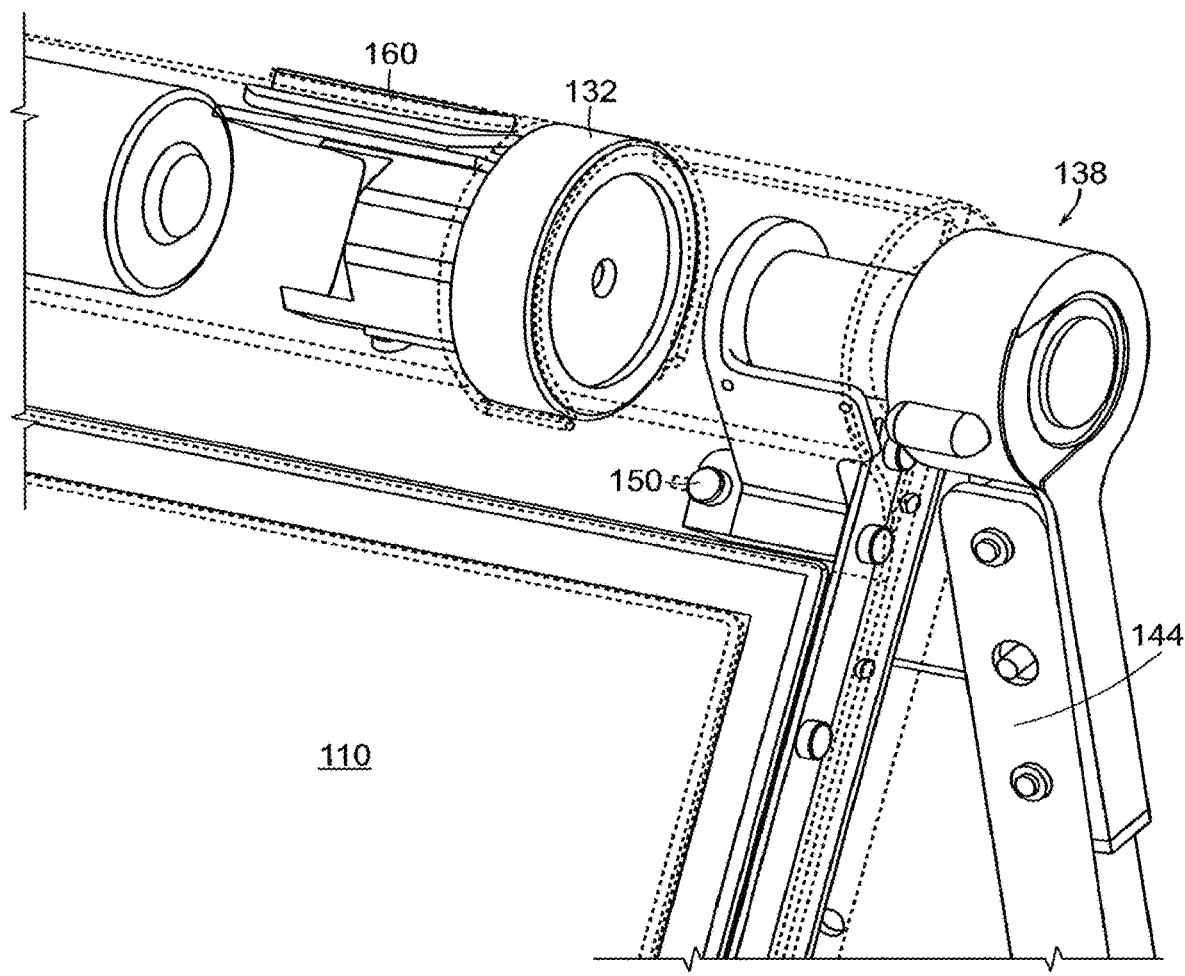
FIG. 53B is an in illustration of a portion of the portable computer of FIG. 1 in the easel mode, illustrating the hinge assembly according to aspects of the invention.

Referring to FIGS. 53A and 53B, there is illustrated a portion of the portable computer 100 illustrating a hinge assembly 138 that allows the portable computer to be configured into either the laptop mode (FIG. 53A) or the easel mode (FIG. 53B), according to aspects of the invention. According to one embodiment, the hinge assembly 138 accommodates 0-320 degrees of rotation, allowing a minimum angle 134 (see e.g. FIG. 52C) of 40 degrees. However, it is to be appreciated that the hinge assembly 138 may allow greater or fewer degrees of rotation, provided only that sufficient rotation is allowed so as to configure the portable computer 100 into either the laptop mode or the easel mode. As discussed above, in one embodiment the portable computer 100 includes an orientation sensor (not shown) that is configured to detect a relative orientation of the display component 102 and the base component 104. In one example, the orientation sensor may be an accelerometer incorporated into the base component 104, as discussed above. Alternatively, the orientation sensor may be incorporated into the hinge assembly 138 and may be used to detect movement of the hinge assembly, and to translate that movement into an information about the relative orientation of the display component 102 and the base component 104 (for example, a size of the angle 134). It is also to be appreciated that the orientation sensor may include electronic or mechanical components, or a combination thereof. For example, the hinge assembly may be provide with detents that provide an indication of the mode of the portable computer.

As discussed above, and also illustrated in FIGS. 53A and 53B, the portable computer may also comprise a scroll wheel 132 that allows a user to adjust, control and/or select various aspects of the portable computer (e.g., wireless capability or speaker volume) or items displayed on the display screen 110. A housing 160 may contain or support various mechanical and/or electronic components (not shown) that are coupled to the scroll wheel 132 and are configured to convert physical movement of the scroll wheel into electrical signals. These electrical signals may be provided to the central processing unit of the portable computer 100 which processes the electrical signals so as to translate movement of the scroll wheel into control of a selected feature, for example, adjusting the volume of the speaker(s) or selecting a particular item displayed on the display screen.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. A non-transitory computer-readable medium having instructions encoded thereon that, when executed by at least one processor, cause the at least one processor to perform a method comprising:
   executing an application at least in part by displaying a graphical user interface of the application, wherein the graphical user interface comprises a plurality of selectable options associated with a respective plurality of executable operations;
   receiving input from a user specifying selection of at least one executable operation of the plurality of executable operations, wherein the at least one executable operation includes a request to access local storage media;
   determining whether the request to access local storage media relates to one or more files that exceed a threshold based on one or more factors including size of the files;
   in response to determining that the request to access local storage media relates to one or more files that exceed a threshold, transforming the request to access local storage media within the at least one executable operation into a request to access remote storage media; and
   performing the at least one executable operation at least in part by accessing the remote storage media, wherein the request to access local storage media is not executed before transforming.

2. The non-transitory computer-readable medium according to claim 1, wherein the method further comprises identifying that the at least one executable operation includes the request to access local storage media, and wherein transforming the request to access local storage media into the request to access remote storage media is in response to the act of identifying.

3. The non-transitory computer-readable medium according to claim 2, wherein the act of identifying comprises evaluating a function to be performed as at least a part of the at least one executable operation and determining that the function meets criteria for performing the act of transforming.

4. The non-transitory computer-readable medium according to claim 1, wherein the request to access local storage media is handled by an operating system executed by the at least one processor and comprises a request to access local storage of electronic content prior to transforming.

5. The non-transitory computer-readable medium according to claim 1, wherein the application comprises an internet browser, the graphical user interface includes a web page, and the at least one executable operation is displayed with or as at least a part of the web page.

6. The non-transitory computer-readable medium according to claim 1, wherein the request to access local storage media includes executable instructions that, if executed, cause the at least one processor to download electronic content to a mass storage device local to the at least one processor.

7. The non-transitory computer-readable medium according to claim 1, wherein transforming the at least one executable operation into a request to access remote storage media includes redirecting the executable operation into a request for access to a remote storage server via the Internet.

8. The non-transitory computer-readable medium according to claim 7, further comprising identifying the remote storage server using information stored in at least one of a device profile and a user profile.

9. The non-transitory computer-readable medium according to claim 1, wherein the method further comprises:
   configuring access to a remote storage service at least in part by establishing an account name and password for the remote storage service; and
   storing, in memory local to the at least one processor, the account name and the password as part of at least one of a device profile and a user profile.

10. The non-transitory computer-readable medium according to claim 3, wherein determining that the function that would be performed meets transformation criteria includes accessing at least one of a user profile, a device profile, a remote storage service profile, and a default profile to obtain a file size limitation.

11. The non-transitory computer-readable medium according to claim 1, wherein the request to access local storage media comprises at least one of:
   a save request comprising a local save target location;
   a print request comprising a reference to a local target printer;
   a copy request comprising a local copy target file location;
   a paste request comprising a local paste target file location;
   a download request comprising a local download save target location; or
   an upload request comprising a local upload target file location.

12. A computer system, comprising:
   at least one processor operatively connected to a memory, the at least one processor configured to execute instructions stored in the memory that cause the at least one processor to:
   execute an application at least in part by displaying a graphical user interface of the application, wherein the graphical user interface comprises a plurality of selectable options associated with a respective plurality of executable operations;
   receive input from a user specifying selection of at least one executable operation of the plurality of executable operations, wherein the at least one executable operation includes a request to access local storage media;
   determine whether the request to access local storage media relates to one or more files that exceed a threshold based on one or more factors including size of the files;
   in response to determining that the request to access local storage media relates to one or more files that exceed a threshold, transform the request to access local storage media within the at least one executable operation into a request to access remote storage media; and
   perform the at least one executable operation at least in part by accessing the remote storage media, wherein the request to access local storage media is not executed before transformation.

13. The computer system according to claim 12, wherein the at least one processor is further configured to:
   identify that the at least one executable operation includes the request to access local storage media; and
   transform the request to access local storage media into the request to access remote storage media in response to identification.

14. The computer system according to claim 13, wherein the at least one processor is configured to identify that the at least one executable operation includes the request to access local storage media at least in part by:
   evaluating a function to be performed as at least a part of the at least one executable operation; and
   determining that the function meets criteria for transformation.

15. The computer system according to claim 12, wherein the request to access local storage media is handled by an operating system executed by the at least one processor and comprises a request to access local storage of electronic content prior to transforming.

16. The computer system according to claim 12, wherein the application comprises an internet browser, the graphical user interface includes a web page, and the at least one executable operation is displayed with or as at least a part of the web page.

17. The computer system according to claim 12, wherein the request to access local storage media includes executable instructions that, if executed, cause the at least one processor to download electronic content to a mass storage device local to the at least one processor.

18. The computer system according to claim 12, wherein transforming the at least one executable operation into a request to access remote storage media includes redirecting the executable operation into a request for access to a remote storage server via the Internet.

19. The computer system according to claim 18, wherein at least one process is further configured to identify the remote storage server using information stored in at least one of a device profile and a user profile.

20. The computer system according to claim 12, wherein the at least one processor is further configured to:
   configure access to a remote storage service at least in part by establishing an account name and password for the remote storage service; and
   store, in memory local to the at least one processor, the account name and the password as part of at least one of a device profile and a user profile.

21. The computer system according to claim 14, wherein determining that the function that would be performed meets transformation criteria includes accessing a size threshold associated with the at least one executable operation, wherein accessing the size threshold includes accessing at least one of a user profile, a device profile, a remote storage service profile, and a default profile to obtain a file size limitation.

22. The computer system according to claim 12, wherein the request to access local storage media comprises at least one of:
   a save request comprising a local save target location;
   a print request comprising a reference to a local target printer;
   a copy request comprising a local copy target file location;
   a paste request comprising a local paste target file location;
   a download request comprising a local download save target location; or
   an upload request comprising a local upload target file location.

23. A computer-implemented method, comprising:
   executing an application at least in part by displaying a graphical user interface of the application, wherein the graphical user interface comprises a plurality of selectable options associated with a respective plurality of executable operations;
   receiving input from a user specifying selection of at least one executable operation of the plurality of executable operations, wherein the at least one executable operation includes a request to access local storage media;
   determining whether the request to access local storage media relates to one or more files that exceed a threshold based on one or more factors including size of the files;
   in response to determining that the request to access local storage media relates to one or more files that exceed a threshold, transforming the request to access local storage media within the at least one executable operation into a request to access remote storage media; and
   performing the at least one executable operation at least in part by accessing the remote storage media, wherein the request to access local storage media is not executed before transforming.

* * * * *